United States Patent
Hu et al.

(10) Patent No.: US 12,470,707 B2
(45) Date of Patent: Nov. 11, 2025

(54) REUSING ADAPTIVE LOOP FILTER (ALF) SUB-PICTURE BOUNDARY PROCESSING FOR RASTER-SCAN SLICE BOUNDARIES

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 18/593,767

(22) Filed: Mar. 1, 2024

(65) Prior Publication Data

US 2024/0323368 A1  Sep. 26, 2024

Related U.S. Application Data

(63) Continuation of application No. 17/686,817, filed on Mar. 4, 2022, now Pat. No. 11,949,859, which is a
(Continued)

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/174* (2014.11);
(Continued)

(58) Field of Classification Search
CPC .. H04N 19/117; H04N 19/136; H04N 19/176; H04N 19/182; H04N 19/46; H04N 19/96; H04N 19/86; H04N 19/85
See application file for complete search history.

(56) References Cited

U.S. PATENT DOCUMENTS 8,805,085 B2   8/2014  Kondo
11,303,890 B2  4/2022  Hu et al.
(Continued)

OTHER PUBLICATIONS

Deep V., et al., "Realization of State-of-the-Art Intra-Prediction in High Efficiency Video Coding (HEVC)", published by Proquest LLC, Dec. 2016, 101 Pages.
(Continued)

*Primary Examiner* — Francis Geroleo
(74) *Attorney, Agent, or Firm* — QUALCOMM Incorporated

(57) ABSTRACT

Systems, methods, and media are provided for loop filtering across raster scan slices. One example includes obtaining the video data comprising one or more pictures and a first block of a picture having a pixel subject to filtering. A second block is determined to be located in the first slice in a particular relation to the second block. A third block that includes pixels for filtering the pixel is determined to be in a second slice at a diagonal corner of the first block, with filtering across slice boundaries disabled. First one or more pixels of the second block are identified as available for performing loop filtering of the pixel and second one or more pixels of the third block identified as unavailable for performing the loop filtering of the pixel of the first block. The first one or more pixels and the second one or more pixels are padded.

30 Claims, 24 Drawing Sheets

Related U.S. Application Data continuation of application No. 17/006,087, filed on Aug. 28, 2020, now Pat. No. 11,303,890.

(60) Provisional application No. 62/907,552, filed on Sep. 27, 2019, provisional application No. 62/896,501, filed on Sep. 5, 2019.

(51) Int. Cl.
*H04N 19/174* (2014.01)
*H04N 19/176* (2014.01)
*H04N 19/182* (2014.01)
*H04N 19/46* (2014.01)
*H04N 19/86* (2014.01)
*H04N 19/96* (2014.01)

(52) U.S. Cl.
CPC ......... *H04N 19/176* (2014.11); *H04N 19/182* (2014.11); *H04N 19/46* (2014.11); *H04N 19/86* (2014.11); *H04N 19/96* (2014.11)

(56) References Cited

U.S. PATENT DOCUMENTS

| | | | | |
|---|---|---|---|---|
| 2012/0106624 A1* | 5/2012 | Huang | ................... | H04N 19/82 375/240.02 |
| 2013/0101016 A1* | 4/2013 | Chong | ................. | H04N 19/117 375/240.02 |
| 2013/0272624 A1* | 10/2013 | Budagavi | ............. | H04N 19/192 382/239 |
| 2013/0343447 A1 | 12/2013 | Chen et al. | | |
| 2014/0153636 A1 | 6/2014 | Esenlik et al. | | |
| 2014/0198844 A1 | 7/2014 | Hsu et al. | | |
| 2016/0173811 A1* | 6/2016 | Oh | .......................... | H04N 19/70 725/116 |
| 2016/0234492 A1* | 8/2016 | Li | .......................... | H04N 19/70 |
| 2016/0241881 A1* | 8/2016 | Chao | .................... | H04N 19/182 |
| 2018/0077414 A1* | 3/2018 | Reddy | ................... | H04N 19/82 |
| 2018/0199034 A1* | 7/2018 | Nam | .................... | H04N 19/182 |
| 2021/0076033 A1 | 3/2021 | Hu et al. | | |
| 2022/0279177 A1 | 9/2022 | Hu et al. | | |

OTHER PUBLICATIONS

Schneider J., et al., "Sparse Coding based Frequency Adaptive Loop Filtering for Video Coding", Proceedings of the 23rd Packet Video Workshop, Jun. 2018, pp. 48-53.

Tsai C-Y., et al., "Adaptive Loop Filtering for Video Coding", IEEE Journal of Selected Topics in Signal Processing, vol. 7, No. 6, Dec. 1, 2013, pp. 934-945, XP055265962, Dec. 6, 2013 (Dec. 6, 2013), US, ISSN: 1932-4553, DOI: 10.1109/JSTSP.2013.2271974, the whole document.

* cited by examiner

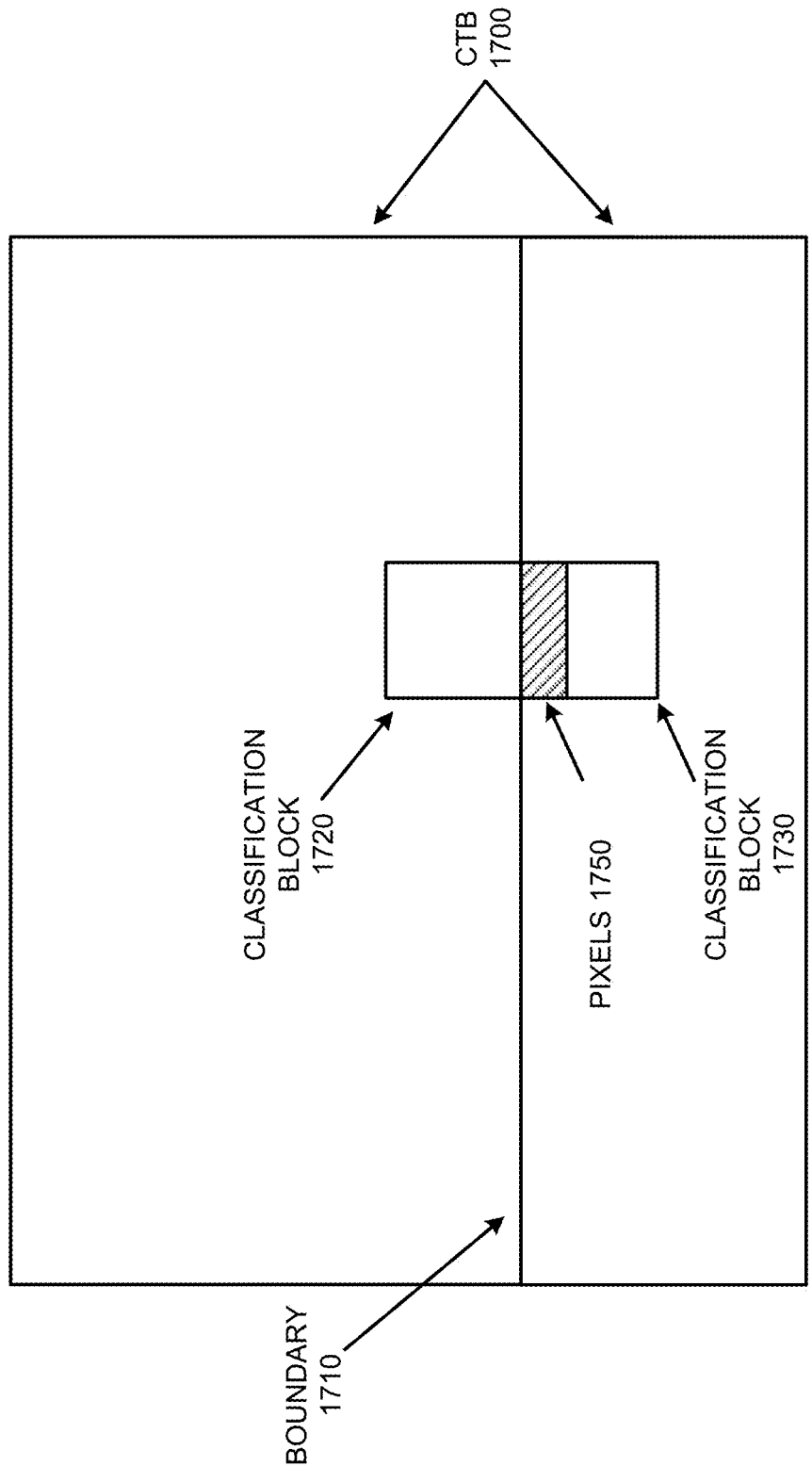

REUSING ADAPTIVE LOOP FILTER (ALF) SUB-PICTURE BOUNDARY PROCESSING FOR RASTER-SCAN SLICE BOUNDARIES

CROSS-REFERENCE TO RELATED APPLICATIONS

This application is a continuation of U.S. application Ser. No. 17/686,817, filed Mar. 4, 2022, which is a continuation of U.S. application Ser. No. 17/006,087, filed Aug. 28, 2020, which claims the benefit of U.S. Provisional Application No. 62/896,501, filed Sep. 5, 2019, and U.S. Provisional Application No. 62/907,552, filed on Sep. 27, 2019, which are hereby incorporated by reference, in their entirety and for all purposes.

TECHNICAL FIELD

The present disclosure generally relates to video coding. In some examples, aspects of the present disclosure relate to an adaptive loop filter (ALF) of a coding device.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Disclosed are systems, apparatuses, methods, and computer-readable media for performing adaptive loop filter (ALF) operations at raster-scan slice boundaries using modified operations adapted from sub-picture boundary processing. For example, techniques are described for padding pixel values (e.g., duplicating or modifying values from available pixel data for unavailable or symmetrically located pixels) at slice boundaries. Such techniques can improve video quality and video processing performance while limiting the additional resources (e.g., processor and memory resources) used to achieve this improvement.

In one illustrative example, a method of processing video data is provided. The method includes obtaining the video data comprising one or more pictures; obtaining a first block of a picture from the one or more pictures, the first block being located in a first slice of the picture; determining a second block of the picture is located in the first slice, the second block adjoining the first block along a first side, and the second block including first one or more pixels for use in performing loop filtering of a pixel of the first block; determining a third block is located at a diagonal corner of the first block in a second slice of the picture, the third block including second one or more pixels for use in performing the loop filtering of the pixel of the first block; determining the loop filtering across slice boundaries is disabled; determining, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and padding the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

In another example, an apparatus is provided that includes a memory and one or more processors (e.g., configured in circuitry) and coupled to the memory. The one or more processors are configured to: obtain the video data comprising one or more pictures; obtain a first block of a picture from the one or more pictures, the first block being located in a first slice of the picture; determine a second block of the picture is located in the first slice, the second block adjoining the first block along a first side, and the second block including first one or more pixels for use in performing loop filtering of a pixel of the first block; determine a third block is located at a diagonal corner of the first block in a second slice of the picture, the third block including second one or more pixels for use in performing the loop filtering of the pixel of the first block; determine the loop filtering across slice boundaries is disabled; determine, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and pad the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

In another example, a non-transitory computer-readable storage medium is provided that includes instructions stored thereon which, when executed by one or more processors, cause the one or more processors to: obtain the video data comprising one or more pictures; obtain a first block of a picture from the one or more pictures, the first block being located in a first slice of the picture; determine a second block of the picture is located in the first slice, the second block adjoining the first block along a first side, and the second block including first one or more pixels for use in performing loop filtering of a pixel of the first block; determine a third block is located at a diagonal corner of the first block in a second slice of the picture, the third block including second one or more pixels for use in performing the loop filtering of the pixel of the first block; determine the loop filtering across slice boundaries is disabled; determine, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and pad the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

In another example, an apparatus is provided that includes: means for obtaining a first block of a picture from the one or more pictures, the first block being located in a first slice of the picture; means for determining a second block of the picture is located in the first slice, the second block adjoining the first block along a first side, and the second block including first one or more pixels for use in performing loop filtering of a pixel of the first block; means for determining a third block is located at a diagonal corner of the first block in a second slice of the picture, the third block including second one or more pixels for use in performing the loop filtering of the pixel of the first block; means for determining the loop filtering across slice boundaries is disabled; means for determining, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and means for padding the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

In some aspects, loop filtering for the first block is performed using an adaptive loop filter (ALF).

In some aspects, the pixels of the first block or the pixels of the additional block are positioned symmetrically about the first one or more pixels and the second one or more pixels.

In some aspects, padding the first one or more pixels and the second one or more pixels using pixels of the first block or pixels of an additional block of the first slice includes generating a converted slice boundary treating a block boundary along the first side between the first block and the second block as the converted slice boundary.

In some aspects, the first slice is a raster scan slice.

In some aspects, the third block is located at a top-left corner of the first block.

In some aspects, the second block is located along a left border of the first block and along a bottom border of the third block, and the converted slice boundary is generated at the left border of the first block using a clipLeftPos function.

In some aspects, the second block is located along a top border of the first block and along a right border of the third block, and the converted slice boundary is generated at the top border of the first block using a clipTopPos function.

In some aspects, the third block is located at a bottom-right corner of the first block.

In some aspects, the second block is located along a right border of the first block and along a top border of the third block, and the converted slice boundary is generated at the right border of the first block using a clipRightPos function.

In some aspects, the second block is located along a bottom border of the first block and along a left border of the third block, and the converted slice boundary is generated at the bottom border of the first block using a clipBottomPos function.

In some aspects, the first block comprises a first coding tree unit (CTU) and the second block comprises a second CTU.

In some aspects, the first slice and the second slice are obtained from raster scan partitioning of the picture.

In some aspects, the method, apparatuses, and computer-readable medium described above include generating an encoded video bitstream comprising the one or more pictures.

Some aspects further include means for generating an encoded video bitstream comprising the one or more pictures.

In some aspects, the encoded video bitstream is generated based on the video data and a result of applying at least one filter to the first block.

In some aspects, the method, apparatuses, and computer-readable medium described above include sending the encoded video bitstream to a decoding device, the encoded video bitstream being sent with signaling information, the signaling information comprising at least a clip flag and an adaptive loop filter flag.

Some aspects include means for sending the encoded video bitstream to a decoding device, the encoded video bitstream being sent with signaling information, the signaling information comprising at least a clip flag and an adaptive loop filter flag.

In some aspects, the method, apparatuses, and computer-readable medium described above include storing the encoded video bitstream.

Some aspects further include means for storing the encoded video bitstream.

In some aspects, the method, apparatuses, and computer-readable medium described above include obtaining an encoded video bitstream comprising the one or more pictures; identifying signaling information associated with the encoded video bitstream, the signaling information comprising at least an adaptive loop filter flag and an indication that the loop filtering across slice boundaries is disabled; and decoding the first block of the picture from the encoded video bitstream.

In some aspects, decoding the first block of the picture from the encoded video bitstream comprises reconstructing the first block of the picture, and further comprising applying at least one filter to the reconstructed first block.

In some aspects, padding the first one or more pixels and the second one or more pixels includes duplicating the pixels of the first block or pixels of an additional block of the first slice to replace the first one or more pixels and the second one or more pixels with padded pixels.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each example.

The foregoing, together with other features and embodiments, will become more apparent upon referring to the following specification, examples, and accompanying drawings.

BRIEF DESCRIPTION OF THE DRAWINGS

In order to describe the manner in which the disclosed and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 17A is a diagram illustrating an example of filling samples of a block in accordance with some examples;

DETAILED DESCRIPTION

Figure 1:
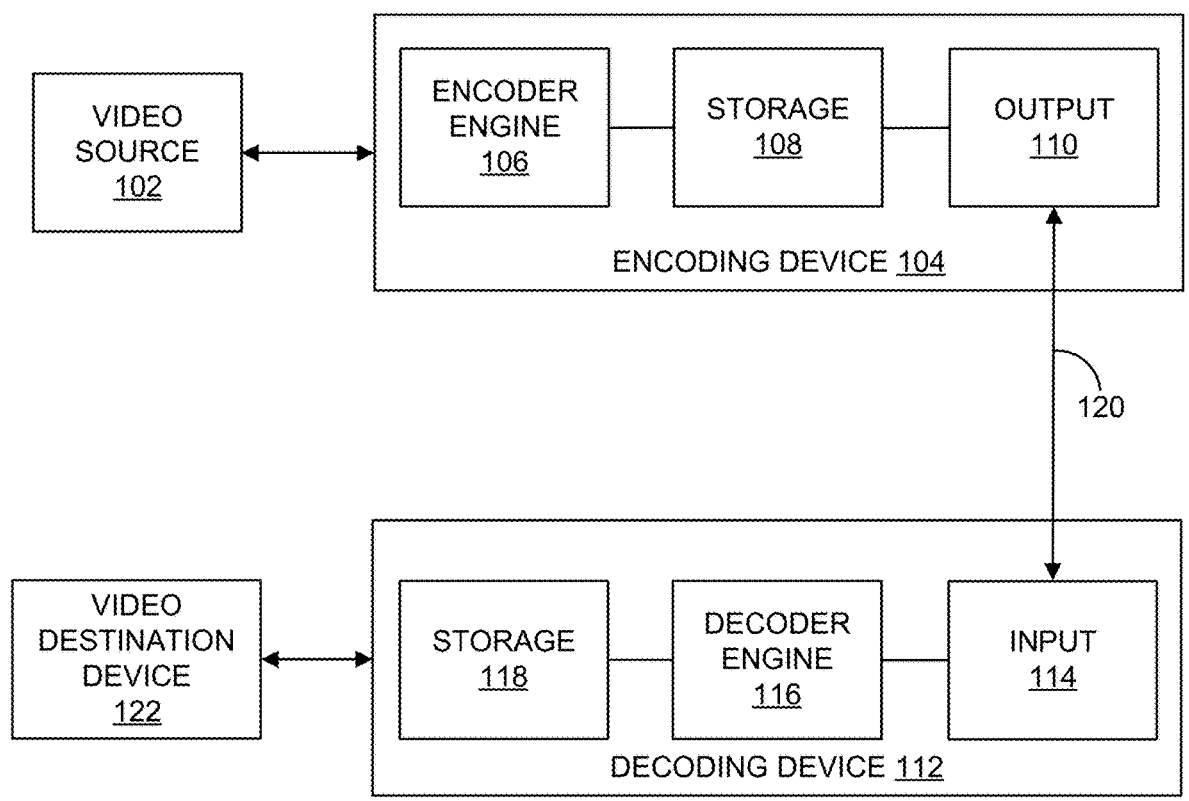
FIG. 1 is a block diagram illustrating an example of an encoding device and a decoding device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

Examples described herein address issues with filtering (e.g., Adaptive Loop Filter (ALF)) implementations that can cause errors and decrease performance in video processing systems. As described herein, loop filters (e.g., ALF filters among other types of loop filters) use a filter pattern to apply filter operations to pixels of images or to classify image data. In some systems, pictures in a video stream can be structured as slices in a raster-scan configuration. In such systems, ALF can be enabled or disabled, and when ALF is enabled, the use of pixels across slice boundaries for ALF can similarly be enabled or disabled. Other types of loop filters may be similarly configured with respect to slice boundaries. With data organized in blocks for a raster scan, the interface between slices in a raster scan can sometimes include four blocks that intersect at a shared corner, where three of the four blocks are part of one slice, and one of the four blocks is part of a separate slice. In such configurations of a raster-scan system, when ALF (and/or other loop filtering) is enabled with the use of pixels across slice boundaries disabled, the ALF operations can encounter a configuration where the filter pattern is not configured to address the disallowed pixels which are across the slice boundary. The configuration can cause fault errors that terminate video processing operations for a picture, or can otherwise degrade performance. Examples described herein improve the operation of video processing devices (e.g., encoding and decoding hardware) by improving functionality of raster-scan operations, preventing system faults, and improving performance of video processing systems. Additionally, some examples described herein enable such improvements by reusing existing operations for sub-picture boundary processing. The reuse of boundary processing operations results in an improvement to video processing systems with limited additional system overhead for such examples. An advantage of such an approach is that it can reduce the implementation complexity since existing implementations may be reused and leveraged to prevent errors in video processing. For example, some currently unsupported cross-boundary ALF cases are handled by re-using the cross-boundary ALF cases.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended examples. While ALF filtering is used herein for illustrative purposes, the techniques described herein can be applied to other types of loop filters, such as Sample Adaptive Offset (SAO) filters, deblocking filters, and/or other types of filters.

Video coding devices can implement video compression techniques to encode and decode video data efficiently. Video compression techniques can include applying different prediction modes, including spatial prediction (e.g., intra-frame prediction or intra-prediction), temporal prediction (e.g., inter-frame prediction or inter-prediction), inter-layer prediction (across different layers of video data and/or other prediction techniques to reduce or remove redundancy inherent in video sequences), among others. A video encoder can partition each picture of an original video sequence into rectangular regions referred to as video blocks or coding units and described in greater detail below. These video blocks can be encoded using a particular prediction mode.

In some cases, video blocks can be divided in one or more ways into one or more groups of smaller blocks. Blocks can include coding tree blocks, prediction blocks, transform blocks, and/or other suitable blocks. References generally to a "block", unless otherwise specified, may refer to such video blocks (e.g., coding tree blocks, coding blocks, prediction blocks, transform blocks, or other appropriate blocks or sub-blocks, as would be understood by one of ordinary skill). These blocks may also interchangeably be referred to herein as "units" (e.g., coding tree unit (CTU), coding unit (CU), prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder can determine a prediction error. In some examples, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder can quantize the transform coefficients. The quantized transform coefficients and motion vectors can be represented using syntax elements and, along with control information, form a coded representation of a video sequence. In some instances, the video encoder can entropy code syntax elements, thereby further reducing the number of bits used for their representation.

A video decoder can, using the syntax elements and control information discussed above, construct predictive data (e.g., a predictive block) for decoding a current frame. For example, the video decoder can add the predicted block and the compressed prediction error. The video decoder can determine the compressed prediction error by weighting the transform basis functions using the quantized coefficients. The difference between the reconstructed frame and the original frame is called reconstruction error.

The techniques described herein can simplify and increase the efficiency of adaptive loop filters used in video coding when raster-scan configurations are used and the use of pixel data across slice boundaries is disabled for adaptive loop filtering. In some examples, the techniques herein can decrease the complexity of such calculations, reduce encoding and decoding errors, and minimize the processing burden on a device's compute resources. Moreover, the techniques described herein can be applied to any video codecs (e.g., High Efficiency Video Coding (HEVC), Advanced Video Coding (AVC), or other suitable existing video codec), and/or can be an efficient coding tool for any video coding standards, including current video coding standards, video standards being developed, and/or future video coding standards, such as, for example, Versatile Video Coding (VVC), the joint exploration model (JEM), and/or other video coding standards in development or to be developed.

FIG. 1 is a block diagram illustrating an example system 100 including an encoding device 104 and a decoding device 112. The encoding device 104 can be part of a source device, and the decoding device 112 can be part of a receiving device. The source device and/or the receiving device can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a head-mounted display (HMD), and/or any other suitable electronic device. In some examples, the source device and the receiving device can include one or more wireless transceivers for wireless communications. The coding techniques described herein can apply to video coding in various multimedia applications including, for example, streaming video transmissions (e.g., over the Internet), television broadcasts or transmissions, encoding of digital video for storage on a data storage medium, decoding of digital video stored on a data storage medium, and/or other applications. In some examples, system 100 can support one-way or two-way video transmission to support applications such as video conferencing, video streaming, video playback, video broadcasting, gaming, video telephony, etc.

The encoding device 104 (or encoder) can be used to encode video data using a video coding standard or protocol to generate an encoded video bitstream. Examples of video coding standards include ITU-T H. 261; ISO/IEC MPEG-1 Visual; ITU-T H. 262 or ISO/IEC MPEG-2 Visual; ITU-T H. 263, ISO/IEC MPEG-4 Visual; ITU-T H. 264 (also known as ISO/IEC MPEG-4 AVC), including its Scalable Video Coding (SVC) and Multiview Video Coding (MVC) extensions; and High Efficiency Video Coding (HEVC) or ITU-T H. 265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Various aspects described herein provide examples using the VTM, VVC, HEVC, and/or extensions thereof. However, the techniques and systems described herein can also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 can provide the video data to the encoding device 104. The video source 102 can be part of the source device, or can be part of a device other than the source device. The video source 102 can include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 can include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture can include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H. 264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units can contain a sequence of bits forming a coded representation of the video data (e.g., an encoded video bitstream, a CVS of a bitstream, or the like), such as coded representations of pictures in a video. The encoder engine 106 can generate coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and, in some cases, can be square in shape. For example, a size of a CU can include 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs can be partitioned to be non-square in shape. Syntax data associated with a CU can also describe, for example, partitioning of the CU into one or more TUs according to a CTU. A TU can be square or non-square in shape.

According to the HEVC standard, transformations can be performed using transform units (TUs). TUs may vary for different CUs. The TUs can be sized based on the size of PUs within a given CU. The TUs may be the same size or smaller than the PUs. In some examples, residual samples corresponding to a CU can be subdivided into smaller units using a quadtree structure known as residual quad tree (RQT). Leaf nodes of the RQT may correspond to TUs. Pixel difference values associated with the TUs can be transformed to produce transform coefficients. The transform coefficients can then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode can include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction can be made, for example, at the CU level.

The encoder engine 106 and decoder engine 116 (described in more detail below) can be configured to operate according to VVC. In VVC, a video coder (such as encoder engine 106 and/or decoder engine 116) can partition a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUS, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks can be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x, \Delta y$), with $\Delta x$ specifying the horizontal displacement and $\Delta y$ specifying the vertical displacement of the reference block relative to the position of the current block. In some cases, a motion vector ($\Delta x, \Delta y$) can be in integer sample accuracy (also referred to as integer accuracy), in which case the motion vector points to the integer-pel grid (or integer-pixel sampling grid) of the reference frame. In some cases, a motion vector ($\Delta x, \Delta y$) can be of fractional sample accuracy (also referred to as fractional-pel accuracy or non-integer accuracy) to more accurately capture the movement of the underlying object, without being restricted to the integer-pel grid of the reference frame.

Accuracy of motion vectors can be expressed by the quantization level of the motion vectors. For example, the quantization level can be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0, y_0$, $refIdx_0$ and $\Delta x_1, y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0, y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 can then perform transformation and quantization. For example, following prediction, the encoder engine 106 can calculate residual values corresponding to the PU. Residual values can include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block can be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which can be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) can be applied to residual data in each CU. In some examples, a TU can be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 can calculate residual data for the TUs of the CU. The PUs can include pixel data in the spatial domain (or pixel domain). The TUs can include coefficients in the transform domain following application of a block transform. As previously noted, the residual data may correspond to pixel difference values between pixels of the unencoded picture and prediction values corresponding to the PUs. Encoder engine 106 can form the TUs including the residual data for the CU, and can then transform the TUs to produce transform coefficients for the CU.

The encoder engine 106 can perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream can then be entropy encoded by the encoder engine 106. In some examples, the encoder engine 106 can utilize a predefined scan order to scan the quantized transform coefficients to produce a serialized vector that can be entropy encoded. In some examples, encoder engine 106 can perform an adaptive scan. After scanning the quantized transform coefficients to form a vector (e.g., a one-dimensional vector), the encoder engine 106 can entropy encode the vector. For example, the encoder engine 106 can use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 can send the NAL units making up the encoded video bitstream data over the communications link 120 to the decoding device 112 of the receiving device. The input 114 of the decoding device 112 can receive the NAL units. The communications link 120 can include a channel provided by a wireless network, a wired network, or a combination of a wired and wireless networks. A wireless network can include any wireless interface or combination of wireless interfaces and can include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network can include any wired interface (e.g., fiber, ethernet, powerline ethernet, ethernet over coaxial cable, digital signal line (DSL), or the like). The wired and/or wireless networks can be implemented using various equipment and/or components, such as base stations, routers, access points, bridges, gateways, switches, servers, software containers, virtual machines, or the like. The encoded video bitstream data can be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, one or more nodes in a distributed storage system, or any other suitable digital storage media for storing encoded video data.

The input 114 of the decoding device 112 receives the encoded video bitstream data and can provide the video bitstream data to the decoder engine 116, or to storage 118 for later use by the decoder engine 116. The decoder engine 116 can decode the encoded video bitstream data by entropy decoding (e.g., using an entropy decoder) and extracting the elements of one or more coded video sequences making up the encoded video data. The decoder engine 116 can rescale and perform an inverse transform on the encoded video bitstream data. Residual data is passed to a prediction stage of the decoder engine 116. The decoder engine 116 then predicts a block of pixels (e.g., a PU). In some examples, the prediction is added to the output of the inverse transform (the residual data).

The decoding device 112 can output the decoded video to a video destination device 122, which can include a display or other output device for displaying the decoded video data. In some aspects, the video destination device 122 can be part of the receiving device that includes the decoding device 112. In some aspects, the video destination device 122 can be part of a separate device other than the receiving device.

In some examples, the video encoding device 104 and/or the video decoding device 112 can be integrated with an audio encoding device and audio decoding device, respectively. The video encoding device 104 and/or the video decoding device 112 can also include other hardware or software used to implement the coding techniques described herein, such as one or more microprocessors, digital signal processors (DSPs), application-specific integrated circuits (ASICs), field programmable gate arrays (FPGAs), central processing units (CPUs), discrete logic, software, hardware, firmware or any combinations thereof. In some cases, the video encoding device 104 and the video decoding device 112 can be integrated as part of a combined encoder/decoder (codec) in a respective device. An example of specific details of the encoding device 104 is described below with reference to FIG. 18. An example of specific details of the decoding device 112 is described below with reference to FIG. 19.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . , n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture, so that all slices in a picture can refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2A:
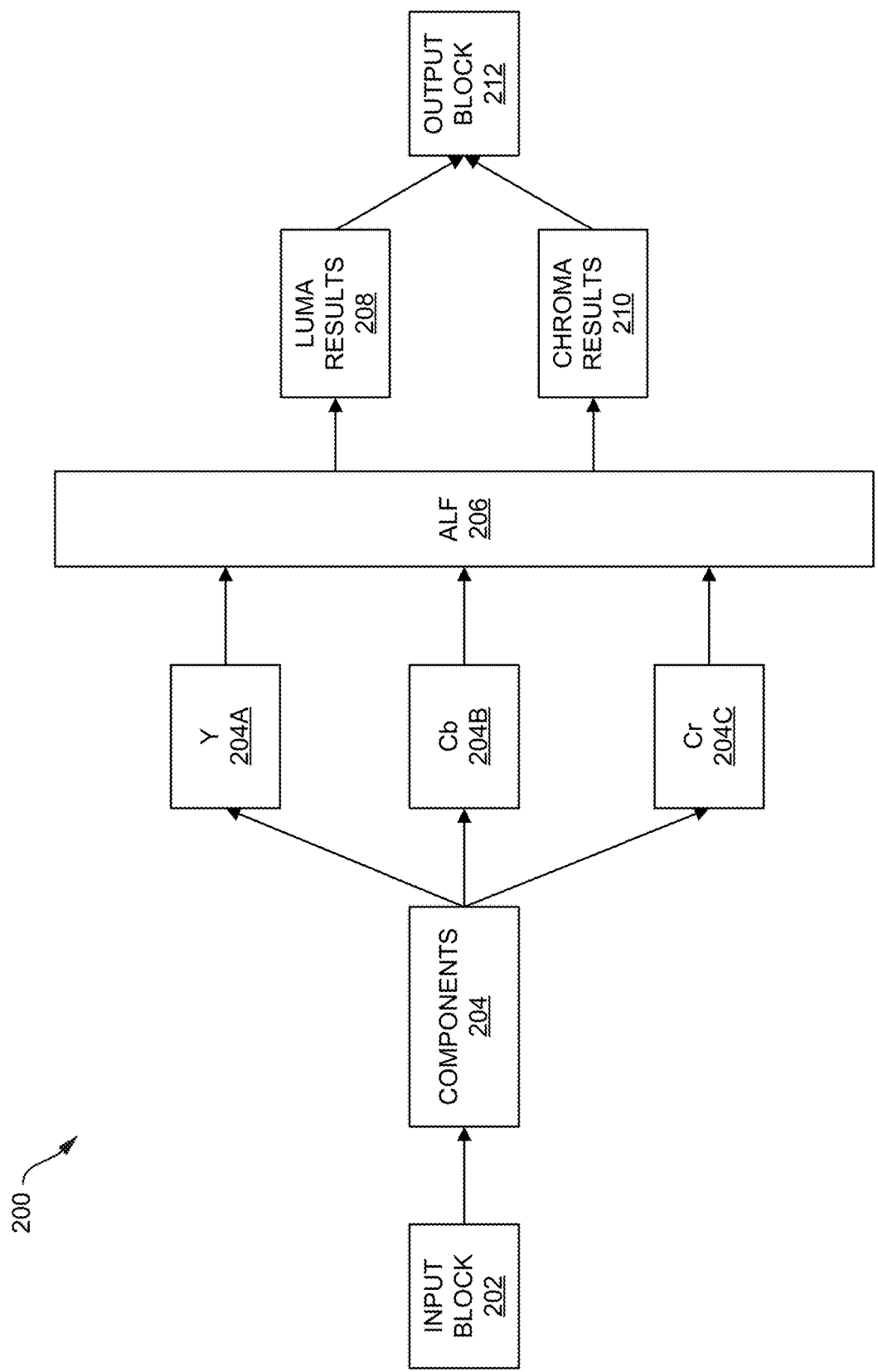
FIG. 2A is a simplified diagram illustrating an example system for applying an adaptive loop filter (ALF), in accordance with some examples of the present disclosure.

FIG. 2A is a simplified diagram illustrating an example system 200 for applying an ALF 206 to an input block 202 in a frame. The block 202 can include color components 204 for image pixels representing the block 202. In the of FIG. 2A example, the color components 204 are in the YCbCr color space and can include luma Y, chroma Cb, and chroma Cr components. The chroma Cb and chroma Cr components in the YCbCr color space can respectively represent the blue-difference and red-difference chroma signals associated with the block 202.

An ALF 206 with ALF filter coefficient values can be applied to luma (Y) component samples 204A, chroma (Cb) component samples 204B, and chroma (Cr) component samples 204C in the block 202. In some examples, the ALF 206 with the ALF filter coefficient values can be applied to samples (e.g., 204A, 204B, 204C) on a block-by-block basis (e.g., to specific video blocks). For example, the video encoder or decoder can process blocks in a frame individually and, when processing a block (e.g., 202) in the frame, the video encoder or decoder can apply ALF filter coefficient from the ALF 206 to that block. The video encoder or decoder can similarly apply ALF filter coefficient values to other blocks as it processes those blocks. In some examples, the ALF 206 can be applied to the luma (Y) component samples 204A, the chroma (Cb) component samples 204B, and the chroma (Cr) component samples 204C to correct artifacts in the block 202, reduce the error between the original frame and the reconstructed frame, and/or increase the quality of the decoded video signal.

Moreover, the ALF 206 can include one or more filters, and each filter can have a specific filter size and shape, as further described below with respect to FIGS. 3A and 3B. For example, the ALF 206 can include a filter of a certain size and shape used for luma (Y) filtering and a filter of a certain size and shape for chroma filtering. As previously explained, in some examples, the ALF 206 can be applied at the block level. For example, in some cases, the ALF 206 can be applied at the CTU or CU level. In other examples, the ALF 206 can be applied at a frame level and/or to other portions of a frame.

A luma filtering result 208 can be obtained from the ALF 206 applied to the luma (Y) component samples 204A. Similarly, a chroma filtering result 210 can be obtained from the ALF 206 applied to the chroma (Cb) component samples 204B and the chroma (Cr) component samples 204C. The luma filtering result 208 can include filtered luma values for the output block 212, and the chroma filtering result 210 can include filtered chroma Cb and chroma Cr values for the output block 212. The output block 212 can include a reconstructed block and/or frame including the luma, chroma Cb and chroma Cr values from the luma filtering result 208 and the chroma filtering result 210. In some cases, the output block 212 along with other output blocks similarly processed can be used to generate a reconstructed frame with ALF filtering.

In some examples, at the encoder side, the luma filtering result 208 and the chroma filtering result 210 can be used to determine whether luma and chroma ALF filtering should be enabled. For example, the quality of the reconstructed block and/or frame after ALF filtering can be compared with the quality of the reconstructed block and/or frame before ALF filtering. ALF filtering can then be enabled or disabled based on the quality of the reconstructed block and/or frame after ALF filtering relative to the quality of the reconstructed block and/or frame before ALF filtering. An ALF flag can then be signaled with the encoded bitstream to indicate whether ALF filtering is enabled or disabled for the block. In some cases, the ALF flag can specify whether luma ALF filtering is enable or disabled, whether luma and chroma ALF filtering are enabled or disabled, or whether ALF filtering is disabled altogether. At the decoder side, the decoder can use the ALF flag to determine whether to perform ALF filtering for the block in the reconstructed image and/or the reconstructed image.

Figure 2B:
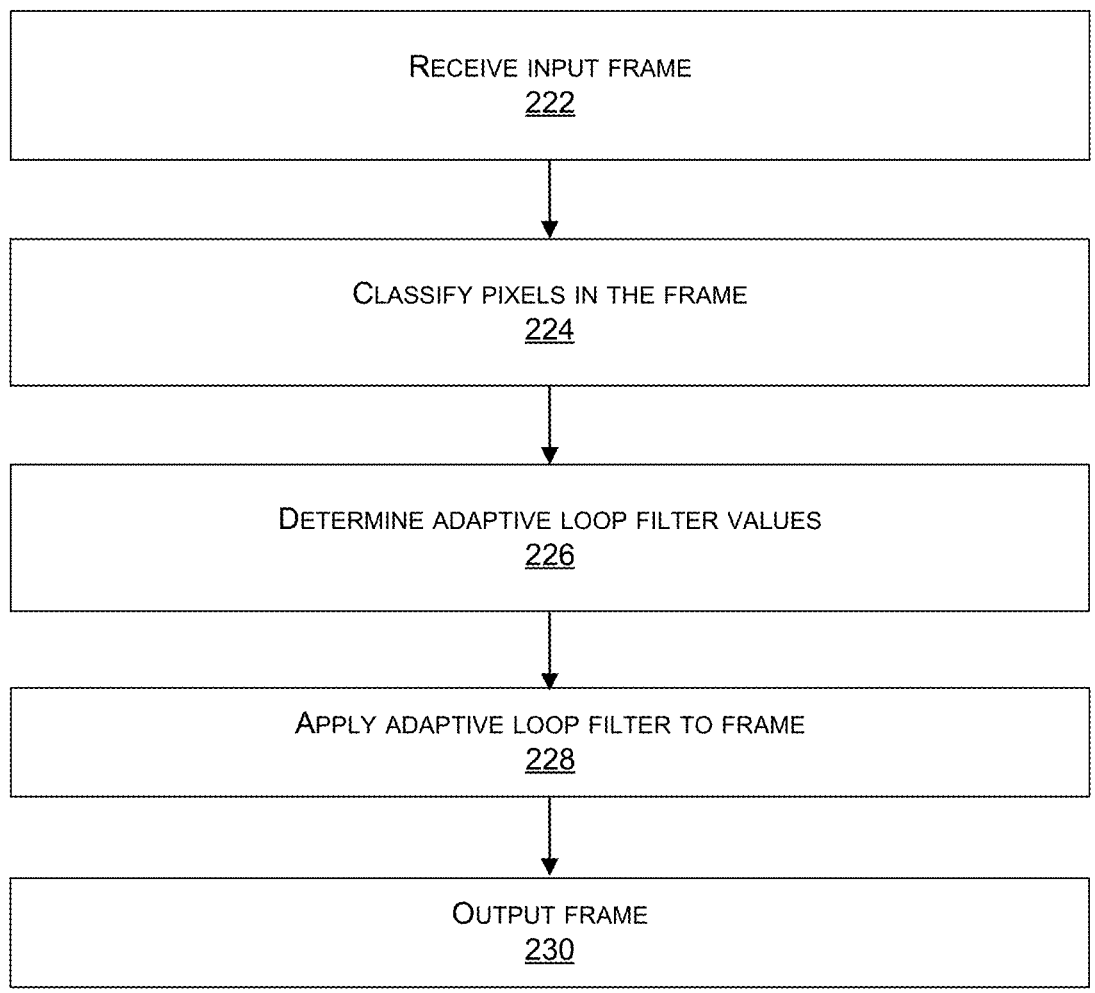
FIG. 2B is a flowchart of an example method for ALF filtering, in accordance with some examples of the present disclosure.

FIG. 2B is a flowchart of an example method 220 for ALF filtering with modifications for filtering near raster-scan slice boundaries when filtering with pixels from across raster-scan slice boundaries is disables. In various examples, the operations of method 220 can be performed by an encoding or a decoding device (e.g., a video processing device). In the example of FIG. 2B, at block 222, the video processing device can receive an input frame. The input frame can include color components, such as luma and chroma components, as previously explained. In some examples, the input frame can include blocks in a frame encoded by the encoding device 104 prior to the ALF filtering. In some examples, the input frame can be a frame associated with an image and/or a video sequence.

At block 224, the encoding device 104 can classify luma components in the frame. In some examples, the encoding device 104 can also classify chroma components in the frame. The classification can be applied to a luma component at a block level (e.g., at a 4×4 block level) or at a sample level (for each sample of the frame). In some cases, the classification can include classifying the direction and activity for each block or sample associated with each luma component in the frame. In some examples, for the luma component, 4×4 blocks in the whole frame, where N represents a number greater than 0, can be classified based on a 1D Laplacian direction (e.g., up to 5 directions) and 2D Laplacian activity (e.g., up to 5 activity values). In some cases, the encoding device 104 can calculate a direction $Dir_b$ and an unquantized activity $Act_b$. In some cases, $Act_b$ can be further quantized to a range of 0 to 4, inclusively.

As described herein, examples can include limitations on use of cross-slice boundary data. The disabling of loop filtering across slice boundaries can include limits on data that would be used in classification operations. As described in detail below, examples can use duplicate pixels from the slice that a central group of pixels is in to replace data from pixels that are across a slice boundary from the central group of pixels when performing classification operations for raster-scan data where cross-slice data use is disabled. Additional details of such duplication operations are described below.

In some cases, values of two diagonal gradients, in addition to the horizontal and vertical gradients used in an existing ALF, can be calculated using a 1D Laplacian. As it can be seen from Equations (1) to (4) below, the sum of gradients of all pixels within an 8×8 window that covers a target pixel can be employed as the represented gradient of the target pixel, where R(k,l) is the reconstructed pixel(s) at location (k,l) and indices i and j refer to the coordinates of the upper-left pixel in the 4×4 block (e.g., from the 4×4 blocks in the frame). Each pixel is associated with four gradient values, with a vertical gradient denoted by $g_v$, a horizontal gradient denoted by $g_h$, a 135 degree diagonal gradient denoted by $g_{d1}$, and a 45 degree diagonal gradient denoted by $g_{d2}$.

$$g_v = \sum_{k=i-2}^{i+5} \sum_{l=j-2}^{j+5} V_{k,l}, \quad \text{Equation (1)}$$

$V_{k,l}$=|2R(k,l)−R(k,l−1)−R(k,l+1)| when both of k and j are even numbers or both of k and j are not even numbers; 0, otherwise.

$$g_h = \sum_{k=i-2}^{i+5} \sum_{l=j-2}^{j+5} H_{k,l}, \quad \text{Equation (2)}$$

$H_{k,l}$=|2R(k,l)−R(k−1,l)−R(k+1,l)| when both of k and j are even numbers or both of k and j are not even numbers; 0, otherwise.

$$g_{d1} = \sum_{k=i-2}^{i+5} \sum_{l=j-3}^{j+5} D1_{k,l}, \quad \text{Equation (3)}$$

$D1_{k,l}$=|2R(k,l)−R(k−1,l−1)−R(k+1,l+1)| when both of k and j are even numbers or both of k and j are not even numbers; 0, otherwise.

$$g_{d2} = \sum_{k=i-2}^{i+5} \sum_{j=j-2}^{j+5} D2_{k,l}, \quad \text{Equation (4)}$$

$D2_{k,l}$=|2R(k,l)−R(k−1,l+1)−R(k+1,l−1)| when both of k and j are even numbers or both of k and j are not even numbers; 0, otherwise.

To assign the directionality $Dir_b$, the ratio of the maximum and minimum of the horizontal and vertical gradients, denoted by $R_{h,v}$ in Equation (5) below, and the ratio of the maximum and minimum of two diagonal gradients, denoted by $R_{d0,d1}$ in Equation (6) (can also be denoted as $R_{d1,d2}$ in some cases), are compared against each other with two thresholds $t_1$ and $t_2$.

$$R_{h,v} = g_{h,v}^{max}/g_{h,v}^{min} \text{ wherein} \quad \text{Equation (5)}$$

$$g_{h,v}^{max} = \max(g_h, g_v), g_{h,v}^{min} = \min(g_h, g_v),$$

$$R_{d0,d1} = g_{d0,d1}^{max}/g_{d0,d1}^{min} \text{ wherein} \quad \text{Equation (6)}$$

$$g_{d0,d1}^{max} = \max(g_{d0}, g_{d1}), g_{d0,d1}^{min} = \min(g_{d0}, g_{d1})$$

By comparing the detected ratios of the horizontal and vertical gradients and the diagonal gradients, five direction modes (e.g., $Dir_b$ within the range of [0, 4] inclusive), are defined in Equation (7) below. The values of $Dir_b$ and its physical meaning are described in Table 1 below.

$$D = \begin{cases} 0 & R_{h,v} \leq t_1 \,\&\&\, R_{d0,d1} \leq t_1 \\ 1 & R_{h,v} > t_1 \,\&\&\, R_{h,v} > R_{d0,d1} \,\&\&\, R_{h,v} > t_2 \\ 2 & R_{h,v} > t_1 \,\&\&\, R_{h,v} > R_{d0,d1} \,\&\&\, R_{h,v} \leq t_2 \\ 3 & R_{d0,d1} > t_1 \,\&\&\, R_{h,v} \leq R_{d0,d1} \,\&\&\, R_{d0,d1} > t_2 \\ 4 & R_{d0,d1} > t_1 \,\&\&\, R_{h,v} \leq R_{d0,d1} \,\&\&\, R_{d0,d1} \leq t_2 \end{cases} \quad \text{Equation (7)}$$

TABLE 1

Values of Direction and Its Physical Meaning

| Direction Values | Physical Meaning |
| --- | --- |
| 0 | Texture |
| 1 | Strong Horizontal/Vertical |
| 2 | Horizontal/Vertical |

TABLE 1-continued

Values of Direction and Its Physical Meaning

| Direction Values | Physical Meaning |
|---|---|
| 3 | Strong Diagonal |
| 4 | Diagonal |

The activity value Act can be calculated as:

$$\text{Act} = \sum_{k=i-2}^{i+5} \sum_{l=j-2}^{j+5} (V_{k,l} + H_{k,l}). \quad \text{Equation (8)}$$

In some cases, the Act value can be further quantized to the range of 0 to 4 inclusive, and the quantized value is denoted as Â. The quantization process from activity value Act to activity index Â is described below.

The quantization process can be defined as follows:

$$\text{avg\_var} = \quad \text{Equation (9)}$$

Clip_post(NUM_ENTRY − 1, (Act ∗ ScaleFactor) ≫ shift);

$$\hat{A} = \text{ActivityToIndex}[\text{avg\_var}],$$

where NUM_ENTRY is set to 16 (or other suitable value), ScaleFactor is set to 64 (or other suitable value), shift is (4+internal coded-bitdepth) or other suitable value, ActivityToIndex[NUM_ENTRY]={0, 1, 2, 2, 2, 2, 2, 3, 3, 3, 3, 3, 3, 3, 3, 4} or other suitable set of values, and function Clip_post(a, b) returns the smaller value between a and b.

In total, each 4×4 luma block can be categorized into one out of 25 (5×5) classes and an index is assigned to each 4×4 block according the value of $\text{Dir}_b$ and $\text{Act}_b$ of the block. The group index can be denoted as C and can be set equal to $5\text{Dir}_b+\hat{A}$, where Â is the quantized value of $\text{Act}_b$.

At block 226, the processing device can determine ALF coefficient values for the ALF, and at block 228, the encoding device 104 can apply the ALF filter to the frame. In some examples, the ALF filter shapes can determine the number of coefficients that will influence the filtering process. Non-limiting example filter shapes can include 5×5, 7×7, and 9×9 diamond shapes. FIGS. 3A and 3B illustrate example ALF filters that can be applied for chroma and luma filtering.

Figures 3A, 3B:
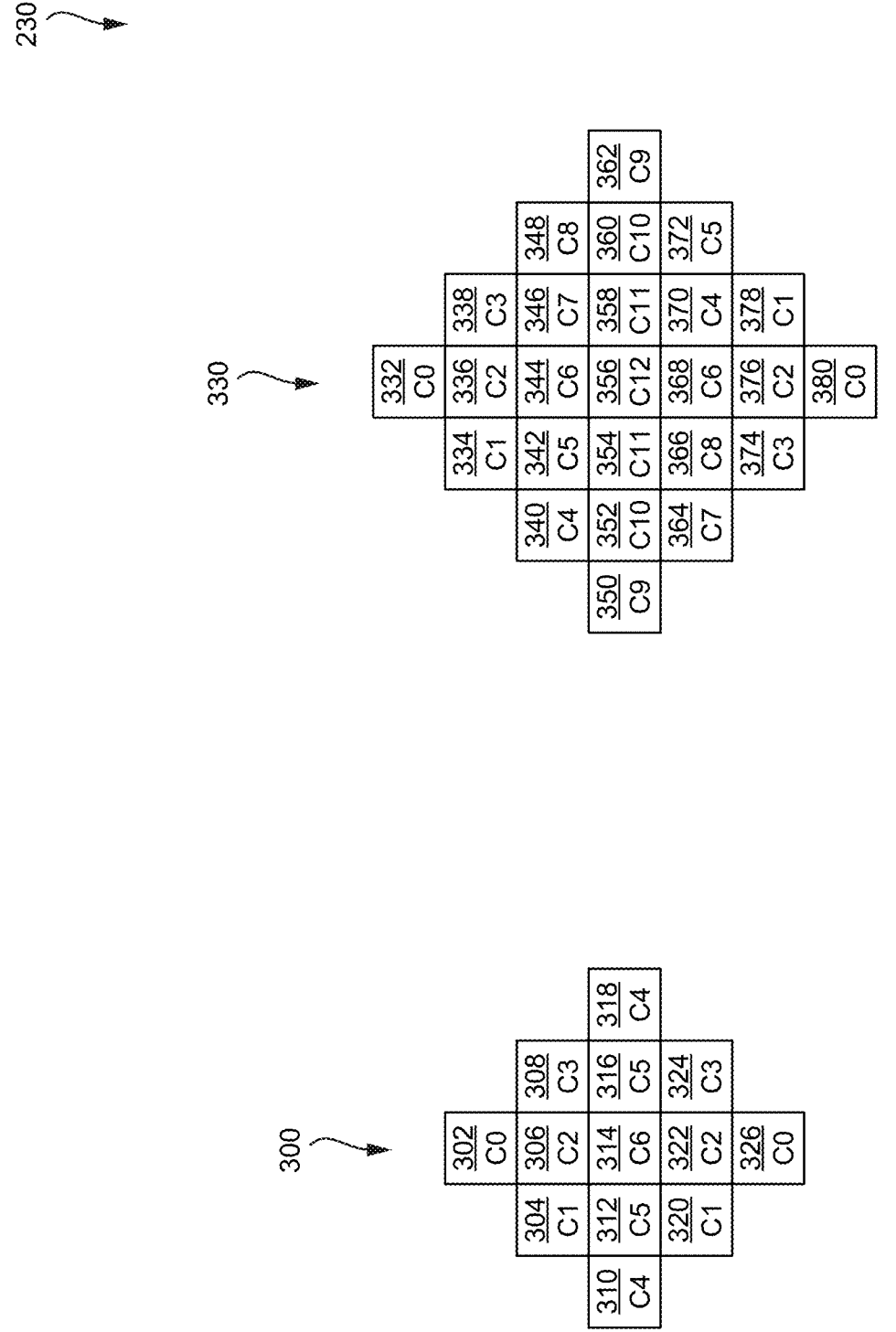
FIG. 3A is a diagram illustrating an example of chroma filter configuration, in accordance with some examples of the present disclosure.
FIG. 3B is a diagram illustrating an example of luma filter configuration, in accordance with some examples of the present disclosure.

With reference to FIG. 3A, an example filter 300 for chroma filtering is shown. The filter 300 is a 5×5 filter and has a diamond shape. The filter 300 includes cells 302 through 326 for 13 input chroma samples. The cells 302 through 326 include coefficient values (e.g., C0 through C6) to be applied to corresponding chroma samples. Each cell (302 through 326) can include a filter coefficient value that is applied to a chroma sample associated with that cell.

With reference to FIG. 3B, an example filter 330 for luma filtering is shown. The filter 330 is a 7×7 filter and has a diamond shape. The filter 330 includes cells 332 through 380 for 25 input luma samples. The cells 332 through 380 include coefficient values (e.g., C0 through C12) to be applied to corresponding luma samples. Each cell (332 through 380) can include a filter coefficient value that is applied to a luma sample associated with that cell.

In some examples, a 5×5 filter, such as filter 300 shown in FIG. 3A can be applied to chroma components, and a 7×7 filter, such as filter 330 shown in FIG. 3B, can be applied to the luma component.

For example, with reference to FIG. 3A, each cell (302 through 326) in the filter 300 can have a filter coefficient f(k, l), and each of these values in the cell can be applied to a corresponding pixel. In some cases, the center of the filter 300 (e.g., cell 314) can be placed on or applied to a pixel and the remaining cells (e.g., cells 302-312 and 316-326) of the filter 300 can be placed on or applied to surrounding or neighboring pixels.

Moreover, with reference to FIG. 3B, each cell (332 through 380) in the filter 330 can have a filter coefficient f(k, l), and each of these values in the cell can be applied to a corresponding pixel. In some cases, the center of the filter 330 (e.g., cell 356), can be placed on or applied to a pixel and the remaining cells (e.g., cells 332-354 and 358-380) of the filter 330 can be placed on or applied to surrounding or neighboring pixels. In both cases, example implementations can have a configuration to block application of filter values to pixels across slice boundaries. In such implementations, values for the filter positions that are blocked by the cross-slice limitations are needed to prevent errors in the operations of the filter. For example, if cells 338, 346, and 348 are configured to be applied to pixels in a slice that is different than the pixels for the remaining portions of the filter (e.g., the filter is operating at a corner between slices as part of raster-scan operations as discussed below for FIG. 4A), then replacement values are needed for those cell locations in the filter, since the filter is blocked from accessing the corresponding pixels (e.g., due to the limit on applying ALF across slice boundaries). Examples described herein provide such replacement values by duplicating or using values from pixels in the same slice to generate padded values for unavailable pixels or available pixels that are being replaced, and using those padded values in filters.

At block 230, the video processing device can generate an output frame. The output frame can include a reconstructed image after the ALF filtering. The output frame can include pixel values for luma and chroma components, calculated based on the filter coefficients, as previously explained.

In some examples, the pixel values generated for samples by the ALF filtering method 220 can be compared with the pixel values of the original samples to determine whether luma and chroma filtering should be enabled. For example, if the luma filtering results provide better image quality than the original luma samples, the encoding device 104 can enable luma filtering for the frame. If the chroma filtering results provide better image quality than the original chroma samples, processing device can enable chroma filtering for the frame.

In some cases, the processing device can signal an ALF flag with an encoded bitstream. The signaled ALF flag can indicate to the processing device whether ALF filtering is enabled or disabled for a particular frame. Such signaling can also be used to indicate whether ALF filtering (e.g., when enabled) is allowed to access pixel data from across slice boundaries.

Returning to FIG. 2B, when the output frame is generated by an encoding device (e.g., device 104), the image data can be transmitted to a decoding device 112 in an encoded bitstream. The encoded bitstream can include signaling information, as previously explained. The decoding device 112 can receive the encoded bitstream, decode the bitstream, and use the signaling information to apply ALF filtering for frames in the bitstream when such filtering is enabled.

Figure 2C:
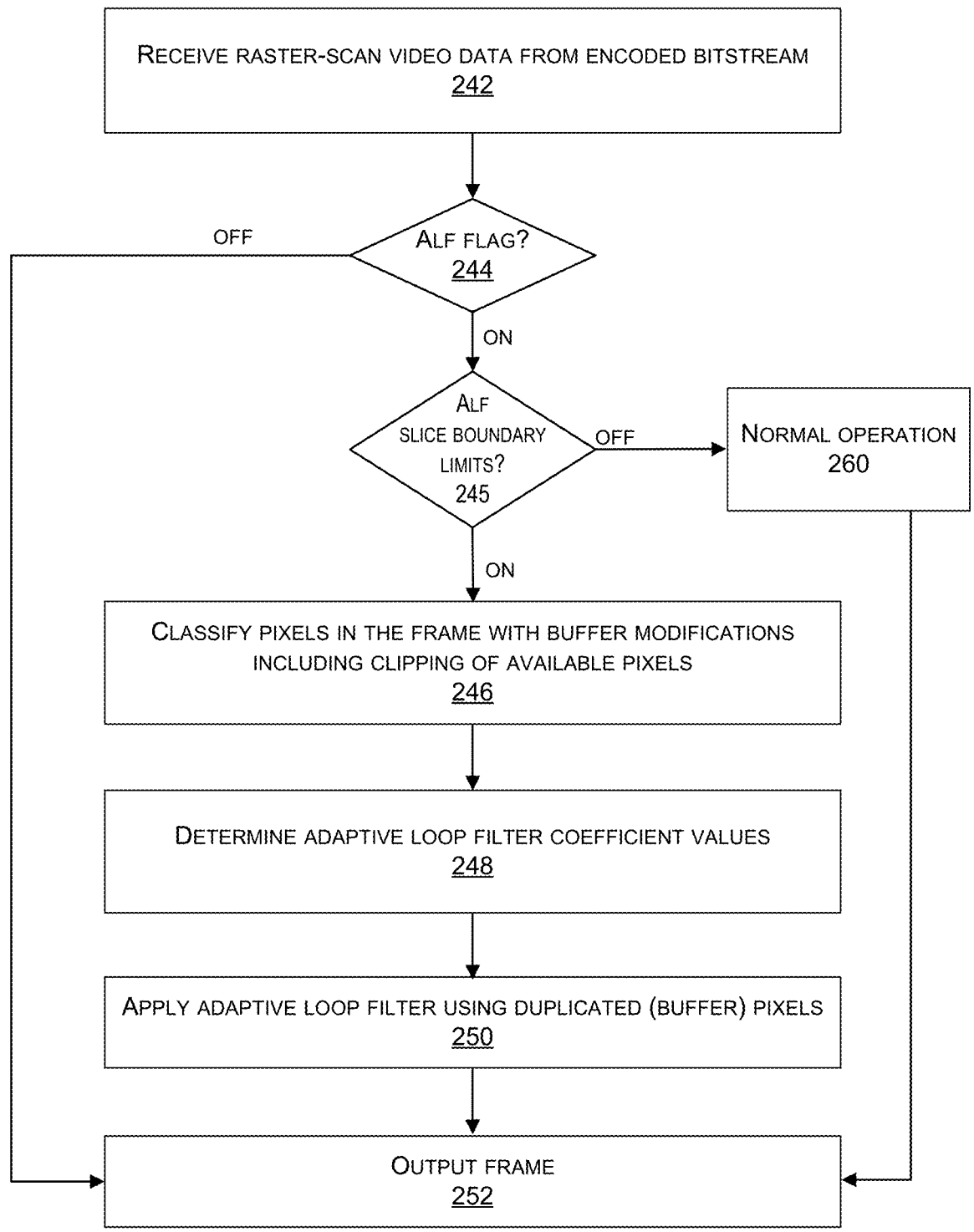
FIG. 2C is a flowchart illustrating an example method for ALF filtering, in accordance with some examples of the present disclosure.

FIG. 2C is a flowchart illustrating an example method 240 for ALF filtering implemented by a decoding device 112. In the example of FIG. 2C, at block 242, the decoding device 112 can receive a frame from the encoded bitstream provided by the encoding device 104. In some cases, the frame can be a reconstructed or decoded frame from the encoded bitstream. Moreover, in some examples, the frame can include luma and chroma components, as previously explained.

At block 244, the decoding device 112 can determine if an ALF flag signaled with the frame is on or off. If the ALF flag is off, indicating the ALF filtering is disabled, the decoding device 112 can output the frame at block 252. The ALF flag can indicate whether luma filtering is enabled (or disabled), whether both luma filtering and chroma filtering is enabled (or disabled), or whether a luma and/or chroma component is enabled (or disabled). If luma filtering is enabled, the ALF filtering performed by the decoding device 112 as described herein can include luma filtering. If luma and chroma filtering are both enabled, the ALF filtering performed by the decoding device 112 as described herein can include both luma and chroma filtering. If chroma filtering is enabled, the ALF filtering performed by the decoding device 112 as described herein can include chroma filtering. If the ALF flag is on, indicating the ALF filtering is enabled for any aspect of the video stream, at block 245, the decoding device 112 can check for a flag to determine whether the enabled ALF filtering is allowed to use data from another slice across slice boundaries. If the use of such data is enabled, the processing can proceed in a standard fashion, with the filter cells (e.g., as illustrated in FIGS. 3A and 3B) using the corresponding position pixel data, in block 260.

If limits are enabled (e.g., on) that prevent such cross slice pixel data use during ALF filtering, then the decoding device 112 proceeds with block 246 rather than block 260. Block 260 begins operations modified to prevent errors in raster-scan ALF filtering with cross-slice pixel use disabled in block 245, with the decoding device 112 configured to classify pixels in the frame. These operations can use replacement (e.g., duplicate) pixels as described further below. In some examples, the pixels being processed are not near a slice boundary, and so the pixels will be processed normally even if ALF slice boundary limits are on. Some other pixels not near slice boundary limits are near sub-picture boundaries, and include special operations to address pixels that are outside of a sub-picture boundary. As described below, special clipping operations can be used along the sub-picture boundaries to identify unavailable data for ALF filters. Standard video coding, however, does not have similar operations implemented for slice boundaries. Examples described herein include operations to treat a slice boundary as a sub-picture boundary, including clipping operations to generate duplicate pixels for both available and unavailable pixels with certain raster-scan configurations occur along a slice boundary. Details of such operations to classify pixels in various raster-scan configurations are described with respect to specific configurations presented in FIG. 4B through FIG. 15.

At block 248, the decoding device 112 can determine ALF coefficients for each pixel in the frame, and at block 250 the decoding device 112 can apply the ALF filters with the ALF coefficients to the frame. The decoding device 112 can determine and apply the ALF coefficients as previously explained with respect to blocks 226 and 228 shown in FIG. 2B, including the use of duplicate pixel data where needed to prevent errors where data from across slice boundaries is disabled. As described above, examples herein include operations for particular raster-scan configurations where ALF coefficients which are technically available to be used can nevertheless be clipped and replaced with data from other duplicated pixels in order to avoid errors and improve device operation while reusing existing functionality for handling sub-picture boundaries to address the problems with slice boundaries along L-shaped boundaries of raster-scan slices.

At block 252, the decoding device 112 can generate an output frame. If the ALF flag was off at block 244, the output frame can include a reconstructed image without the ALF filtering. If the ALF flag was on at block 244, the output frame can include a reconstructed image after the ALF filtering. The output frame can include pixel values for luma and chroma components, calculated based on the filter coefficients, as previously explained. When pixel data for ALF filtering from across slice boundaries is disabled, the calculations can also be based on duplicated pixel data from the slice containing the pixel being processed (e.g., duplicates from in-slice pixel).

As described in more detail below, when loop filtering across slice boundaries is disabled, certain pixels for loop filtering are not available for loop filtering operations. These loop filtering operations include classification operations (e.g., in block 224 and block 246) as well as the filters applied in blocks 228 and 250. Thus, examples described herein for duplicating or using pixels to replace pixels with padded values can be performed both for the classification filtering operations as well as for determining loop filter values to be applied as part of filtering (e.g., ALF) of image data.

Figure 4A:
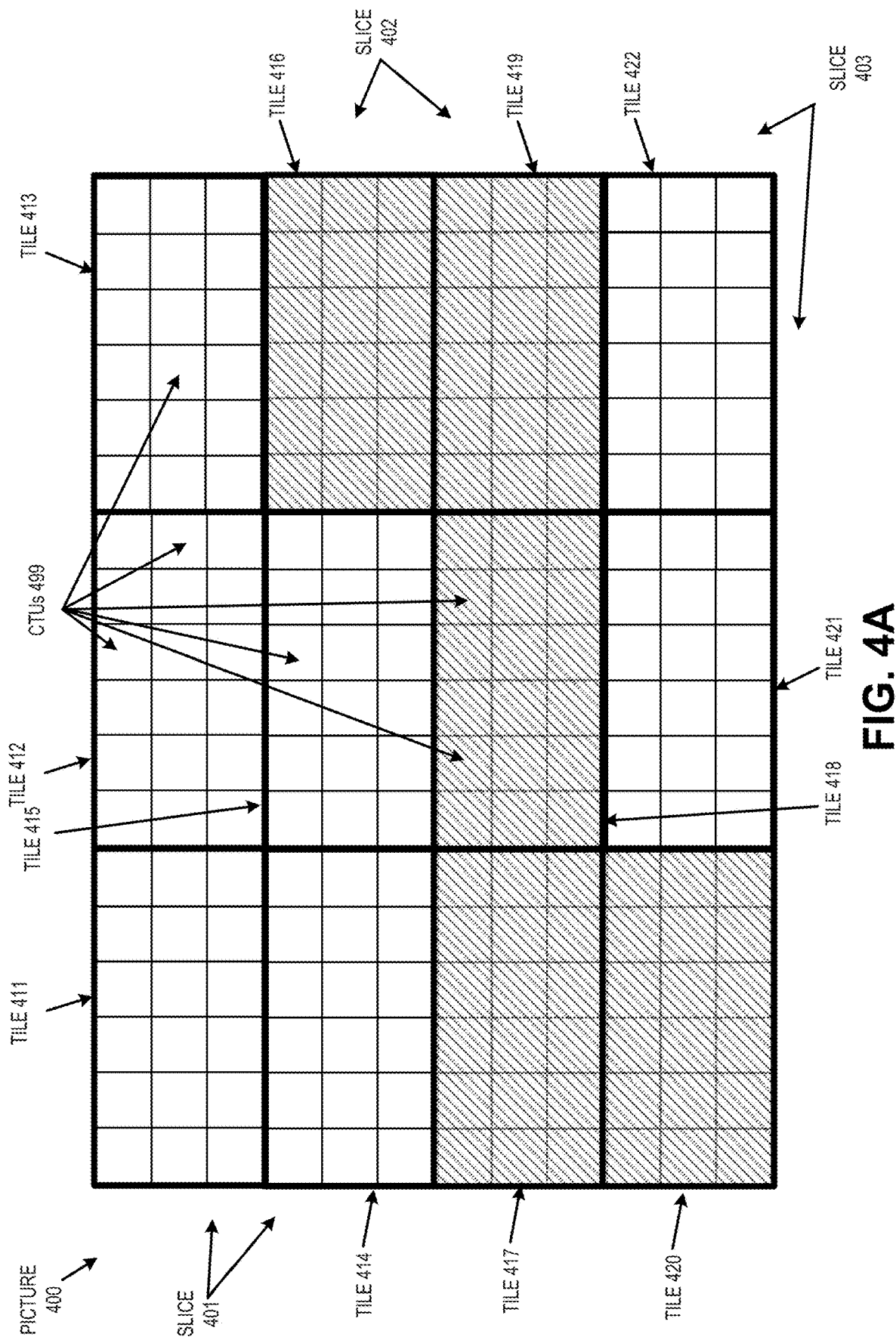
FIG. 4A is a diagram illustrating aspects of a raster-scan configuration, in accordance with some examples.

FIG. 4A is a diagram illustrating a picture 400 with a raster-scan configuration, where slices 401, 402, and 403 of picture 400 can include tiles in different rows. As illustrated, picture 400 includes tiles 411, 412, 412, 413, 414, 415, 416, 417, 418, 419, 420, 421, and 422. These 12 tiles each include CTUs 499 (e.g., blocks), and are divided among the illustrated slices. Slice 401 includes tiles 411-415, slice 402 includes tiles 416-420, and slice 403 includes tiles 421 and 422. For tiles and CTUs, which border tiles and CTUs in other slices, the edge is considered a boundary with the other slices. In illustrated picture 400 of FIG. 4A, various different slice boundaries can occur and impact the filtering values used for pixels near the boundaries. For example, the bottom-rightmost block of tile 412 can, in some instances, have a filter that is structured to use data from pixels of the top-leftmost block of tile 416. As these blocks are at a slice boundary, if ALF slice boundary limits are in place, as described above for block 245, then the pixels are unavailable to provide the data to the filter, and the data provided to the filter is generated by other means. Additional details of adaptive loop filter is not described followed by particular details of sub-picture boundary processing for adaptive loop filtering that can be adapted for slice boundary processing for adaptive loop filtering in accordance with examples described herein.

In some cases, adaptive loop filtering is used in video coding to minimize the mean square error between original samples and decoded samples by using an adaptive filter, which can be a Wiener-based adaptive filter or other suitable adaptive filter. An adaptive loop filter (ALF) is a loop filter (e.g., for filtering a picture after reconstruction and before being output and/or before being stored in a picture buffer, such as a decoded picture buffer). Example loop filters are described below with respect to FIG. 18 and FIG. 19.

Figure 4B:
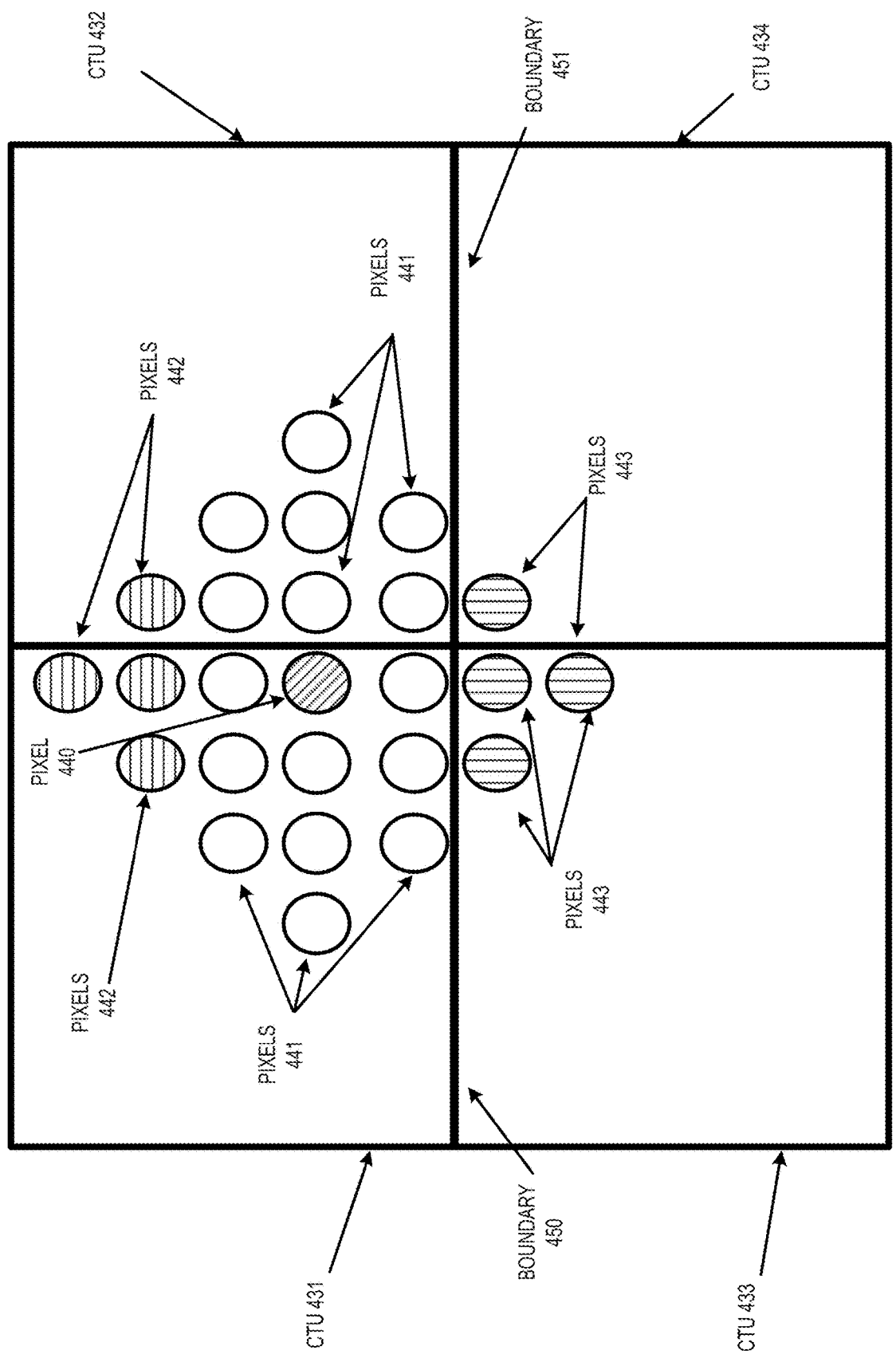
FIG. 4B is conceptual diagrams illustrating an example of a filter pattern for ALF filtering, in accordance with some examples.
Figure 5:
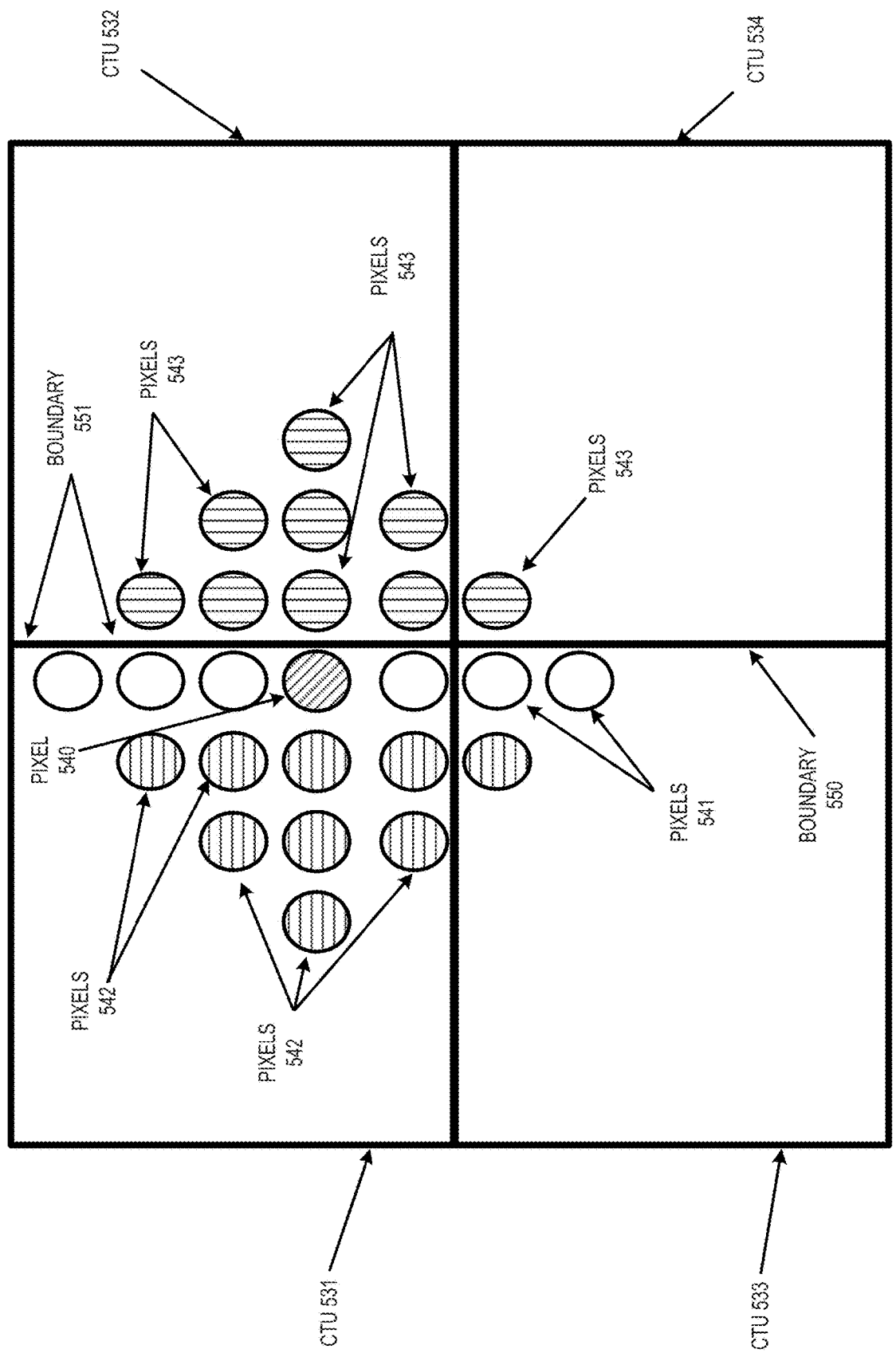
FIG. 5 is a conceptual diagram illustrating an example of a filter pattern for ALF filtering, in accordance with some examples.
Figure 6:
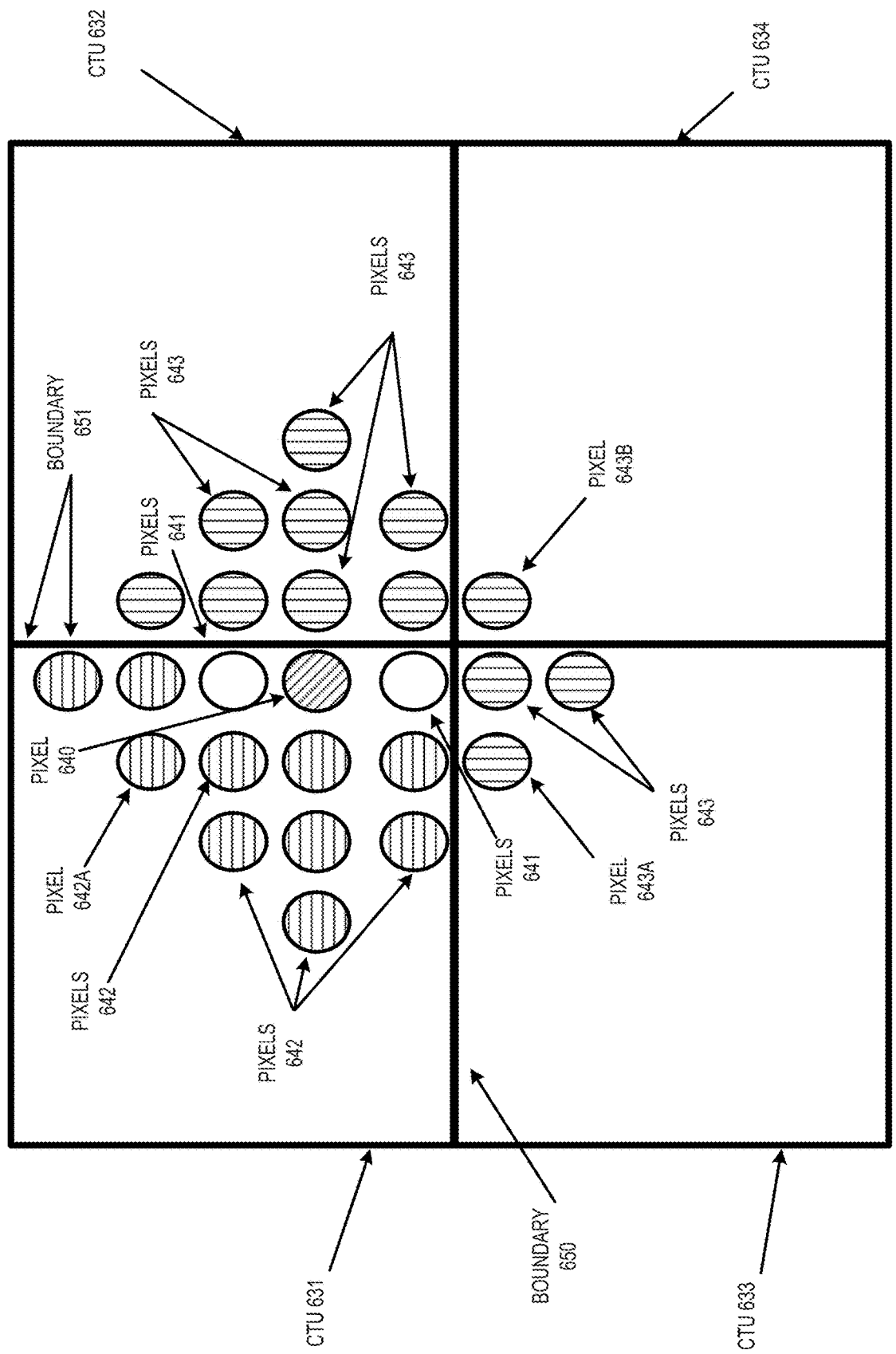
FIG. 6 is a conceptual diagram illustrating an example of a filter pattern for ALF filtering, in accordance with some examples.

In VVC draft 6, which is hereby incorporated by reference in its entirety and for all purposes, an ALF may be applied across sub-picture boundaries. In some cases, when a current to-be-filtered pixel (which is a pixel that is to be filtered) is configured to use one or more pixels on the other side of one or more sub-picture boundaries for filtering, if an ALF that crosses boundaries (e.g., sub-picture boundaries) is not allowed, symmetrical padding is applied, for example as shown in FIG. 4B, FIG. 5, and FIG. 6. For example, FIG. 4B is a diagram illustrating an example of symmetrical padding when a current to-be-filtered pixel is configured to use pixels on the other side of horizontal boundary for filtering. FIG. 5 is a diagram illustrating an example of symmetrical padding when a current to-be-filtered pixel is configured to use pixels on the other side of vertical boundary for filtering. FIG. 6 is a diagram illustrating an example of symmetrical padding when a current to-be-filtered pixel is configured to use pixels on the other sides of both horizontal and vertical boundaries for filtering.

FIG. 4B is conceptual diagrams illustrating an example of a filter pattern for ALF filtering, in accordance with some examples. FIG. 4B shows the four CTUs 431-434. These CTUs can be, for example, part of CTUs 499 at a boundary that includes boundary 450 and boundary 451 between CTUs in different parts of picture 400. The configuration can include a boundary between different sub-pictures, such that CTU 431 and CTU 432 are in one sub-picture, and CTU 433 and CTU 434 are in a different sub-picture, with boundary 450 between CTU 431 and CTU 433 as well as boundary 451 between CTU 432 and CTU 434 at the border between the two sub-pictures. Within each CTU are pixels with image data (e.g., luma and chroma) organized in a grid based on the specific CTU, tile, and slice structure of the picture 400. When an ALF filter is applied (e.g., a 7×7 filter as illustrated with the center of the filter applied at pixel 440), a loop is performed to apply the filter at each pixel. The filter as applied at each pixel uses not only the pixel, but the surrounding pixels, to process the image data and improve image quality. In some examples, for more efficient operation, ALF filters can be blocked from using pixel data from other slices. When all pixels in the filter pattern are in the same slice, the filter blocking does not cause an issue.

As illustrated, however, pixels 443 are across a boundary. In the example of FIG. 4B, pixel 440 is being processed with an ALF filter, similar to the filter 300 and filter 330 described in FIGS. 3A and 3B. The filter with the illustrated 7×7 arrangement is set to be applied to the 7×7 array of pixels with pixel 440 at the center of the filter pattern. However, the filter is not able to use the image data for pixels 443. For example, pixels 443 are unavailable as they are positioned across the sub-picture border associated with boundary 450 and boundary 451. In order for the filter to perform correctly, replacement data is needed for the unavailable pixels 443. As described both above and in additional detail below, symmetrical padding around pixel 440 can be used, such that data from pixels 441 is used as replacement data for the unavailable pixels 443 as well as a group of pixels symmetrical to the unavailable pixels shown as available pixels 442. The data pixels 442 is padded with the data from pixels 441 to provide acceptable filtering results with the ALF filter to process pixel 440. In the process described above in FIG. 2C, block 246 includes identifying the unavailable pixels and the pixels to be used for padding, and block 248 involves setting the ALF coefficient values, including the padded values used for the unavailable pixels. In block 250, the ALF is applied using the identified coefficient values, which include padded values from the example for pixel 440, as well as other such pixels near the boundary which would similarly have padded samples.

FIG. 5 and FIG. 6 illustrate the padding concept for different CTU configurations. FIG. 5 is a conceptual diagram illustrating an example of a filter pattern for ALF filtering, in accordance with some examples. The diagram of FIG. 5 includes a vertical border at boundary 550 and boundary 551, as compared to the horizontal border of FIG. 4B. Similar to FIG. 4B, FIG. 5 illustrates an ALF filter pattern for processing a pixel 540 at the center of the 7×7 pattern. The pixels 543 in CTU 532 and CTU 534 are unavailable due to the pixels 543 being across the boundary 550 and boundary 551 from CTU 531 that includes pixel 540. CTU 533 is not across the boundary relative to pixel 540, and so pixels in CTU 533 are available. As described above, symmetrical padding around the column of pixels 541 including pixel 540 can be used to pad data for both available pixels 542 and also to pad the unavailable pixels 543. The data from pixels 541 and updated (e.g., padded) pixels 542 and 543 can then be used to generate the samples for ALF operations. Pixels 542 are padded even though the data is available for those pixels due to the symmetrical padding configuration.

FIG. 6 is a conceptual diagram illustrating an example of a filter pattern for ALF filtering, in accordance with some examples. FIG. 6 is combination of the examples of FIG. 4B and FIG. 5 above, as the boundary is at a corner, and includes horizontal boundary 650 between CTU 631 and CTU 633, as well as vertical boundary 651 between CTU 631 and CTU 632. CTU 631 and pixel 640 in CTU 631 are on one side of the boundary (including horizontal boundary 650 and vertical boundary 651), and CTUs 632, 633, and 634 as well as pixels 643 are on the other side of the boundary. In the example of FIG. 6, because the boundary 650 and the boundary 651 are not continuous (as is the case with the boundaries 450 and 451 in the example of FIG. 4B and with the boundaries 550 and 551 in the example of FIG. 5), a multi-step padding process can be used. For example, the pixels 643 in CTU 633 can be padded from pixels 642 and pixel 641 in CTU 631 positioned symmetrically about pixel 640, similar to the padding from FIG. 5. In the example of FIG. 6, however, the pixels 643 from CTU 632 that would be used to pad pixel 643B are unavailable, in which case the initial padding operation across boundary 650 around pixel 640 only pads the pixels 643 in CTU 633. For example, at first, along boundary 651, pixels in the same column of pixel 641 are used to replace pixels 642A, 642, 643A, 643B and 643; at second, along boundary 650, pixels in the same rows of 641 are used to replace the top two rows and bottom two columns of the pixels in the filter template.

Figure 7:
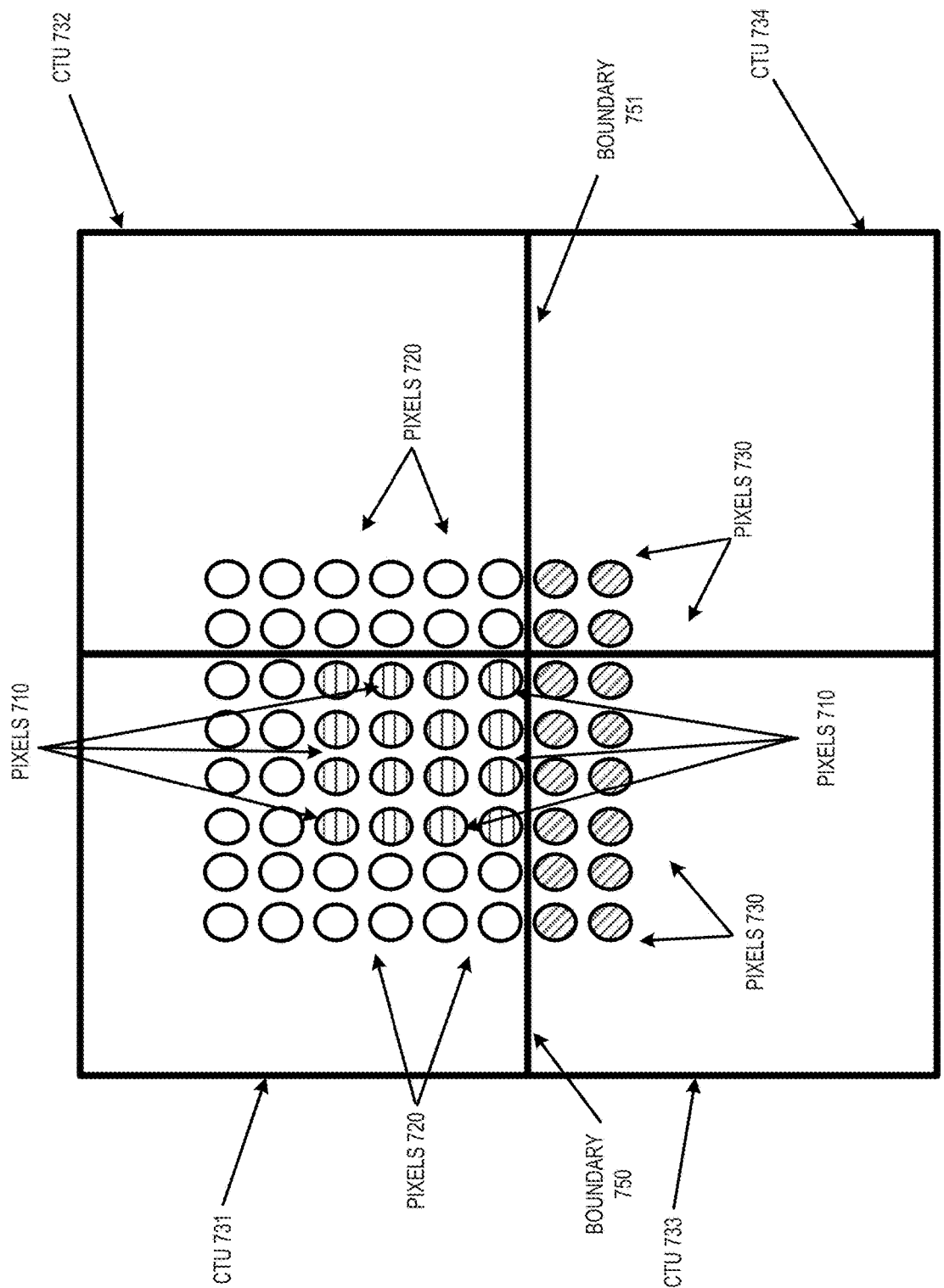
FIG. 7 is a conceptual diagram illustrating an example of a filter pattern for classification or activity filtering, in accordance with some examples.
Figure 8:
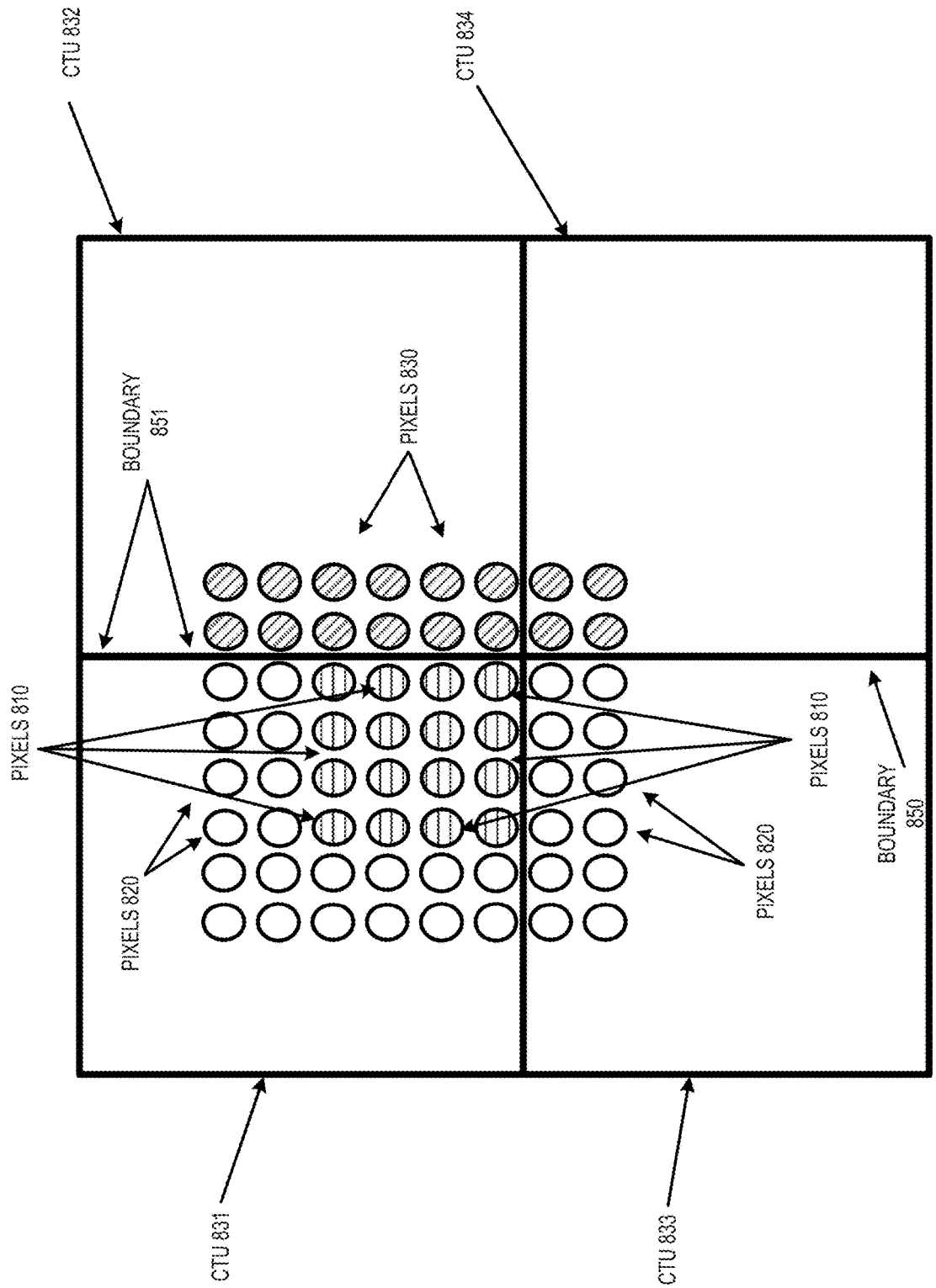
FIG. 8 is a conceptual diagram illustrating an example of a filter pattern for classification or activity filtering, in accordance with some examples.
Figure 9:
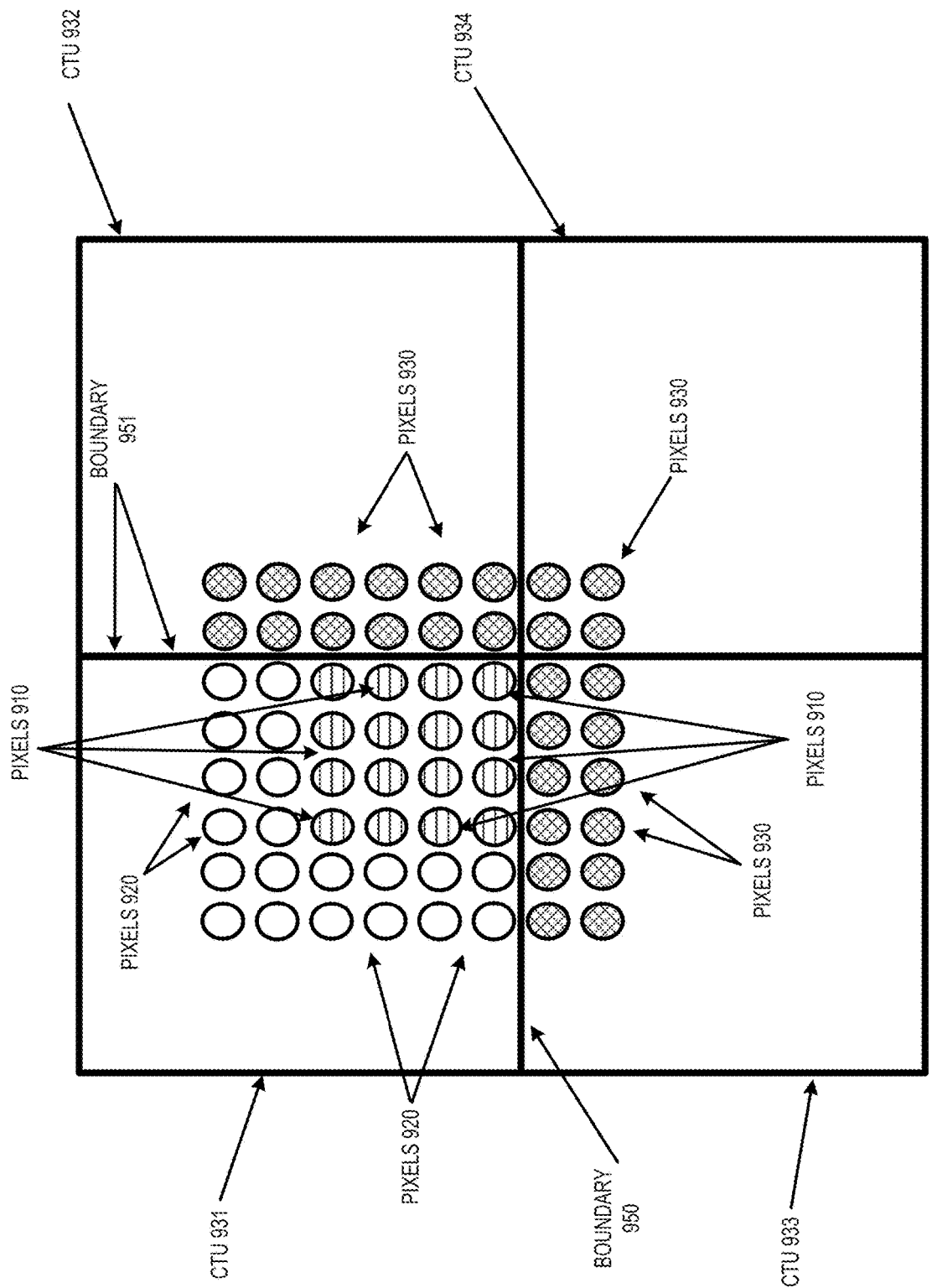
FIG. 9 is a conceptual diagram illustrating an example of a filter pattern for classification or activity filtering, in accordance with some examples.

In some examples, when a current to-be-filtered pixel is configured to use Laplacian values on the other side of sub-picture boundaries for filtering, and if an ALF that crosses boundaries (e.g., sub-picture boundaries) is not allowed, these Laplacian values are not used, and the activity value is renormalized based on the number of available Laplacian values in the surrounding area. FIG. 7, FIG. 8, and FIG. 9 are examples showing current to-be-filtered pixels that is configured to use Laplacian values on the other side of a boundary for classification. For example, FIG. 7 is a diagram illustrating an example of current to-be-filtered pixels that is configured to use Laplacian values on the other side of a horizontal boundary for classification. FIG. 8 is a diagram illustrating an example of current to-be-filtered pixels that is configured to use Laplacian values on the other side of a vertical boundary for classification. FIG. 9 is a diagram illustrating an example of a current to-be-filtered pixel that is configured to use Laplacian values on the other sides of both horizontal and vertical boundaries for classification.

In some examples, during an ALF process, four clipping positions can be set for classification (e.g., clipLeftC, clipRightC, clipTopC and clipBottomC) and filtering (e.g., clipLeftF, clipRightF, clipTopF and clipBottomF). In some such examples, if a current to-be-filtered pixel is positioned to use pixels crossing its left CTU boundary for filtering and its left CTU boundary is also a sub-picture boundary, clipLeftF is set as the left CTU boundary. If the current to-be-filtered pixel does not use pixels from a boundary, clipLeftF it is set as a default value, such as −128. The related values clipRightF, clipTopF and clipBottomF can be set in similar ways. In some such examples, if a current to-be-filtered pixel is configured to use Laplacian values crossing its left CTU boundary for classification and its left CTU boundary is also a sub-picture boundary, clipLeftC is set as left CTU boundary; otherwise, it is set as −128. In such examples, clipRightC, clipTopC and clipBottomC are set in similar ways. The pixels that are on the other side of clipLeftF, clipRightF, clipTopF and clipBottomF are not used and symmetrical padding is applied. The Laplacian values on the other side of clipLeftC, clipRightC, clipTopC and clipBottomC are not used and the activity values are renormalized based on number of used Laplacian values. These clip operations can be used with the illustrated filtering configurations of FIG. 7, FIG. 8, and FIG. 9, as described below.

FIG. 7 is a conceptual diagram illustrating an example of a filter pattern for classification or activity filtering, in accordance with some examples. FIG. 7 includes current to-be-filtered pixels 710 as described above. Pixels 720 and 730 are configured to be used to provide Laplacian values. As described however, pixels 730 in CTU 733 and CTU 734 are unavailable due to being across boundary 750 and boundary 751 from the pixels 710 and CTUs 731 and 732. Values for unavailable pixels 730 can be padded using scaled values from pixels 710 pixels 720 as described above. For example, clipBottomC operations can be used to clip the pixel data for pixels 730 from the pattern. The data for the clipped pixels can then be generated using renormalized activity values from any combination of pixels 720 and 710.

FIG. 8 is a conceptual diagram illustrating an example of a filter pattern for classification or activity filtering, in accordance with some examples. FIG. 8 is similar to FIG. 7, but with a vertical border along boundary 850 and boundary 851 instead of the horizontal border of FIG. 7. Pixels 830 are unavailable due to being in CTU 832 and CTU 834 which are across boundary 850 and boundary 851 from CTU 831, pixels 810, and CTU 833. In some examples, pixels 830 can be excluded using a clipRightC operation as described above, and then padded values can be generated using renormalized activity values from pixels 820 and 810.

FIG. 9 is a conceptual diagram illustrating an example of a filter pattern for classification or activity filtering, in accordance with some examples. Just as with FIG. 6, FIG. 9 is a configuration at a corner boundary, where CTU 932, CTU 933, and CTU 934 (e.g., including pixels 930) are in a different sub-picture than CTU 931 that includes pixels 910 and 920. As part of the configuration, pixels 910 and 920 are available. Pixels 930 in CTU 933 across boundary 950, pixels 930 across boundary 951, and pixels 930 in the diagonally adjacent CTU 934 are all unavailable for processing a current to-be-processed pixel of pixels 910. In such an example, clipRightC operations can be used to manage the unavailable pixels 930 in CTU 932, clipBottomC operations manage unavailable pixels 930 in CTU 933, and either or both of these operations manage unavailable pixels 930 in CTU 934.

Figure 10:
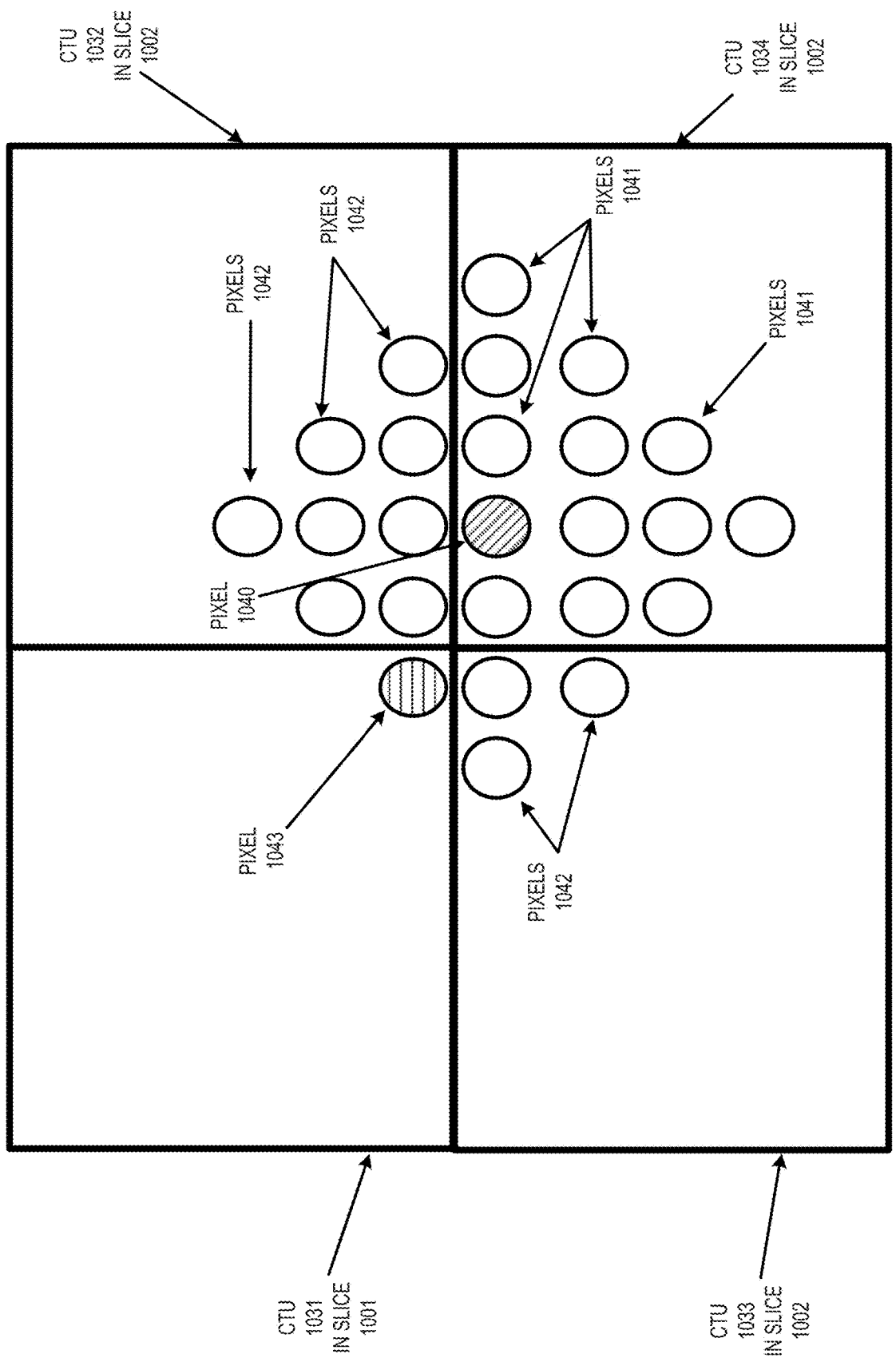
FIG. 10 is a conceptual diagram illustrating an example of a filter pattern for classification or activity filtering at a corner boundary between three slices, in accordance with some examples.
Figure 11:
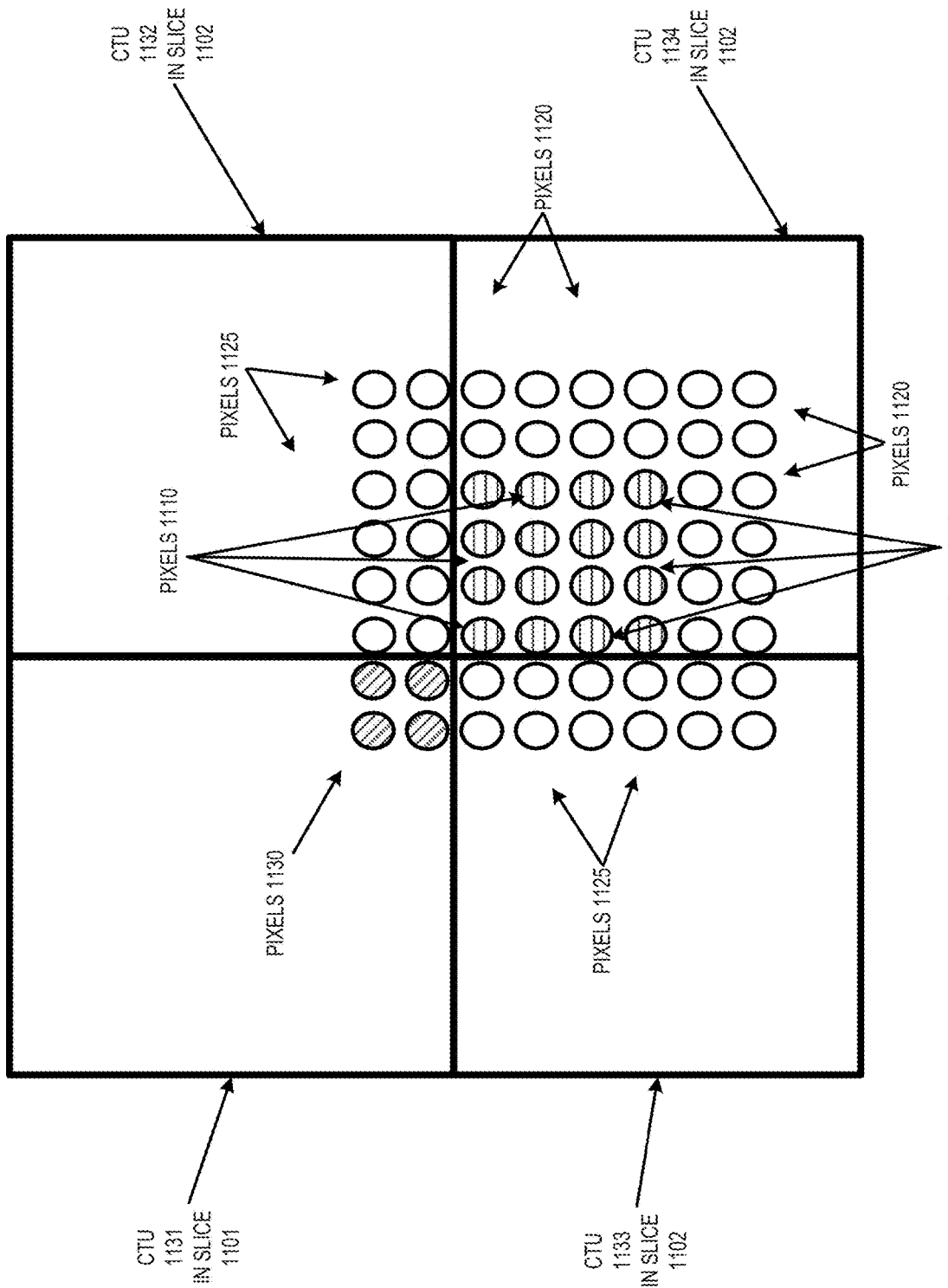
FIG. 11 is a conceptual diagram illustrating an example of a filter pattern for classification or activity filtering at a corner of a raster-scan slice, in accordance with some examples.

The above examples of FIG. 4B-FIG. 9 illustrate example operations that can be applied to sub-picture boundaries as described above. Problems can arise in the ALF process for crossing-boundary cases, such as those described above. For example, the current Specification JVET-O2001-vE does not cover all crossing-boundary cases for ALF. In one example, as shown in FIG. 10, a current to-be-filtered pixel is configured to use a pixel that is in the top-left CTU, and the top-left CTU is in a different slice. FIG. 10 and FIG. 11 illustrate configurations in which examples described herein can be used to address crossing-boundary cases not currently covered by existing boundary crossing solutions.

FIG. 10 is a conceptual diagram illustrating an example of a filter pattern for classification or activity filtering at a corner boundary between three slices, in accordance with some examples. FIG. 10 includes the top-left CTU 1031 in a slice 1001, while the current to-be-filtered pixel 1040 of CTU 1034 in a slice 1002. The example of FIG. 10 can be similar to the situation illustrated at the intersection of tile 415 (e.g., including CTU 1031) and tiles 416, 418, and 419 (e.g., including CTUs 1032, 1033, and 1034). In the configuration of FIG. 10, only pixel 1043 is unavailable. Pixels 1041 in the same CTU 1034 as pixel 1040, and pixels 1042 of CTUs 1032 and 1033, are all available. A single padding operation around the horizontal boundary similar to that described in FIG. 4B would result in available pixel data being overwritten and errors. Similarly, single padding operation around the vertical boundary similar to that described in FIG. 5 would result in available pixel data being overwritten. A multi-step process as described with respect to FIG. 6 would similarly cause problems with available data being overwritten. To address these issues, the clip operations described above can be used to convert the boundary where a corner-adjacent block such as CTU 1031 is the only CTU with unavailable pixels to clip available pixels from either CTU 1032 or CTU 1033. After such a clip operation (e.g., clipTop or clipLeft to pad either pixels 1042 of CTU 1032 or pixels 1042 of CTU 1033), a symmetrical padding around pixel 1040 can be applied, resulting in a complete set of data for the filter operations. Additional details of such operations applied to different configurations are discussed below with respect to FIG. 14 and FIG. 15.

FIG. 11 is a conceptual diagram illustrating an example of a filter pattern for classification or activity filtering at a corner of a raster-scan slice, in accordance with some examples. In additional to slice boundary conversion and clipping for filters as described above for FIG. 10, similar clipping of available pixels can be performed with classification filters such as those described above for FIG. 7, FIG. 8, and FIG. 9. In the example shown in FIG. 11, a current to-be-filtered pixel of pixels 1110 is configured to use Laplacian values in a top-left CTU 1131, and the top-left CTU 1131 is in a different slice 1101 than pixels 1110, 1120, and 1125 of CTUs 1132, 1133, and 1134 of slice 1102. Just as described above for FIG. 10, simply performing symmetrical padding around pixels 1110 for pixels across boundaries will result in data conflicts with available pixel data, given the configuration with only pixels 1130 being unavailable. Examples described herein can use the sub-picture boundary handling for ALF (e.g., ALF in JVET-O2001-vE), including the clip operations described above, to clip available pixel data. The simple sub-picture boundary handling can then be used to pad both the unavailable data for pixels 1130 as well as the clipped pixel data (e.g., either for pixels 1125 of CTU 1132 or pixels 1125 of CTU 1133, depending on the particular clip operations applied).

Some methods attempt to solve the above-noted problems with padding data for unavailable pixels in the configuration with unavailable pixels only being present in a diagonally adjacent block from the to-be-processed pixel(s), but these methods use extra complexity and cannot re-use the sub-picture boundary handling for ALF. Examples described herein improve the operation of image and/or video processing devices by efficiently processing data in such configurations, resulting in improved image quality with ALF processing for pixels in these problem configurations with efficient processing resource usage. Various systems and techniques are described herein, which can be used independently or in any suitable combination. For example, in some cases, to solve the aforementioned problems as well as other potential problems, techniques are described for classifying or converting cases that are not supported by existing solution to one or multiple of the cases that are already supported. An advantage of such an approach is that it can reduce the implementation complexity since there is no new case that is to be implemented and one or more existing implementations may be reused. For example, some currently unsupported cross-boundary ALF cases are handled by re-using the cross-boundary ALF cases.

In some cases, new implementations and solutions are described for one or more of the cases that are unsupported by current ALF solutions. For example, when a pixel is in another slice or sub-picture (e.g., as compared to a pixel to-be-filtered), the pixel is not used in ALF classification and ALF filtering, but is replaced with padded data from a pixel in a same slice or sub-picture as the pixel to-be-filtered. In ALF classification, in one example, a scaling value can be applied based on the number of pixels excluded from the classification. The scaling application can be considered a form of padding as described herein. In a normal classification process the normalization is done assuming that all pixels and all Laplacian values (or less than all pixels or less than all Laplacian values in some examples) are available, and the scaling (e.g., padding) operations compensate for unavailable pixels and Laplacian values. In another example, all Laplacian values (or less than all Laplacian values in some examples) in another slice or sub-picture are calculated by repetitive padding, such as by duplicating a pixel (e.g., the closest pixel) in the current slice or sub-picture, in which case a scaling value may not be applied. In another example, all unavailable Laplacian values (or less than all unavailable Laplacian values in some examples) are obtained by duplicating a Laplacian value (e.g., padding with values from the closest pixel) in current slice or sub-picture, in which case a scaling value may not be applied. For ALF filtering, the padding process may be applied to replace one or more unavailable pixels. In some cases, the padding can be symmetrical (e.g., about the to-be-processed pixel) padding or can be one-side asymmetrical padding. The techniques described herein are described with respect to slices or sub-pictures. However, the techniques are applicable for other types of boundaries, such as bricks, tiles, slices, sub-pictures, pictures, any combination thereof, and/or other boundaries.

As detailed further below, FIG. 12-FIG. 15 describe additional configurations that can be processed with padded values in accordance with the examples described herein. As noted above, techniques are described herein for classifying or converting cases that are not supported by existing solution to one or multiple of the cases that are already supported. In one example, four clipping positions can be set for classification with associated operations (e.g., clipLeftC, clipRightC, clipTopC and clipBottomC) and four corresponding clipping positions can be set for operations for filtering (e.g., clipLeftF, clipRightF, clipTopF and clipBottomF). Each of these can be associated with a value that is processed during image processing operations (e.g., block 246 of FIG. 2C) to classify pixels in the picture. In some examples, each value can be initialized as a −128 value to indicate that no clipping is occurring for a given position. As part of such classification operations, in some examples the eight clipping position values can each be set to a particular value based on a particular position or configuration of a current pixel (e.g., pixel 440, 540, 640, etc.) with respect to a boundary. For example, if a current to-be-filtered pixel (e.g., pixel 640) is configured to use pixels crossing its right CTU boundary (e.g., boundary 651) for filtering and its right CTU boundary (e.g., boundary 651) is also a sub-picture boundary, clipRightF can be set at a value matching the right CTU boundary. The remaining values of clipRightF, clipTopF and clipBottomF can be set using a similar technique. In another example, if a current to-be-filtered pixel is configured to use pixels for ALF classification (e.g., pixels 810, 820, and 830), such as Laplacian values, that cross its right CTU boundary (e.g., pixels 830 across boundary 851) for classification and its right CTU boundary (e.g., boundary 851) is also a sub-picture boundary, clipRightC can be set as the right CTU boundary. The remaining clipRightC, clipTopC and clipBottomC can be set using a similar technique. In some cases, Laplacian values can also be provided, such as clipLeftL, clipRightL, clipTopL and clipBottomL. In some examples, if a Laplacian value needs samples crossing its left CTU boundary and the left CTU boundary is also a sub-picture boundary, clipLeftL is set as left CTU boundary. The remaining clipRightL, clipTopL and clipBottomL can be set using a similar technique. If the remaining values for either filtering or classification do not have an associated boundary, the clip values can be left at a default value indicating the lack of a boundary impacting the filtering or classification operations.

In a second step (e.g., as part of block 246, which may or may not be performed after the first step setting clipping values described above), if a current to-be-filtered pixel is configured to use pixels in its top-left CTU for filtering and its top-left CTU is in a different slice or sub-picture, clipLeftF may be set as the left CTU boundary. Alternatively or in addition, clipTopF may be set as the top CTU boundary. Alternatively or in addition, clipLeftF may be set as the left CTU boundary and clipTopF may be set as the top CTU boundary. In some cases, whether to set clipLeftF and/or clipTopF can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftF is always set. In some cases, clipTopF is always set. Alternatively or in addition, some condition may be checked to set clipLeftF and/or clipTopF adaptively. In one illustrative example, if there are more pixels used for filtering after setting clipLeftF than setting clipTopF, clipLeftF may be set. In another illustrative example, if there are more pixels used for filtering after setting clipTopF than setting clipLeftF, clipTopF may be set.

Figure 12:
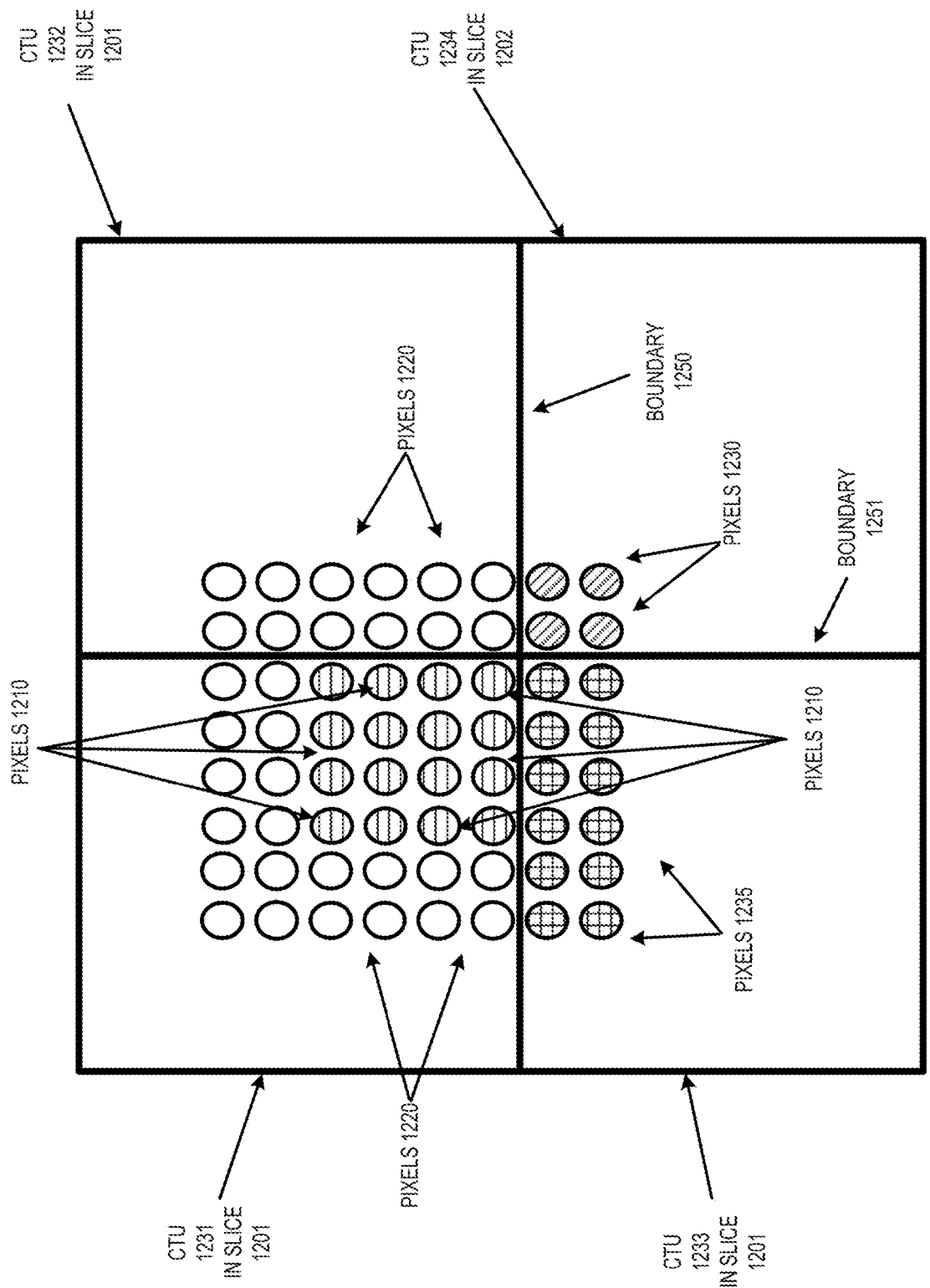
FIG. 12 is a conceptual diagram illustrating an example of a filter pattern for classification or activity filtering at a corner of a raster-scan slice, in accordance with some examples.

FIG. 12 is a conceptual diagram illustrating an example of a filter pattern for classification or activity filtering at a corner of a raster-scan slice, in accordance with some examples. FIG. 12 illustrates a configuration for classification as described above when a current to-be-filtered pixel of pixels 1210 is configured to use Laplacian values in its bottom-right diagonally adjacent CTU 1234 for filtering and CTU 1234 is in a different slice/sub-picture. The boundary 1251 and 1250 is due to pixels 1210, 1220, and 1235 being in slice 1201 as part of CTUs 1231, 1232, and 1233, while pixels 1230 in the bottom-right CTU 1234 are in slice 1202. Due to the slice boundary, clipBottomC is set as the bottom CTU boundary. Available pixels 1235 are then treated as unavailable in addition to the actually unavailable pixels 1230, which are also treated as unavailable. The padding process can then use scaling to set values for the pixels 1235 and 1230. In other examples, alternatively or in addition, clipRightC may be set as the right CTU boundary. Alternatively or in addition, both clipRightC and clipBottomC can be set. In the example of FIG. 12, clipRightC may be set as the right CTU boundary and clipBottomC may be set as the bottom CTU boundary at the same time. Whether to set clipRightC or clipBottomC (or both) can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightC is always set in a configuration matching FIG. 12. In some cases, clipBottomC is always set in a configuration matching FIG. 12. Alternatively or in addition, some condition may be checked to set clipRightC and/or clipBottomC adaptively. For example, if there are more pixels and/or Laplacian values used for classification after setting clipRightC than setting clipBottomC, clipRightC may be set and vice versa.

Figure 14:
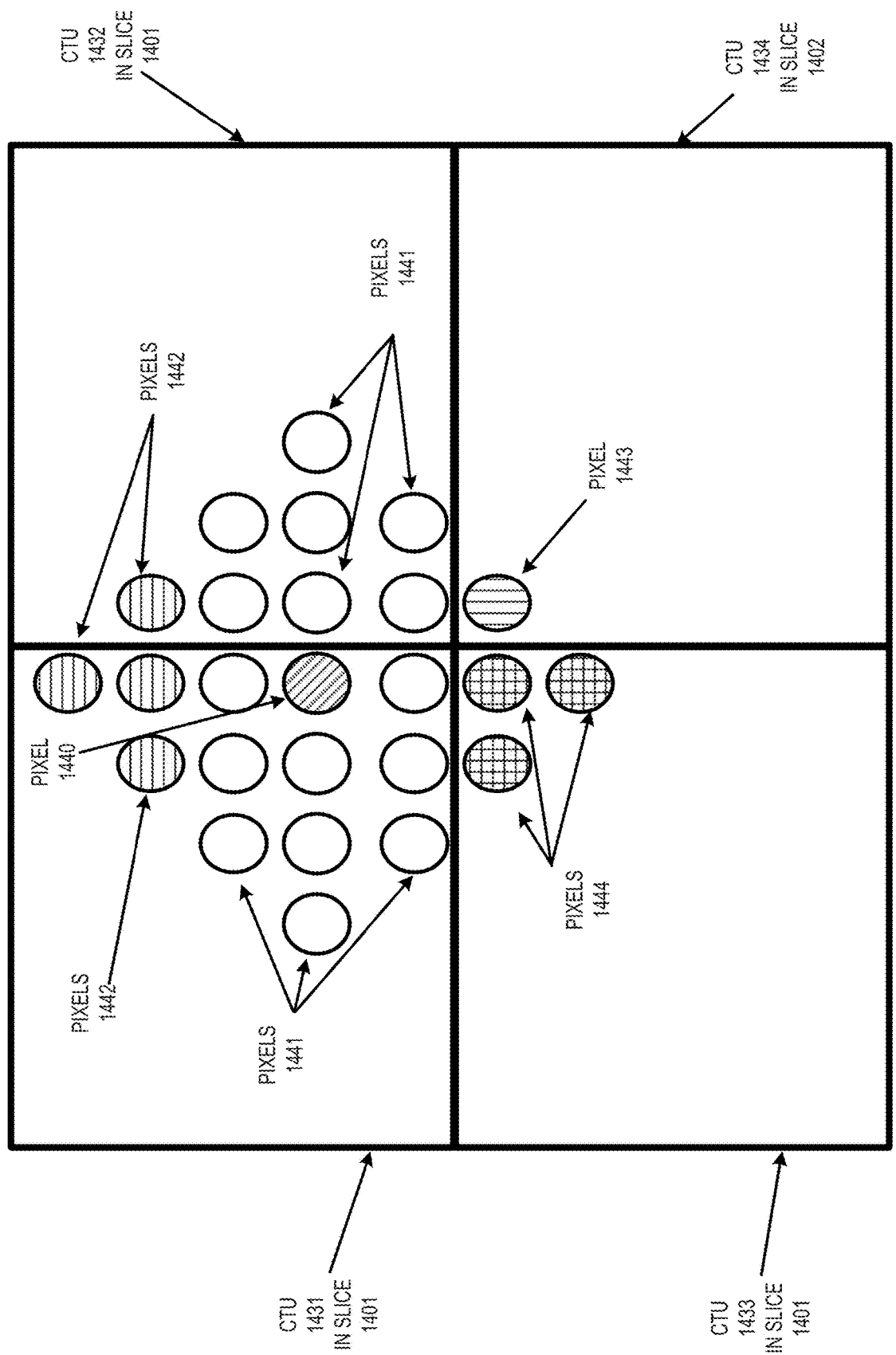
FIG. 14 is a conceptual diagram illustrating an example of a filter pattern for classification or activity filtering at a corner of a raster-scan slice, in accordance with some examples.

FIG. 14 is a conceptual diagram illustrating an example of a filter pattern for classification or activity filtering at a corner of a raster-scan slice, in accordance with some examples. FIG. 14 illustrates the matching filter configuration to the classification configuration of FIG. 12, where a current to-be-filtered pixel 1440 in CTU 1431 of slice 1401 is configured to use pixel 1443 in its bottom-right CTU 1434 of slice 1402 for filtering. As shown, the bottom-right diagonally adjacent CTU 1434 is in a different slice/sub-picture (e.g., slice 1402 where pixels 1440, 1441, 1442, and 1444 are in slice 1401). Just as above for the clipBottomC value of FIG. 12, in FIG. 14 the clipBottomF value may be set as the bottom CTU boundary. In addition to functionally flagging pixel 1443 as unavailable, the clip also flags available pixels 1444 as unavailable. The padding operation to replace data for pixels 1444 and pixel 1443 with data from the last row of pixels 1441 and to pixels 1442 with data from the first row of pixels 1441 can then be performed as described above, with symmetrical padding around pixel 1440 for pixels across the boundary set by the clipBottomF value (e.g., matching the boundary between CTU 1431 and CTU 1433 and extending along the boundary between CTU 1434 and CTU 1432). Alternatively or in addition, in other implementations, clipRightF may be set as the right CTU boundary and the clipBottomF setting can be left at the default value. Alternatively or in addition both clip values for the CTUs 1432 and 1433 that border diagonally adjacent CTU 1434 with pixel 1443 may be set. Whether to set clipRightF and/or clipBottomF can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightF is always set. In some cases, clipBottomF is always set. Alternatively or in addition, some condition may be checked to set clipRightF and/or clipBottomF adaptively. For example, if there are more pixels used for filtering after setting clipRightF than setting clipBottomF, clipRightF may be set and vice versa.

Figure 15:
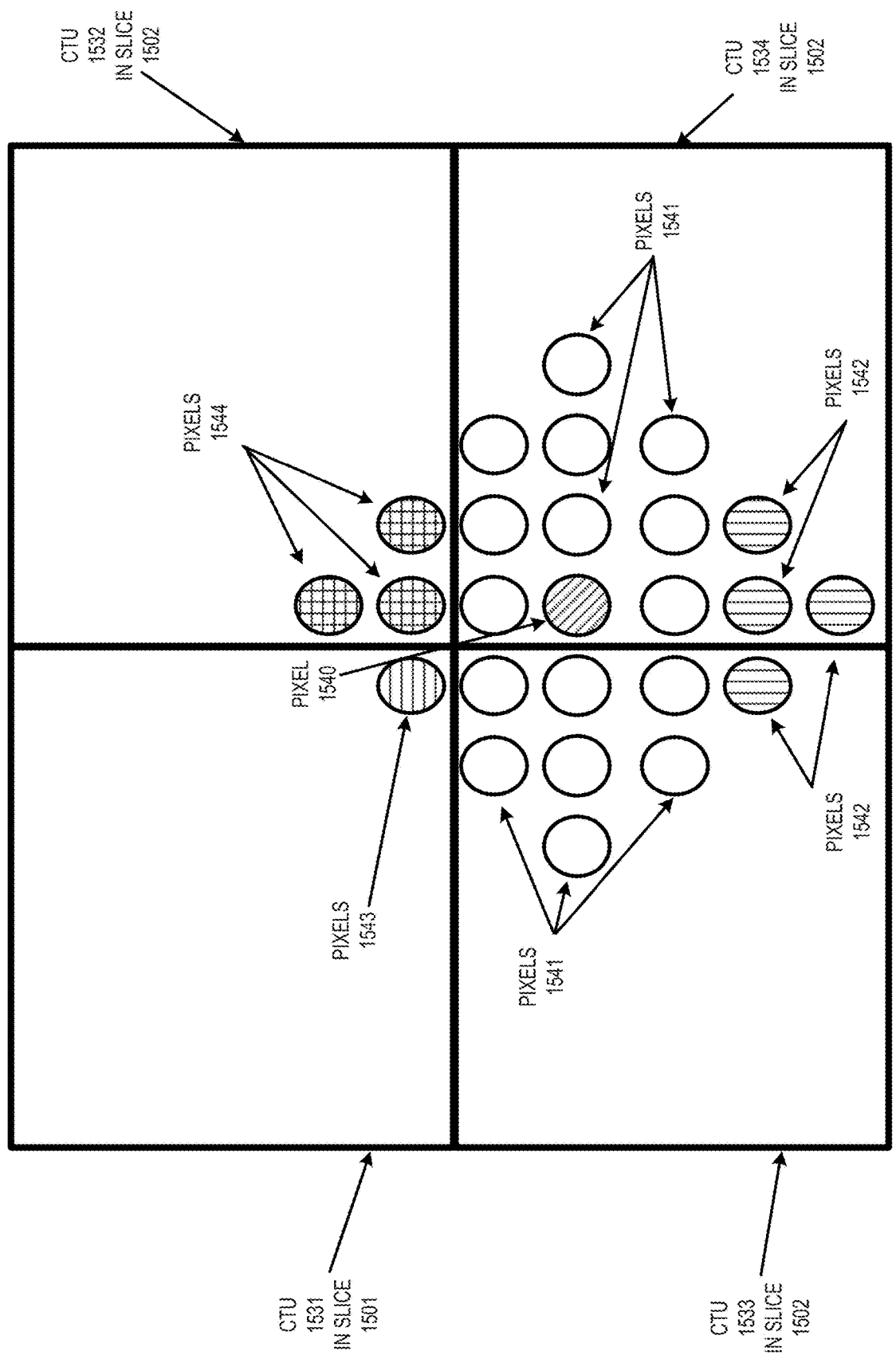
FIG. 15 is a conceptual diagram illustrating an example of a filter pattern for classification or activity filtering at a corner of a raster-scan slice, in accordance with some examples.

FIG. 15 is a conceptual diagram illustrating an example of a filter pattern for classification or activity filtering at a corner of a raster-scan slice, in accordance with some examples. FIG. 15 is a configuration for filtering with a current to-be-filtered pixel 1540 set to use unavailable pixel 1543 from across a slice boundary. As illustrated, pixel 1540 is in slice 1502. All pixels 1541, 1542, and 1544 to be used for filtering are in slice 1502 except pixel 1543 of CTU 1531, which is diagonally adjacent to CTU 1534 that contains pixel 1540, and is across the slice boundary between slices 1501 and 1502. In the example of FIG. 15, the clipTopF value is set to the boundary between CTU 1532 and CTU 1534, essentially treating pixels 1544 as unavailable as described above, even though the data for those pixels is available. A padding operation can then use the first row of pixels 1541 to pad the data for pixels 1544 and pixel 1543 and use the last row of pixels 1541 to pad the data for pixels 1542 to allow the filtering operation to be performed without errors.

Figure 13:
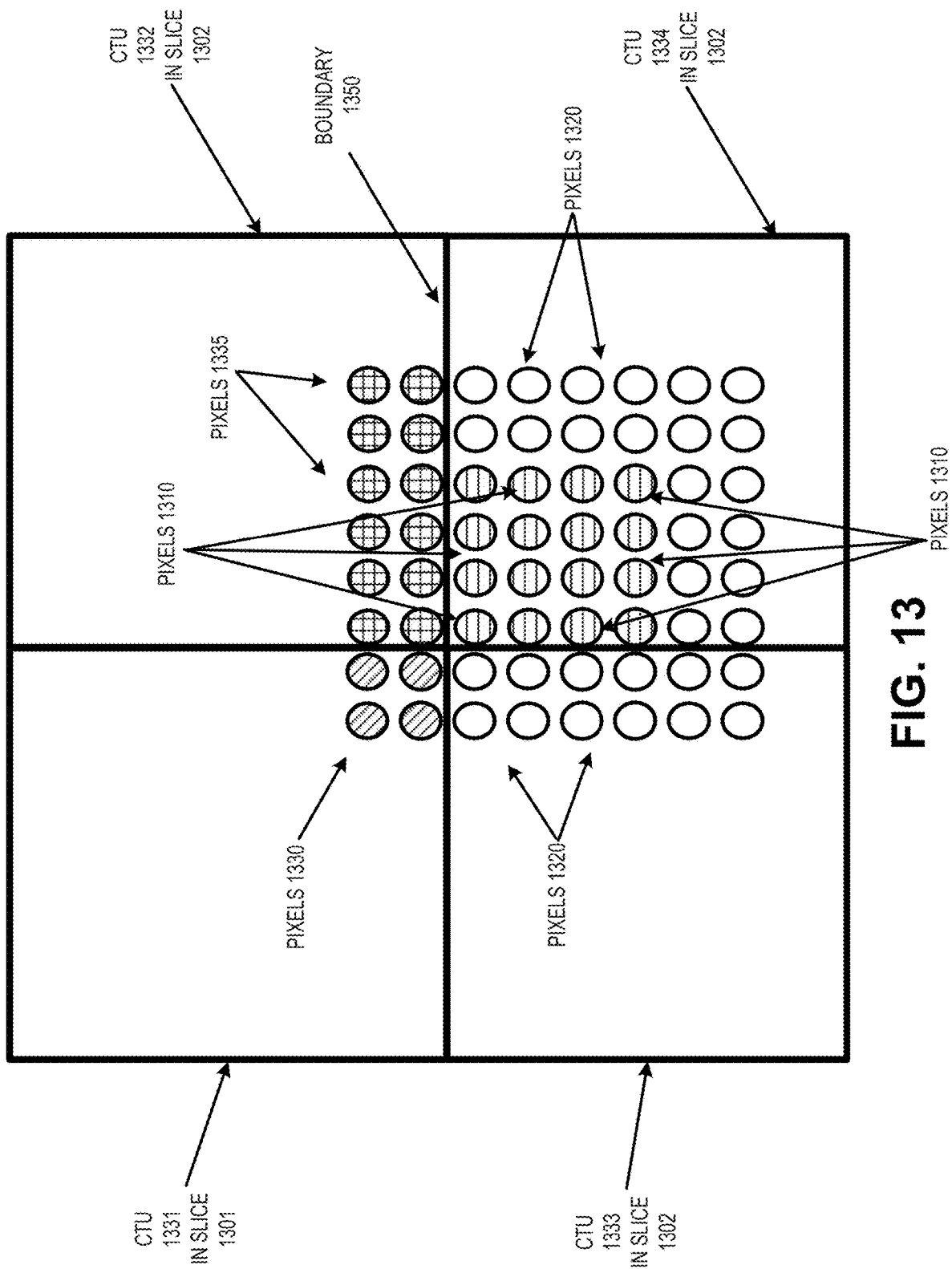
FIG. 13 is a conceptual diagram illustrating an example of a filter pattern for classification or activity filtering at a corner of a raster-scan slice, in accordance with some examples.

FIG. 13 is a conceptual diagram illustrating an example of a filter pattern for classification or activity filtering at a corner of a raster-scan slice, in accordance with some examples. FIG. 13 is particularly configured for classification at a corner where a current to-be-filtered pixel of pixels 1310 is set to use unavailable pixels 1330. As shown CTU 1331 which includes pixels 1330 is in slice 1301, and the remaining pixels for the classification are in CTUs 1332, 1333, and 1334 of slice 1302. In the example of FIG. 13, pixels 1310, 1320, and 1335 are available, while pixels 1330 are unavailable. To efficiently manage the unavailability of data from pixels 1330, FIG. 13 illustrates a clipTopC value being set at boundary 1350. The clip value allows data from available pixels 1335 to be excluded from the classification, and a simple padding operation as described above to be used for the classification. As described, the use of existing clip operations to configure scaled Laplacian values efficiently uses existing operations, rather than using new operations that would consume system resources to structure and operate as part of image processing operations. The Examples above describe certain positional configurations for a current to-be-filtered pixel. Additional configurations are described below.

In some examples, if a current to-be-filtered pixel is configured to use Laplacian values in its top-left diagonally adjacent CTU for filtering and its top-left diagonally adjacent CTU is in a different slice or sub-picture, clipLeftC may be set as the left CTU boundary. Alternatively or in addition, clipTopC may be set as the top CTU boundary. Alternatively or in addition, clipLeftC may be set as the left CTU boundary and clipTopC may be set as the top CTU boundary. Whether to set clipLeftC and/or clipTopC can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftC is always set. In some cases, clipTopC is always set. Alternatively or in addition, some condition may be checked to set clipLeftC and/or clipTopC adaptively. For example, if there are more pixels and/or Laplacian values used for classification after setting clipLeftC than setting clipTopC, clipLeftC may be set and vice versa.

In some examples, if a Laplacian value utilizes samples in current CTU's top-left CTU and the top-left CTU is in a different slice or sub-picture from current CTU, clipLeftL may be set as the left CTU boundary. Alternatively or in addition, clipTopL may be set as the top CTU boundary. Alternatively or in addition, clipLeftL may be set as the left CTU boundary and clipTopL may be set as the top CTU boundary. Whether to set clipLeftL and/or clipTopL can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftL is always set and/or clipTopL is always set. Alternatively or in addition, some condition may be checked to set clipLeftL and/or clipTopL adaptively.

If a current to-be-filtered pixel is configured to use pixels in its top-right CTU for filtering and its top-right CTU is in a different slice or sub-picture, clipRightF may be set as the right CTU boundary. Alternatively or in addition, clipTopF may be set as the top CTU boundary. Alternatively or in addition, clipRightF may be set as the right CTU boundary and clipTopF may be set as the top CTU boundary. Whether to set clipRightF and/or clipTopF can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightF is always set. In some cases, clipTopF is always set. Alternatively or in addition, some condition may be checked to set clipRightF and/or clipTopF adaptively. For example, if there are more pixels used for filtering after setting clipRightF than setting clipTopF, clipRightF may be set and vice versa.

If a current to-be-filtered pixel is configured to use Laplacian values in its top-right CTU for filtering and its top-right CTU is in a different slice/sub-picture, clipRightC may be set as the right CTU boundary. Alternatively or in addition, clipTopC may be set as the top CTU boundary. Alternatively or in addition, clipRightC may be set as the right CTU boundary and clipTopC may be set as the top CTU boundary. Whether to set clipRightC and/or clipTopC can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightC is always set. In some cases, clipTopC is always set. Alternatively or in addition, some condition may be checked to set clipRightC and/or clipTopC adaptively. For example, if there are more pixels and/or Laplacian values used for classification after setting clipRightC than setting clipTopC, clipRightC may be set and vice versa.

If a Laplacian value utilizes samples in current CTU's top-right CTU and the top-right CTU is in a different slice or sub-picture from current CTU, clipRightL may be set as the right CTU boundary. Alternatively or in addition, clipTopL may be set as the top CTU boundary. Alternatively or in addition, clipRightL may be set as the right CTU boundary and clipTopL may be set as the top CTU boundary. Whether to set clipRightL and/or clipTopL can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightL is always set and/or clipTopL is always set. Alternatively or in addition, some condition may be checked to set clipRightL and/or clipTopL adaptively.

If a current to-be-filtered pixel is configured to use pixels in its bottom-left CTU for filtering and its bottom-left CTU is in a different slice/sub-picture, clipLeftF may be set as the left CTU boundary. Alternatively or in addition, clipBottomF may be set as the bottom CTU boundary. Alternatively or in addition, clipLeftF may be set as the left CTU boundary and clipBottomF may be set as the bottom CTU boundary. Whether to set clipLeftF and/or clipBottomF can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftF is always set. In some cases, clipBottomF is always set. Alternatively or in addition, some condition may be checked to set clipLeftF and/or clipBottomF adaptively. For example, if there are more pixels used for filtering after setting clipLeftF than setting clipBottomF, clipLeftF may be set and vice versa.

If a current to-be-filtered pixel is configured to use Laplacian values in its bottom-left CTU for filtering and its bottom-left CTU is in a different slice/sub-picture, clipLeftC may be set as the left CTU boundary. Alternatively or in addition, clipBottomC may be set as the bottom CTU boundary. Alternatively or in addition, clipLeftC may be set as the left CTU boundary and clipBottomC may be set as the bottom CTU boundary. Whether to set clipLeftC and/or clipBottomC can be controlled by high level flags signaled at the sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftC is always set. In some cases, clipBottomC is always set. Alternatively or in addition, some condition may be checked to set clipLeftC and/or clipBottomC adaptively. For example, if there are more pixels and/or Laplacian values used for classification after setting clipLeftC than setting clipBottomC, clipLeftC may be set and vice versa.

If a Laplacian value utilizes samples in current CTU's bottom-left CTU and the bottom-left CTU is in a different slice or sub-picture from current CTU, clipLeftL may be set as the left CTU boundary. Alternatively or in addition, clipBottomL may be set as the bottom CTU boundary. Alternatively or in addition, clipLeftL may be set as the left CTU boundary and clipBottomL may be set as the bottom CTU boundary. Whether to set clipLeftL and/or clipBottomL can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipLeftL is always set and/or clipBottomL is always set. Alternatively or in addition, some condition may be checked to set clipLeftL or clipBottomL adaptively.

If current to-be-filtered pixel (or sample) needs pixelssamples in its bottom-right CTU for filtering and its bottom-right CTU is in a different slice or sub-picture, clipRightF may be set as right CTU boundary. Alternatively or in addition, clipBottomF may be set as the bottom CTU boundary. Alternatively or in addition, clipRightF may be set as the right CTU boundary and clipBottomF may be set as the bottom CTU boundary. Whether to set clipRightF and/or clipBottomF can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightF is always set and/or clipBottomF is always set. Alternatively or in addition, some condition may be checked to set clipRightF or clipBottomF adaptively. For example, if there are more pixelssamples used for filtering after setting clipRightF than setting clipBottomF, clipRightF may be set and vice versa.

If current to-be-filtered pixel (or sample) needs Laplacian values in its bottom-right CTU for filtering and its bottom-right CTU is in a different slice or sub-picture, clipRightC may be set as the right CTU boundary. Alternatively or in addition, clipBottomC may be set as the bottom CTU boundary. Alternatively or in addition, clipRightC may be set as the right CTU boundary and clipBottomC may be set as the bottom CTU boundary. Whether to set clipRightC and/or clipBottomC can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightC is always set and/or clipBottomC is always set. Alternatively or in addition, some condition may be checked to set clipRightC or clipBottomC adaptively. For example, if there are more pixelssamples and/or Laplacian values used for classification after setting clipRightC than setting clipBottomC, clipRightC may be set and vice versa.

If a Laplacian value utilizes samples in current CTU's bottom-right CTU and the bottom-right CTU is in a different slice or sub-picture from current CTU, clipRightL may be set as the right CTU boundary. Alternatively or in addition, clipBottomL may be set as the bottom CTU boundary. Alternatively or in addition, clipRightL may be set as the right CTU boundary and clipBottomL may be set as the bottom CTU boundary. Whether to set clipRightL or clipBottomL can be controlled by high level flags signaled at sequence level (e.g., in an SPS or other sequence-level signaling), picture level (e.g., in a PPS or other picture-level signaling), tile group level, tile level, slice level (e.g., slice header or other slice-level signaling), brick level (e.g., brick header or other brick-level signaling), and/or other signaling or header. In some cases, clipRightL is always set. In some cases, clipBottomL is always set. Alternatively or in addition, some condition may be checked to set clipRightL or clipBottomL adaptively.

In classification, such as for FIG. 11, FIG. 12, FIG. 13, and other such configurations, the Laplacian values on the other side of clipBottomC and/or clipTopC and/or clipLeftC and/or clipRightC may not be used and the activity value may be renormalized as a padding operation described above. In some cases, when calculating a Laplacian value, the samples on the other side of a clipBottomL, clipTopL, clipLeftL, or clipRightL may not be used, and the closest sample inside of the clip may be used. When a Laplacian value requires a pixel on the other side of clipBottomC and/or clipTopC and/or clipLeftC and/or clipTopC, the closest pixel inside clipBottomC and/or clipTopC and/or clipLeftC and/or clipTopC may be used.

In some other examples, renormalizing is not applied. In one illustrative example, the Laplacian values on the other side of clipBottomC and/or clipTopC and/or clipLeftC and/or clipRightC may be obtained by using the closest Laplacian value inside of clipBottomC and/or clipTopC and/or clipLeftC and/or clipRightC. When a Laplacian value requires a pixel on the other side of clipBottomC and/or clipTopC and/or clipLeftC and/or clipRightC, the closest pixel inside clipBottomC and/or clipTopC and/or clipLeftC and/or clipRightC may be used. In another example, when a Laplacian value requires a pixel on the other side of clipBottomL and/or clipTopL and/or clipLeftL and/or clipRightL, the closest pixel inside clipBottomL and/or clipTopL and/or clipLeftL and/or clipRightL may be used.

In some examples, to derive the boundaries for filtering, classification, and Laplacian values, the boundaries for filtering may be derived at sample level, or at a 4×4 sub-block level (e.g., the boundaries for all pixels in a 4×4 sub-block share the same values, for example, calculated based on the top-left sample), or other sub-block level (e.g., the boundaries for all pixels in the sub-block share the same values, for example, calculated based on the top-left sample), or coding tree block level (e.g., the boundaries for all pixels in the coding tree block share the same values, for example, calculated based on the top-left sample).

In some examples, the boundaries for classification may be derived at 4×4 sub-block level, or at some other larger sub-block level, or at the coding tree block level. In some cases, the boundaries for a Laplacian value may be derived at the sample level, or at the 4×4 sub-block level (e.g., the boundaries for all pixels in a 4×4 sub-block share the same values, for instance, calculated based on the top-left sample), or at another sub-block level (e.g., the boundaries for all pixels in the sub-block share the same values, for example, calculated based on the top-left sample), or at the coding tree block level (e.g., the boundaries for all pixels in the coding tree block share the same values, for instance, calculated based on the top-left sample).

In the filtering process, as described for FIG. 14, FIG. 15, and other such configurations, pixels on the other sides of clipBottomF and/or clipTopF and/or clipLeftF and/or clipTopF may not be used and symmetrical padding is applied for each clipping position clipBottomF and/or clipTopF and/or clipLeftF and/or clipTopF. Alternatively or in addition, asymmetrical padding (repetitive padding) is applied for each clipping position clipBottomF and/or clipTopF and/or clipLeftF and/or clipTopF.

Figure 16:
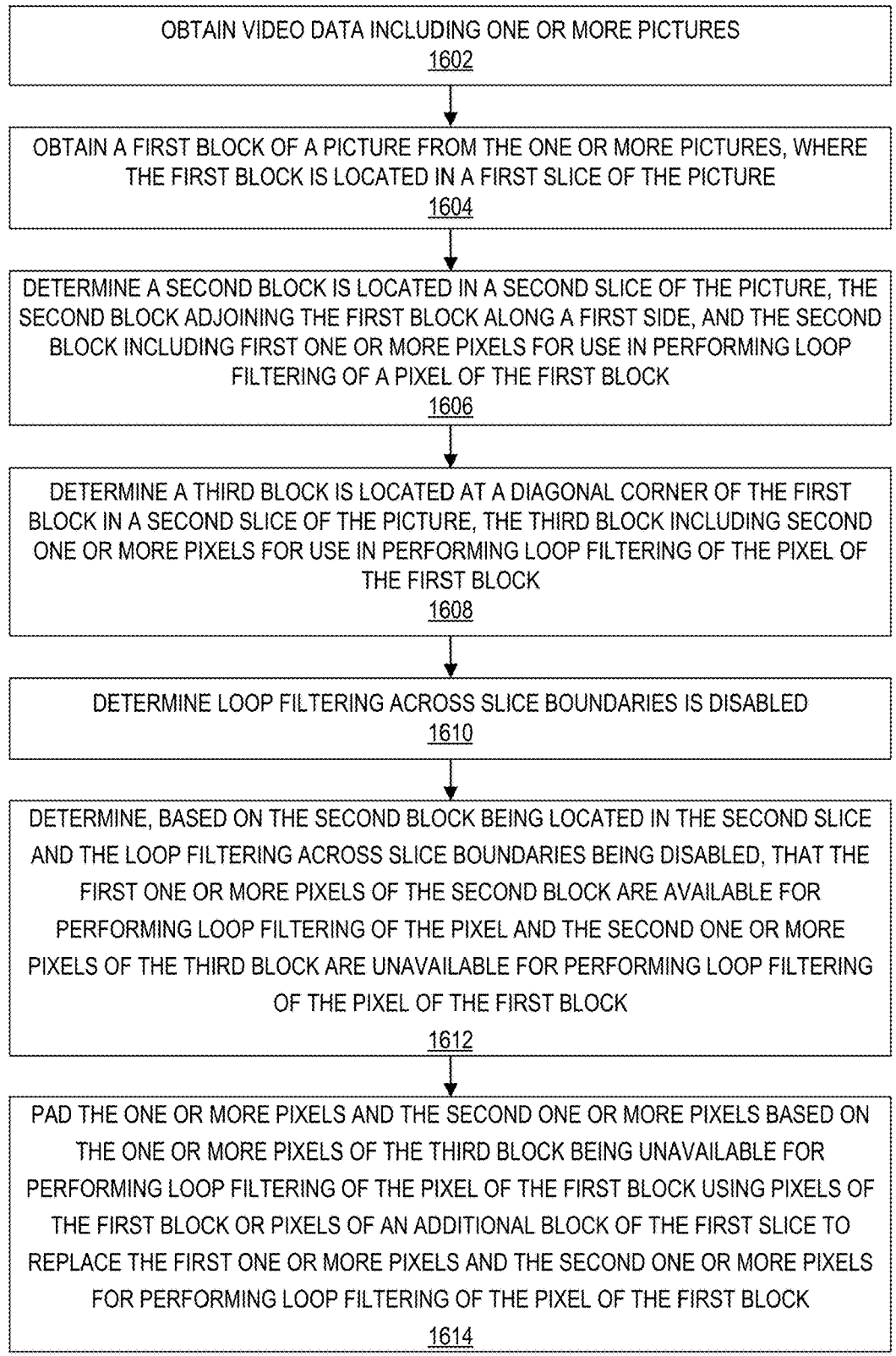
FIG. 16 is a flowchart illustrating an example method for processing video data, in accordance with some examples of the present disclosure.

Having disclosed example systems, components and concepts, the disclosure now turns to FIG. 16. FIG. 16 is a flow diagram illustrating an example method 1600 for processing video data. In some examples, the processing of video data by method 1600 can include different or varying combinations of operations for padding data for unavailable pixels for certain positional configurations in ALF filtering or classification as described. In various implementations, method 1600 can be performed by encoding or decoding devices as part of a video processing system. In some examples, method 1600 can be implemented as instructions in a non-transitory storage medium that, when executed by processing circuitry, causes a device to perform method 1600. The steps outlined herein are non-limiting examples provided for illustration purposes, and can be implemented in any combination thereof, including combinations that exclude, add, or modify certain steps.

At block 1602, the method 1600 can include obtaining video data including one or more pictures. In some examples, an encoding device (e.g., encoding device 104) can receive the one or more pictures from a video source (e.g., video source 102), such as a camera. In some examples, a decoding device (e.g., decoding device 112) can receive, from an encoding device (e.g., encoding device 104), an encoded video bitstream including the one or more pictures. In some examples, the encoded video bitstream can include signaling information. The signaling information can include, for example and without limitation, a flag indicating that ALF is enabled. The signaling information can also include a flag or other information indicating that from across slice boundaries are unavailable (e.g., for ALF or classification in a raster-scanned slice). Such a flag or other information indicating that loop filtering is disabled across slice boundaries can include a clipping flag related to CTU positions and slices. Such a clipping flag can be set based on various different configurations in a system, which can create a configuration where data from different slices are unavailable for loop filtering operations in a current slice.

At block 1604, the method 1600 can include obtaining a first block of a picture from the one or more pictures, where the first block is in a first slice of the picture. In some examples, an encoding device (e.g., encoding device 104) can partition the video data into one or more slices containing blocks. In some examples, the block can be an encoded block in an encoded video bitstream, and a decoding device (e.g., decoding device 112) can decode the block of the picture using signaling information in the bitstream by applying a coding algorithm and/or standard that matches the coding algorithm and/or standard used to encode the block, the slice, the picture and/or the bitstream. In some examples, the decoding device can reconstruct the block of the picture as described with respect to system 100 shown in FIG. 1 and decoding device 112 shown in FIG. 19.

At block 1606, the method 1600 can include determining a second block is located in the first slice of the picture, with the second block adjoining the first block along a first side, and the second block including first one or more pixels for use in performing loop filtering of a pixel of the first block. In some examples, the second block and the first block are each CTUs, with the first block being a first CTU and the second block being a second CTU. The second CTU can be directly above, below, left, or right of the first CTU.

At block 1608, the method 1600 further determines a third block is located at a diagonal corner of the first block in a second slice of the picture. The third block can share a border with the second block (e.g., a top, bottom, left, or right border), and the second block with therefore have a border with both the first block and the third block. The third block can be diagonally adjacent to the first block in a top-right, top-left, bottom-right, or bottom-left position. The third block also includes pixels for use in performing loop filtering of the pixel of the first block. Just as above, in some examples, an encoding device (e.g., encoding device 104) can partition the video data into one or more slices containing including the first slice and the second slice different from the first slice, along with blocks including the pixels. In some examples, the second slice can include an encoded blocks in an encoded video bitstream, and a decoding device (e.g., decoding device 112) can decode the blocks and slices of the picture using signaling information in the bitstream by applying a coding algorithm and/or standard that matches the coding algorithm and/or standard used to encode the block, the slice, the picture and/or the bitstream. In some examples, the encoding and decoding involves raster-scan partitioning of the picture. In some examples, the decoding device can partition and reconstruct the blocks and slices of the picture in the raster-scan configuration, such as that described in FIGS. 4A, above using system 100 shown in FIG. 1 and decoding device 112 shown in FIG. 18.

At block 1610, the method 1600 can include determining that loop filtering across slice boundaries is disabled. As described above, the determining can be performed as part of encoding operations by processing the encoding data to determine that loop filtering across slice boundaries is disabled, or by decoding an encoded bitstream using a decoding device to identify a flag or other information identifying that data from pixels across slice boundaries is unavailable for processing pixels in a current slice.

At block 1612, the method 1600 can include determining that the one or more pixels of the third block are unavailable for performing loop filtering of the pixel of the first block based on the third block being located in the second slice and the pixel being processed being in the first slice. Additionally, it is determined that pixels of the second block are available for loop filtering. In some examples, the loop filter for loop filtering is an adaptive loop filter. In some examples, the loop filter is a linear or non-linear filter with sample classification based on gradients.

At block 1614, the method 1600 can the include padding (e.g., generating new values by duplicating or modifying values from available pixels) at least one pixel of the first block or at least one pixel of an additional block of the first slice to be used for performing loop filtering of the pixel of the first block. The duplication is done based on the one or more pixels of the third block being unavailable due to the disabling of loop filtering across slice boundaries. In some examples, the loop filtering for the first block is performed using an adaptive loop filter (ALF). In some examples, the pixels of the first block or pixels of the additional block are positioned symmetrically about the pixel from the first one or more pixels and the second one or more pixels. Similarly, in some examples, duplicating the pixels of the first block or pixels of the additional block includes generating a slice boundary treating a block boundary along the first side between the first block and the second block as the slice boundary, and duplicating the pixels of the first block or pixels of the additional block symmetrically around the converted slice boundary.

Depending on the position of the third block, a particular clip position operation can set a clip position value to make pixels of the second block unavailable. The duplication of block 1614 can then pad values for the unavailable pixels of the third block and the clipped pixels of the second block.

In some examples boundaries for filtering can be derived at a sample level, at a 4×4 sub-block level (e.g., the boundaries for all in the 4×4 sub-block share the same values, which can be calculated based on the top left sample in the sub-block) or using another sub-block level (e.g., with the boundaries for all pixels in the sub-block sharing the same values, and the same shared value based on a single pixel, such at the top-left sample). In other examples, any other suitable level is used to determine a boundary.

In another example, the boundaries for classification may be derived at the sample level, at a 4×4 sub-block level (e.g., the boundaries for all pixels in the 4×4 sub-block share the same values, for example, calculated based on the top-left sample) or other sub-block level (e.g., where the boundaries for all pixels in the sub-block share the same values, for example, calculated based on the top-left sample), at the CTB level (e.g., where the boundaries for all pixels in the CTB share the same values, for example, calculated based on the top-left sample), or at another suitable level.

In another example, the boundaries for a Laplacian value may be derived at the sample level, at a 4×4 sub-block level (e.g., the boundaries for all pixels in the 4×4 sub-block share the same values, for example, calculated based on the top-left sample) or other sub-block level (e.g., where the boundaries for all pixels in the sub-block share the same values, for example, calculated based on the top-left sample), at the CBT level (e.g., where the boundaries for all pixels in the CTB share the same values, for example, calculated based on the top-left sample), or at another suitable level.

Figure 17B:
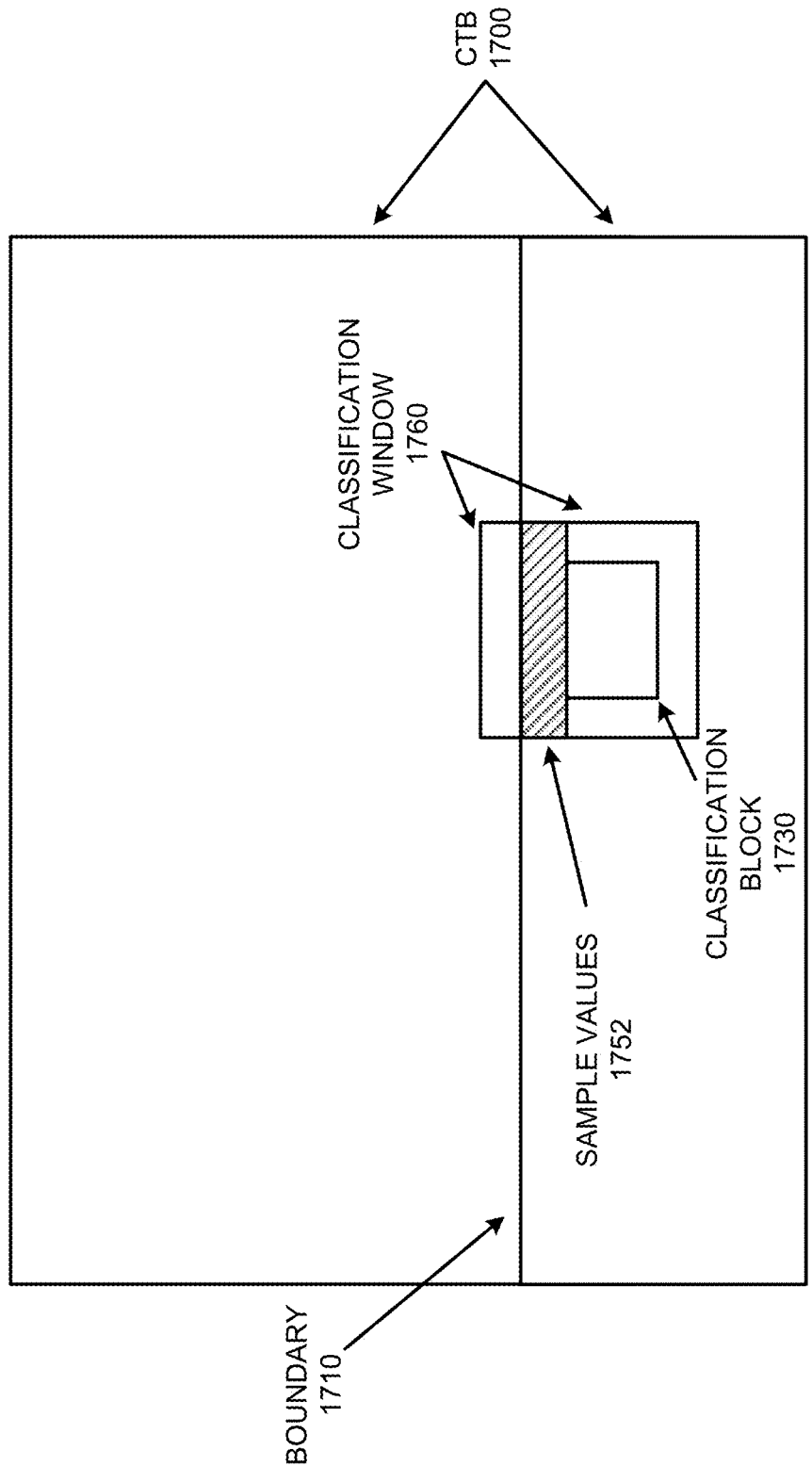
FIG. 17B is a diagram illustrating an example of filling samples of a block in accordance with some examples.
Figure 17C:
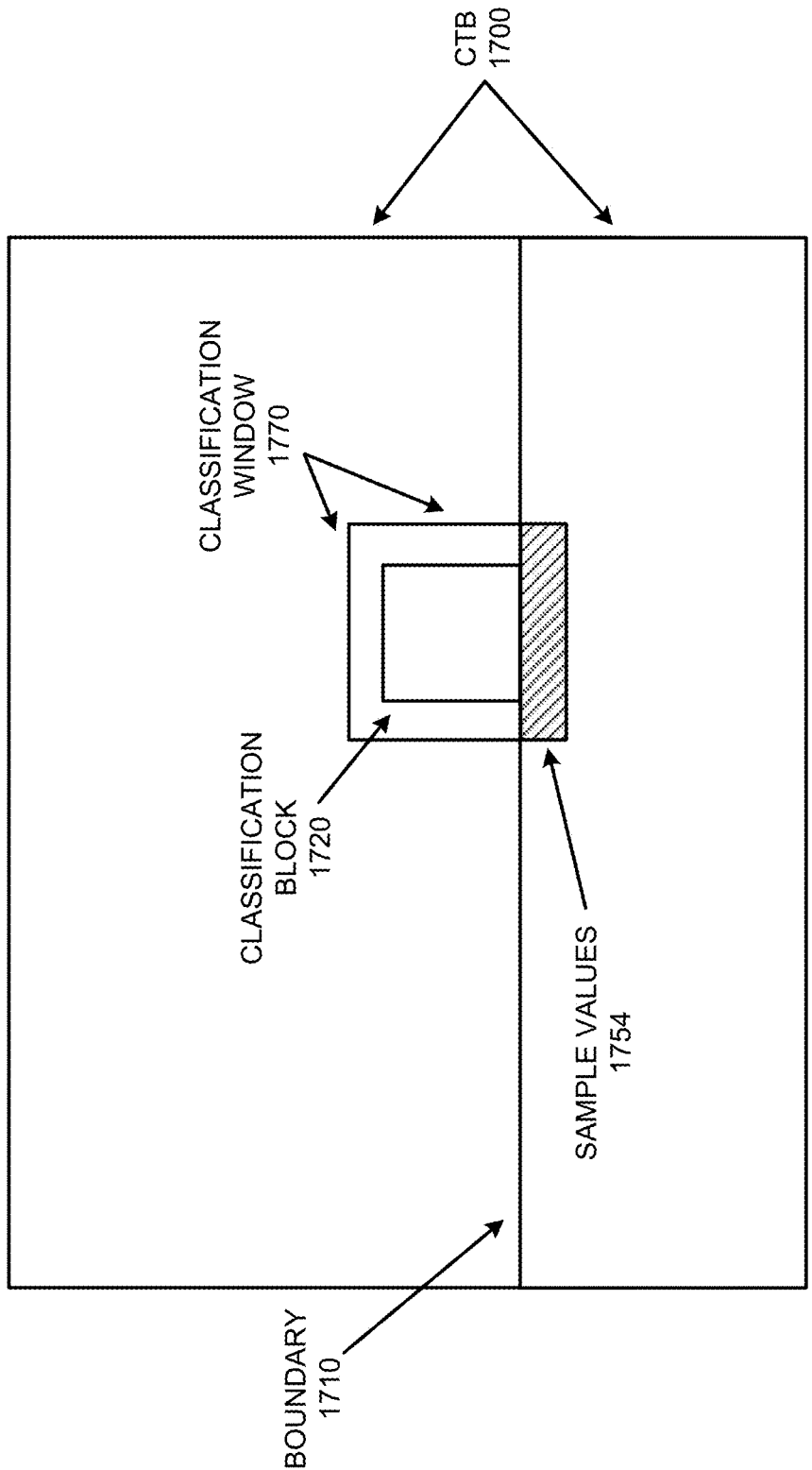
FIG. 17C is a diagram illustrating an example of filling samples of a block in accordance with some examples.

FIG. 17A is a diagram illustrating aspects of filling samples (e.g., for pixels 1750) of a coding tree block (CTB) 1700. FIG. 17B is a diagram illustrating aspects of filling sample values 1752 within a classification window 1760 for block 1730 of CTB 1700. FIG. 17C is a diagram illustrating aspects of filling sample values 1754 in classification window 1770 for classification block 1720. In some examples, JVET-O2001-vE does not use proper pixels for 4×4 sub-blocks. For example samples can be filled once before doing classification, and for the same coordinate (e.g., with a particular x and y coordinate position) the same sample values are used. However, as shown in FIGS. 17A, 17B, and 17C, for a CTB 1700, for two neighboring blocks on different side of a boundary 1710 within a CTB 1700, samples at a single coordinate can use different values (e.g., pixels 1750 at a given coordinate with different sample values 1752, and 1754). For example, in FIG. 17A, classification block 1720 and classification block 1730 are two neighboring 4×4 blocks on opposite sides of boundary 1710 processed for ALF classifications. Pixels 1750 at set coordinates are to be filled with calculated Laplacian values for each ALF classification of the 4×4 classification blocks (e.g., classification blocks 1720 and 1730). As shown by FIG. 17B, when calculating Laplacian values for classification block 1730 using classification window 1760, the sample values 1752 are used for pixels 1750. As shown by FIG. 17C, when calculating Laplacian values for classification block 1720, these same pixels 1750 at a given position can use different sample values 1754. In some aspects, pixels 1750 can use first values available for the pixels (e.g., as illustrated by FIG. 17B, where pixels above boundary 1710 can be padded and pixels below the boundary 1710, including pixels 1750, are not padded). Pixels 1750 may not be padded in the example of FIG. 17B, when pixels 1750 are on the same side of boundary 1710 as the classification block being classified (e.g., classification block 1730 in FIG. 17B). The same pixels 1750 can then be padded as illustrated in FIG. 17C when pixels 1750 are across boundary 1710 from the classification block being processed (e.g., classification block 1720 in FIG. 17C). In some aspects, pixels 1750 can be padded as shown in FIG. 17C with sample values 1754 using the closest samples from one side of boundary (e.g., the side of the boundary including classification block 1720).

In some examples, to solve problems with cross-boundary pixel use, examples described herein change the existing VVC Specification such that the window where there is no boundary crossing may be filled separately. Alternatively or in addition, in some examples a window for each 4×4 classification block (or other sized block) may be filled separately. In some examples, the boundaries condition for each 4×4 block (or other sized block) may be taken into condition independently.

Examples of changes in the current VVC Specification (JVET-O2001-vE) based on the above-described examples will now be described. For example, in some cases, to reuse the control logic in sub-picture boundary ALF processing, only section 8.8.5.5 (ALF boundary position derivation process) in JVET-O2001-vE needs to be updated to include some examples. In the examples provided below, additions are shown with underlined text in between "<insert>" and "<insertend>" symbols (e.g., "<insert>added text<insertend>");

8.8.5.5 ALF Boundary Position Derivation Process

Inputs of this process are:
  a. a luma location (xCtb, yCtb) specifying the top-left sample of the current luma coding tree block relative to the top left sample of the current picture,
  b. a luma location (x, y) specifying the current sample relative to the top-left sample of the current luma coding tree block.
Output of this process are:
  c. the left vertical boundary position clipLeftPos,
  d. the right vertical boundary position clipRightPos,
  e. the above horizontal boundary position clipTopPos,
  f. the below horizontal boundary position clipBottomPos.
The variables clipLeftPos, clipRightPos, clipTopPos and clipBottomPos are set equal to −128.
The variable clipTopPos is modified as follows:
  a. If the bottom boundary of the current coding tree block is not the bottom boundary of the picture and y−(CtbSizeY−4) is greater than or equal to 0, the variable clipTopPos is set equal to yCtb+CtbSizeY−4.
  b. Otherwise, if pps_loop_filter_across_virtual_boundaries_disabled_flag is equal to 1, and PpsVirtualBoundariesPosY[n] % CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

$$clipTopPos = PpsVirtualBoundariesPosY[n] \qquad (8\text{-}1292)$$

c. Otherwise, if y is less than 3, and the top boundary of the current coding tree block is not the top boundary of the picture, and one or more of the following conditions are true, the variable clipTopPos is set equal to yCtb:
    i. If the top boundary of the current coding tree block is the top boundary of the brick, and loop_filter_across_bricks_enabled_flag is equal to 0.
    ii. If the top boundary of the current coding tree block is the top boundary of the slice, and loop_filter_across_slices_enabled_flag is equal to 0.
    iii. If the top boundary of the current coding tree block is the top boundary of the subpicture, and loop_filter_across_subpic_enabled_flag[SubPicIdx] is equal to 0.
  <insert>Otherwise, if x+y is less than 2, and the top-left coding tree block is in the same picture, and one or more of the following conditions are true, the variable clipTopPos is set equal to yCtb:
    i. If the the top-left coding tree block is in another brick, and loop_filter_across_bricks_enabled_flag is equal to 0.

ii. If the the top-left coding tree block is in another slice, and loop_filter_across_slices_enabled_flag is equal to 0.

iii. If the the top-left coding tree block is in another subpicture, and loop_filter_across_subpic_enabled_flag[SubPicIdx] is equal to 0.

Otherwise, if y+ctbSizeY−1−x is less than 2, and the top-right coding tree block is in the same picture, and one or more of the following conditions are true, the variable clipTopPos is set equal to yCtb:

i. If the the top-right coding tree block is in another brick, and loop_filter_across_bricks_enabled_flag is equal to 0.

ii. If the the top-right coding tree block is in another slice, and loop_filter_across_slices_enabled_flag is equal to 0.

iii. If the the top-right coding tree block is in another subpicture, and loop_filter_across_subpic_enabled_flag[SubPicIdx] is equal to 0. <insertend>

The variable clipBottomPos is modified as follows:

a. If the bottom boundary of the current coding tree block is not the bottom boundary of the picture and CtbSizeY−4−y is greater than 0 and is less than 4, the variable clipBottomPos is set equal to yCtb+CtbSizeY−4.

b. Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

$$clipBottomPos = PpsVirtualBoundariesPosY[n] \qquad (8\text{-}1293)$$

c. Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:

i. If the bottom boundary of the current coding tree block is the bottom boundary of the brick, and loop_filter_across_bricks_enabled_flag is equal to 0.

ii. If the bottom boundary of the current coding tree block is the bottom boundary of the slice, and loop_filter_across_slices_enabled_flag is equal to 0.

iii. If the bottom boundary of the current coding tree block is the bottom boundary of the subpicture, and loop_filter_across_subpic_enabled_flag[SubPicIdx] is equal to 0.

<insert>Otherwise, if x+ctbSizeY−1−y is less than 2, and the bottom-left coding tree block is in the same picture, and one or more of the following conditions are true, the variable clipBottomPos is set equal to yCtb+CtbSizeY:

i. If the the bottom-left coding tree block is in another brick, and loop_filter_across_bricks_enabled_flag is equal to 0.

ii. If the the bottom-left coding tree block is in another slice, and loop_filter_across_slices_enabled_flag is equal to 0.

iii. If the the bottom-left coding tree block is in another subpicture, and loop_filter_across_subpic_enabled_flag[SubPicIdx] is equal to 0.

Otherwise, if ctbSizeY−1−y+ctbSizeY−1−x is less than 2, and the bottom-right coding tree block is in the same picture, and one or more of the following conditions are true, the variable clipBottomPos is set equal to yCtb+CtbSizeY:

i. If the the bottom-right coding tree block is in another brick, and loop_filter_across_bricks_enabled_flag is equal to 0.

ii. If the the bottom-right coding tree block is in another slice, and loop_filter_across_slices_enabled_flag is equal to 0.

iii. If the the bottom-right coding tree block is in another subpicture, and loop_filter_across_subpic_enabled_flag[SubPicIdx] equal to 0. <insertend>

The variable clipLeftPos is modified as follows:

a. If pps_loop_filter_across_virtual_boundaries_disabled_flag is equal to 1, and PpsVirtualBoundariesPosX[n] % CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

$$clipLeftPos = PpsVirtualBoundariesPosX[n] \qquad (8\text{-}1294)$$

b. Otherwise, if x is less than 3, the left boundary of the current coding tree block is not the left boundary of the picture and one or more of the following conditions are true, the variable clipLeftPos is set equal to xCtb:

i. If the left boundary of the current coding tree block is the left boundary of the brick, and loop_filter_across_bricks_enabled_flag is equal to 0.

ii. If the left boundary of the current coding tree block is the left boundary of the slice, and loop_filter_across_slices_enabled_flag is equal to 0.

iii. If the left boundary of the current coding tree block is the left boundary of the subpicture, and loop_filter_across_subpic_enabled_flag[SubPicIdx] is equal to 0.

<insert>Otherwise, if x+y is less than 2, and the top-left coding tree block is in the same picture, and one or more of the following conditions are true, the variable clipLeftPos is set equal to xCtb:

i. If the the top-left coding tree block is in another brick, and loop_filter_across_bricks_enabled_flag is equal to 0.

ii. If the the top-left coding tree block is in another slice, and loop_filter_across_slices_enabled_flag is equal to 0.

iii. If the the top-left coding tree block is in another subpicture, and loop_filter_across_subpic_enabled_flag[SubPicIdx] is equal to 0.

Otherwise, if x+ctbSizeY−1−y is less than 2, and the bottom-left coding tree block is in the same picture, and one or more of the following conditions are true, the variable clipLeftPos is set equal to xCtb:

i. If the the bottom-left coding tree block is in another brick, and loop_filter_across_bricks_enabled_flag is equal to 0.

ii. If the the bottom-left coding tree block is in another slice, and loop_filter_across_slices_enabled_flag is equal to 0.

iii. If the the bottom-left coding tree block is in another subpicture, and loop_filter_across_subpic_enabled_flag[SubPicIdx] is equal to 0. <insertend>

The variable clipRightPos is modified as follows:
a. If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

$$clipRightPos = PpsVirtualBoundariesPosX[n] \qquad (8\text{-}1295)$$

b. Otherwise, if CtbSizeY−x is less than 4, and the right boundary of the current coding tree block is not the right boundary of the picture, and one or more of the following conditions are true, the variable clipRightPos is set equal to xCtb+CtbSizeY:
  i. If the right boundary of the current coding tree block is the right boundary of the brick, and loop_filter_across_bricks_enabled_flag is equal to 0.
  ii. If the right boundary of the current coding tree block is the right boundary of the slice, and loop_filter_across_slices_enabled_flag is equal to 0.
  iii. if the right boundary of the current coding tree block is the right boundary of the subpicture, and loop_filter_across_subpic_enabled_flag[SubPicIdx] is equal to 0.
<insert>Otherwise, if y+ctbSizeY−1−x is less than 2, and the top-right coding tree block is in the same picture, and one or more of the following conditions are true, the variable clipRightPos is set equal to xCtb+CtbSizeY:
  i. If the the top-right coding tree block is in another brick, and loop_filter_across_bricks_enabled_flag is equal to 0.
  ii. If the the top-right coding tree block is in another slice, and loop_filter_across_slices_enabled_flag is equal to 0.
  iii. If the the top-right coding tree block is in another subpicture, and loop_filter_across_subpic_enabled_flag[SubPicIdx] is equal to 0.
Otherwise, if ctbSizeY−1−y+ctbSizeY−1−x is less than 2, and the bottom-right coding tree block is in the same picture, and one or more of the following conditions are true, the variable clipRightPos is set equal to xCtb+CtbSizeY:
  i. If the the bottom-right coding tree block is in another brick, and loop_filter_across_bricks_enabled_flag is equal to 0.
  ii. If the the bottom-right coding tree block is in another slice, and loop_filter_across_slices_enabled_flag is equal to 0.
  iii. If the the bottom-right coding tree block is in another subpicture, and loop_filter_across_subpic_enabled_flag[SubPicIdx] is equal to 0. <insertend>

8.8.5.5 ALF Boundary Position Derivation Process

Inputs of this process are:
a. a luma location (xCtb, yCtb) specifying the top-left sample of the current luma coding tree block relative to the top left sample of the current picture,
b. a luma location (x, y) specifying the current sample relative to the top-left sample of the current luma coding tree block.

Output of this process are:
c. the left vertical boundary position clipLeftPos,
d. the right vertical boundary position clipRightPos,
e. the above horizontal boundary position clipTopPos,
f. the below horizontal boundary position clipBottomPos.

The variables clipLeftPos, clipRightPos, clipTopPos and clipBottomPos are set equal to −128.

The variable clipTopPos is modified as follows:
a. If the bottom boundary of the current coding tree block is not the bottom boundary of the picture and y−(CtbSizeY−4) is greater than or equal to 0, the variable clipTopPos is set equal to yCtb+CtbSizeY−4.
b. Otherwise, if pps_loop_filter_across_virtual_boundaries_disabled_flag is equal to 1, and PpsVirtualBoundariesPosY[n] % CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

$$clipTopPos = PpsVirtualBoundariesPosY[n] \qquad (8\text{-}1292)$$

c. Otherwise, if y is less than 3, and the top boundary of the current coding tree block is not the top boundary of the picture, and one or more of the following conditions are true, the variable clipTopPos is set equal to yCtb:
  i. If the top boundary of the current coding tree block is the top boundary of the brick, and loop_filter_across_bricks_enabled_flag is equal to 0.
  ii. If the top boundary of the current coding tree block is the top boundary of the slice, and loop_filter_across_slices_enabled_flag is equal to 0.
  iii. If the top boundary of the current coding tree block is the top boundary of the subpicture, and loop_filter_across_subpic_enabled_flag[SubPicIdx] is equal to 0.
<insert>Otherwise, if x+y is less than 2, and the top-left coding tree block is in the same picture, and one or more of the following conditions are true, the variable clipTopPos is set equal to yCtb:
  i. If the the top-left coding tree block is in another brick, and loop_filter_across_bricks_enabled_flag is equal to 0.
  ii. If the the top-left coding tree block is in another slice, and loop_filter_across_slices_enabled_flag is equal to 0.
  iii. If the the top-left coding tree block is in another subpicture, and loop_filter_across_subpic_enabled_flag[SubPicIdx] is equal to 0.
Otherwise, if y+ctbSizeY−1−x is less than 2, and the top-right coding tree block is in the same picture, and one or more of the following conditions are true, the variable clipTopPos is set equal to yCtb:
  i. If the the top-right coding tree block is in another brick, and loop_filter_across_bricks_enabled_flag is equal to 0.
  ii. If the the top-right coding tree block is in another slice, and loop_filter_across_slices_enabled_flag is equal to 0.
  iii. If the the top-right coding tree block is in another subpicture, and loop_filter_across_subpic_enabled_flag[SubPicIdx] equal to 0. <insertend>
The variable clipBottomPos is modified as follows:
a. If the bottom boundary of the current coding tree block is not the bottom boundary of the picture and Ctb- SizeY−4−y is greater than 0 and is less than 4, the variable clipBottomPos is set equal to yCtb+CtbSizeY−4.

b. Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

$$clipBottomPos = PpsVirtualBoundariesPosY[n] \quad (8\text{-}1293)$$

c. Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:
  i. If the bottom boundary of the current coding tree block is the bottom boundary of the brick, and loop_filter_across_bricks_enabled_flag is equal to 0.
  ii. If the bottom boundary of the current coding tree block is the bottom boundary of the slice, and loop_filter_across_slices_enabled_flag is equal to 0.
  iii. If the bottom boundary of the current coding tree block is the bottom boundary of the subpicture, and loop_filter_across_subpic_enabled_flag[SubPicIdx] is equal to 0.

<insert>Otherwise, if x+ctbSizeY−1−y is less than 2, and the bottom-left coding tree block is in the same picture, and one or more of the following conditions are true, the variable clipBottomPos is set equal to yCtb+CtbSizeY:
  i. If the the bottom-left coding tree block is in another brick, and loop_filter_across_bricks_enabled_flag is equal to 0.
  ii. If the the bottom-left coding tree block is in another slice, and loop_filter_across_slices_enabled_flag is equal to 0.
  iii. If the the bottom-left coding tree block is in another subpicture, and loop_filter_across_subpic_enabled_flag[SubPicIdx] is equal to 0.

Otherwise, if ctbSizeY−1−y+ctbSizeY−1−x is less than 2, and the bottom-right coding tree block is in the same picture, and one or more of the following conditions are true, the variable clipBottomPos is set equal to yCtb+CtbSizeY:
  i. If the the bottom-right coding tree block is in another brick, and loop_filter_across_bricks_enabled_flag is equal to 0.
  ii. If the the bottom-right coding tree block is in another slice, and loop_filter_across_slices_enabled_flag is equal to 0.
  iii. If the the bottom-right coding tree block is in another subpicture, and loop_filter_across_subpic_enabled_flag[SubPicIdx] is equal to 0. <insertend>

The variable clipLeftPos is modified as follows:
a. If pps_loop_filter_across_virtual_boundaries_disabled_flag is equal to 1, and PpsVirtualBoundariesPosX[n] % CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

$$clipLeftPos = PpsVirtualBoundariesPosX[n] \quad (8\text{-}1294)$$

b. Otherwise, if x is less than 3, the left boundary of the current coding tree block is not the left boundary of the picture and one or more of the following conditions are true, the variable clipLeftPos is set equal to xCtb:
  i. If the left boundary of the current coding tree block is the left boundary of the brick, and loop_filter_across_bricks_enabled_flag is equal to 0.
  ii. If the left boundary of the current coding tree block is the left boundary of the slice, and loop_filter_across_slices_enabled_flag is equal to 0.
  iii. If the left boundary of the current coding tree block is the left boundary of the subpicture, and loop_filter_across_subpic_enabled_flag[SubPicIdx] is equal to 0.

The variable clipRightPos is modified as follows:
a. If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

$$clipRightPos = PpsVirtualBoundariesPosX[n] \quad (8\text{-}1295)$$

b. Otherwise, if CtbSizeY−x is less than 4, and the right boundary of the current coding tree block is not the right boundary of the picture, and one or more of the following conditions are true, the variable clipRightPos is set equal to xCtb+CtbSizeY:
  i. If the right boundary of the current coding tree block is the right boundary of the brick, and loop_filter_across_bricks_enabled_flag is equal to 0.
  ii. If the right boundary of the current coding tree block is the right boundary of the slice, and loop_filter_across_slices_enabled_flag is equal to 0.
  iii. if the right boundary of the current coding tree block is the right boundary of the subpicture, and loop_filter_across_subpic_enabled_flag[SubPicIdx] is equal to 0.

8.8.5.5 ALF Boundary Position Derivation Process

Inputs of this process are:
a. a luma location (xCtb, yCtb) specifying the top-left sample of the current luma coding tree block relative to the top left sample of the current picture,
b. a luma location (x, y) specifying the current sample relative to the top-left sample of the current luma coding tree block.

Output of this process are:
c. the left vertical boundary position clipLeftPos,
d. the right vertical boundary position clipRightPos,
e. the above horizontal boundary position clipTopPos,
f. the below horizontal boundary position clipBottomPos.

The variables clipLeftPos, clipRightPos, clipTopPos and clipBottomPos are set equal to −128.

The variable clipTopPos is modified as follows:
a. If the bottom boundary of the current coding tree block is not the bottom boundary of the picture and y−(CtbSizeY−4) is greater than or equal to 0, the variable clipTopPos is set equal to yCtb+CtbSizeY−4.

b. Otherwise, if pps_loop_filter_across_virtual_boundaries_disabled_flag is equal to 1, and PpsVirtualBoundariesPosY[n] % CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

$$clipTopPos = PpsVirtualBoundariesPosY[n] \qquad (8\text{-}1292)$$

c. Otherwise, if y is less than 3, and the top boundary of the current coding tree block is not the top boundary of the picture, and one or more of the following conditions are true, the variable clipTopPos is set equal to yCtb:
  i. If the top boundary of the current coding tree block is the top boundary of the brick, and loop_filter_across_bricks_enabled_flag is equal to 0.
  ii. If the top boundary of the current coding tree block is the top boundary of the slice, and loop_filter_across_slices_enabled_flag is equal to 0.
  iii. If the top boundary of the current coding tree block is the top boundary of the subpicture, and loop_filter_across_subpic_enabled_flag[SubPicIdx] is equal to 0.

The variable clipBottomPos is modified as follows:
a. If the bottom boundary of the current coding tree block is not the bottom boundary of the picture and CtbSizeY−4−y is greater than 0 and is less than 4, the variable clipBottomPos is set equal to yCtb+CtbSizeY−4.
b. Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

$$clipBottomPos = PpsVirtualBoundariesPosY[n] \qquad (8\text{-}1293)$$

c. Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:
  i. If the bottom boundary of the current coding tree block is the bottom boundary of the brick, and loop_filter_across_bricks_enabled_flag is equal to 0.
  ii. If the bottom boundary of the current coding tree block is the bottom boundary of the slice, and loop_filter_across_slices_enabled_flag is equal to 0.
  iii. If the bottom boundary of the current coding tree block is the bottom boundary of the subpicture, and loop_filter_across_subpic_enabled_flag[SubPicIdx] is equal to 0.

The variable clipLeftPos is modified as follows:
a. If pps_loop_filter_across_virtual_boundaries_disabled_flag is equal to 1, and PpsVirtualBoundariesPosX[n] % CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

$$clipLeftPos = PpsVirtualBoundariesPosX[n] \qquad (8\text{-}1294)$$

b. Otherwise, if x is less than 3, the left boundary of the current coding tree block is not the left boundary of the picture and one or more of the following conditions are true, the variable clipLeftPos is set equal to xCtb:
  i. If the left boundary of the current coding tree block is the left boundary of the brick, and loop_filter_across_bricks_enabled_flag is equal to 0.
  ii. If the left boundary of the current coding tree block is the left boundary of the slice, and loop_filter_across_slices_enabled_flag is equal to 0.
  iii. If the left boundary of the current coding tree block is the left boundary of the subpicture, and loop_filter_across_subpic_enabled_flag[SubPicIdx] is equal to 0.

<insert>Otherwise, if x+y is less than 2, and the top-left coding tree block is in the same picture, and one or more of the following conditions are true, the variable clipLeftPos is set equal to xCtb:
  i. If the the top-left coding tree block is in another brick, and loop_filter_across_bricks_enabled_flag is equal to 0.
  ii. If the the top-left coding tree block is in another slice, and loop_filter_across_slices_enabled_flag is equal to 0.
  iii. If the the top-left coding tree block is in another subpicture, and loop_filter_across_subpic_enabled_flag[SubPicIdx] is equal to 0.

Otherwise, if x+ctbSizeY−1−y is less than 2, and the bottom-left coding tree block is in the same picture, and one or more of the following conditions are true, the variable clipLeftPos is set equal to xCtb:
  i. If the the bottom-left coding tree block is in another brick, and loop_filter_across_bricks_enabled_flag is equal to 0.
  ii. If the the bottom-left coding tree block is in another slice, and loop_filter_across_slices_enabled_flag is equal to 0.
  iii. If the the bottom-left coding tree block is in another subpicture, and loop_filter_across_subpic_enabled_flag[SubPicIdx] is equal to 0. <insertend>

The variable clipRightPos is modified as follows:
a. If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

$$clipRightPos = PpsVirtualBoundariesPosX[n] \qquad (8\text{-}1295)$$

b. Otherwise, if CtbSizeY−x is less than 4, and the right boundary of the current coding tree block is not the right boundary of the picture, and one or more of the following conditions are true, the variable clipRightPos is set equal to xCtb+CtbSizeY:
  i. If the right boundary of the current coding tree block is the right boundary of the brick, and loop_filter_across_bricks_enabled_flag is equal to 0.
  ii. If the right boundary of the current coding tree block is the right boundary of the slice, and loop_filter_across_slices_enabled_flag is equal to 0.

iii. if the right boundary of the current coding tree block is the right boundary of the subpicture, and loop_filter_across_subpic_enabled_flag[SubPicIdx] is equal to 0.

<insert>Otherwise, if y+ctbSizeY−1−x is less than 2, and the top-right coding tree block is in the same picture, and one or more of the following conditions are true, the variable clipRightPos is set equal to xCtb+CtbSizeY:
  i. If the the top-right coding tree block is in another brick, and loop_filter_across_bricks_enabled_flag is equal to 0.
  ii. If the the top-right coding tree block is in another slice, and loop_filter_across_slices_enabled_flag is equal to 0.
  iii. If the the top-right coding tree block is in another subpicture, and loop_filter_across_subpic_enabled_flag[SubPicIdx] is equal to 0.

Otherwise, if ctbSizeY−1−y+ctbSizeY−1−x is less than 2, and the bottom-right coding tree block is in the same picture, and one or more of the following conditions are true, the variable clipRightPos is set equal to xCtb+CtbSizeY:
  i. If the bottom-right coding tree block is in another brick, and loop_filter_across_bricks_enabled_flag is equal to 0.
  ii. If the the bottom-right coding tree block is in another slice, and loop_filter_across_slices_enabled_flag is equal to 0.
  iii. If the the bottom-right coding tree block is in another subpicture, and loop_filter_across_subpic_enabled_flag[SubPicIdx] is equal to 0. <insertend>

The above described standards changes are provided as an example, and other examples are possible in accordance with the descriptions provided herein.

In some implementations, the processes (or methods) described herein can be performed by a computing device or an apparatus, such as the system 100 shown in FIG. 1. For example, the processes can be performed by the encoding device 104 shown in FIG. 1 and FIG. 18, by another video source-side device or video transmission device, by the decoding device 112 shown in FIG. 1 and FIG. 19, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device or apparatus can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming devices, mobile devices, Internet-of-Things (IoT) devices, HMDs, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC". Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, (e.g., via network transmission). Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 18:
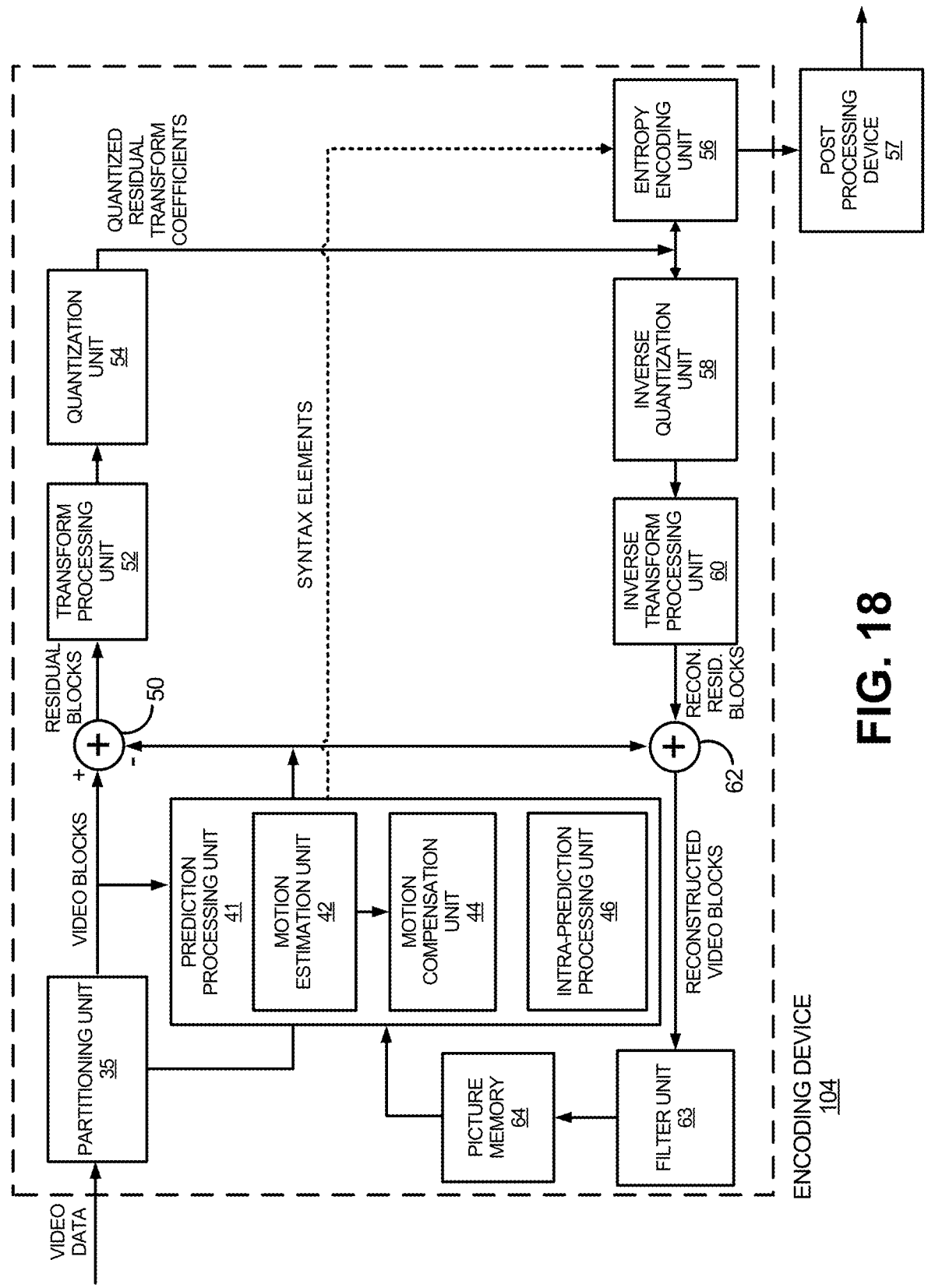
FIG. 18 is a block diagram illustrating an example video encoding device, in accordance with some examples of the present disclosure.
Figure 19:
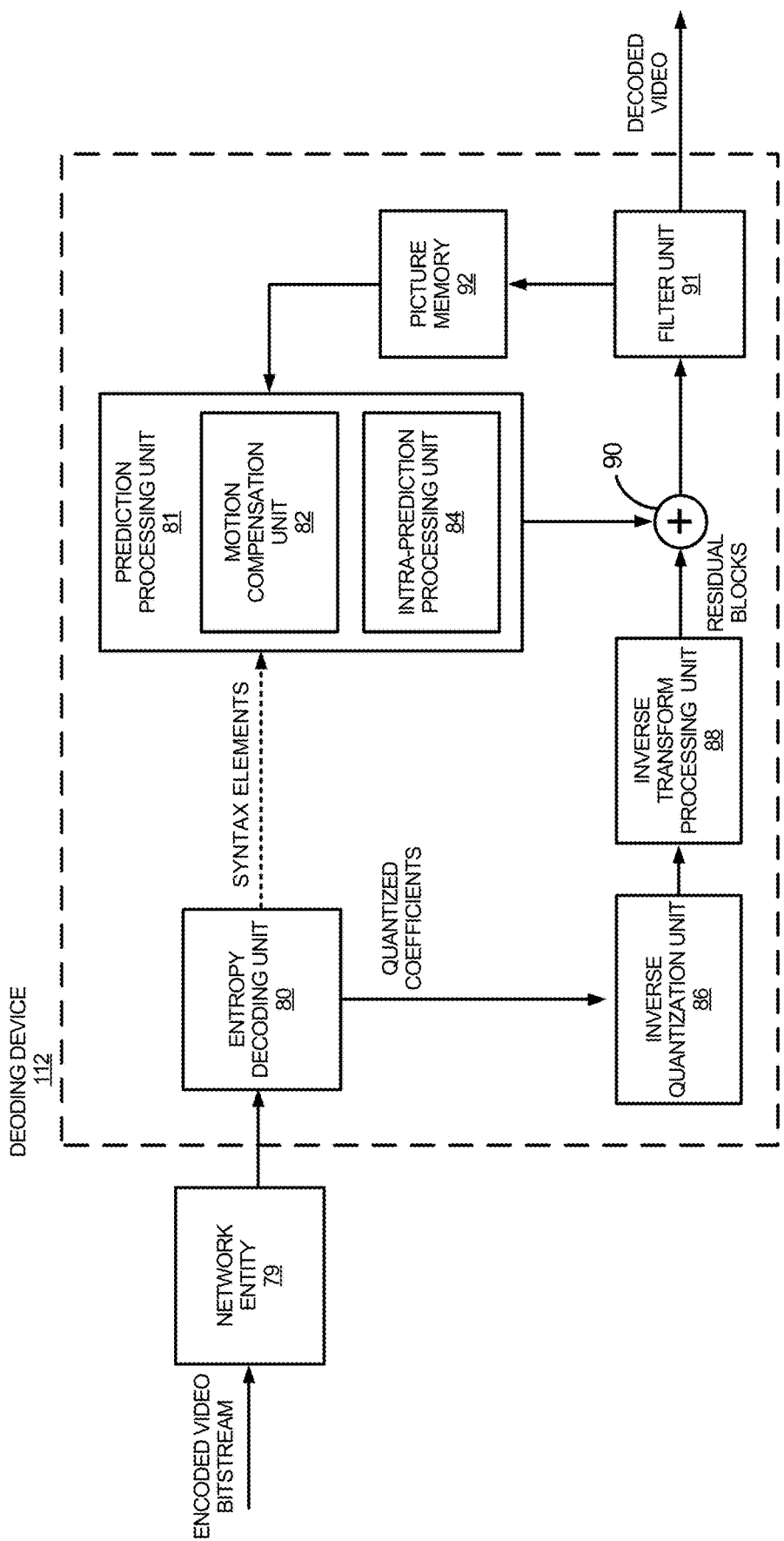
FIG. 19 is a block diagram illustrating an example video decoding device, in accordance with some examples of the present disclosure.

Specific details of the encoding device 104 and the decoding device 112 are shown in FIG. 18 and FIG. 19, respectively. FIG. 18 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 18 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 18, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In some examples, the encoding device 104 of FIG. 18 can represent an example of a video encoder configured to calculate ALF filter with pixel duplication, performing ALF filtering with clipping, derive various coding parameters, etc. The encoding device 104 may, for example, calculate ALF filter and clipping values and/or perform ALF filtering with pixel duplication as described above. For instance, the encoding device 104 may perform any of the techniques described herein, including the processes and techniques described above with respect to FIG. 2B, FIG. 2C, FIG. 16, or any other process described herein. In some cases, some of the techniques of this disclosure may also be implemented by post processing device 57.

FIG. 19 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 18.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i. e. B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and/or a sample adaptive offset (SAO) filter. Although filter unit 91 is shown in FIG. 19 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In some examples, the decoding device 112 of FIG. 19 represents an example of a video decoder configured to calculate ALF filter and pixel duplication values, perform ALF filtering with pixel duplication, derive various coding parameters, etc. The decoding device 112 may, for example, calculate ALF filter and clipping values and perform ALF filtering with pixel duplication as described above. For instance, the decoding device 112 may perform any of the techniques described herein, including the processes and techniques described above for decoding with respect to the clip, padding, and filtering operations described above around slice boundaries in certain configurations.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended examples are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the example. For example, example language reciting "at least one of A and B" means A, B, or A and B. In another example, example language reciting "at least one of A, B, and C" means A, B, C, or A and B, or A and C, or B and C, or A and B and C. The language "at least one of" a set and/or "one or more" of a set does not limit the set to the items listed in the set. For example, example language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1. A method of processing video data, the method comprising: obtaining one or more clipping position variables; obtaining a pixel to be filtered using a loop filter, the pixel being located in a first sub-portion of a picture; determining one or more pixels or one or more Laplacian values in a second sub-portion of the picture are needed to filter the at least one pixel using the loop filter; and setting a clipping position variable of the one or more clipping position variables as a block boundary based on the one or more pixels or the one or more Laplacian values being in the second sub-portion of the picture.

Example 2. The method of example 1, wherein the loop filter is an adaptive loop filter (ALF).

Example 3. The method any one of examples 1 to 2, wherein the first sub-portion is a first slice of the picture, and wherein the second sub-portion is a second slice of the picture.

Example 4. The method of any one of examples 1 to 3, wherein the block boundary includes a coding tree unit (CTU) boundary.

Example 5. The method of any one of examples 1 to 4, wherein the one or more pixels include at least one pixel in a top-left block relative to the pixel, and wherein the clipping position variable is set to a left block boundary.

Example 6. The method of example 5, further comprising setting an additional clipping position variable of the one or more clipping position variables to a top block boundary.

Example 7. The method of any one of examples 1 to 4, wherein the one or more Laplacian values include at least one Laplacian value in a top-left block relative to the pixel, and wherein the clipping position variable is set to a left block boundary.

Example 8. The method of example 7, further comprising setting an additional clipping position variable of the one or more clipping position variables to a top block boundary.

Example 9. The method of any one of examples 1 to 4, wherein the one or more pixels include at least one pixel in a top-right block relative to the pixel, and wherein the clipping position variable is set to a right block boundary.

Example 10. The method of example 9, further comprising setting an additional clipping position variable of the one or more clipping position variables to a top block boundary.

Example 11. The method of any one of examples 1 to 4, wherein the one or more Laplacian values include at least one Laplacian value in a top-right block relative to the pixel, and wherein the clipping position variable is set to a right block boundary.

Example 12. The method of example 11, further comprising setting an additional clipping position variable of the one or more clipping position variables to a top block boundary.

Example 13. The method of any one of examples 1 to 4, wherein the one or more pixels include at least one pixel in a bottom-left block relative to the pixel, and wherein the clipping position variable is set to a left block boundary.

Example 14. The method of example 13, further comprising setting an additional clipping position variable of the one or more clipping position variables to a bottom block boundary.

Example 15. The method of any one of examples 1 to 4, wherein the one or more Laplacian values include at least one Laplacian value in a bottom-left block relative to the pixel, and wherein the clipping position variable is set to a left block boundary.

Example 16. The method of example 15, further comprising setting an additional clipping position variable of the one or more clipping position variables to a bottom block boundary.

Example 17. The method of any one of examples 1 to 4, wherein the one or more pixels include at least one pixel in a bottom-right block relative to the pixel, and wherein the clipping position variable is set to a right block boundary.

Example 18. The method of example 17, further comprising setting an additional clipping position variable of the one or more clipping position variables to a bottom block boundary.

Example 19. The method of any one of examples 1 to 4, wherein the one or more Laplacian values include at least one Laplacian value in a bottom-right block relative to the pixel, and wherein the clipping position variable is set to a right block boundary.

Example 20. The method of example 19, further comprising setting an additional clipping position variable of the one or more clipping position variables to a bottom block boundary.

Example 21. An apparatus comprising a memory configured to store video data and a processor configured to process the video data according to any of examples 1 to 20.

Example 22. The apparatus of example 21, wherein the apparatus includes an encoder.

Example 23. The apparatus of example 21, wherein the apparatus includes a decoder.

Example 24. The apparatus of any one of examples 21 to 23, wherein the apparatus is a mobile device.

Example 25. The apparatus of any one of examples 21 to 24, further comprising a display configured to display the video data.

Example 26. The apparatus of any one of examples 21 to 25, further comprising a camera configured to capture one or more pictures.

Example 27. A computer readable medium having stored thereon instructions that when executed by a processor perform the methods of any of examples 1 to 20.

Example 28. A method of processing video data, the method comprising: obtaining the video data comprising one or more pictures; obtaining a first block of a picture from the one or more pictures, the first block being located in a first slice of the picture; determining a second block of the picture is located in the first slice, the second block adjoining the first block along a first side, and the second block including first one or more pixels for use in performing loop filtering of a pixel of the first block; determining a third block is located at a diagonal corner of the first block in a second slice of the picture, the third block including second one or more pixels for use in performing the loop filtering of the pixel of the first block; determining the loop filtering across slice boundaries is disabled; determining, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and padding the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

Example 29. The method of example 28, wherein the loop filtering for the first block is performed using an adaptive loop filter (ALF).

Example 30. The method of any example 28, wherein the pixels of the first block or the pixels of the additional block are positioned symmetrically about the first one or more pixels and the second one or more pixels.

Example 31. The method of any of examples 28-30, wherein padding the first one or more pixels and the second one or more pixels using pixels of the first block or pixels of an additional block of the first slice includes generating a converted slice boundary treating a block boundary along the first side between the first block and the second block as the converted slice boundary.

Example 32. The method of example 31, wherein the first slice is a raster scan slice.

Example 33. The method of example 31, wherein the third block is located at a top-left corner of the first block.

Example 34. The method of example 33, wherein the second block is located along a left border of the first block and along a bottom border of the third block; wherein the converted slice boundary is generated at the left border of the first block using a clipLeftPos function.

Example 35. The method of example 33, wherein the second block is located along a top border of the first block and along a right border of the third block; and wherein the converted slice boundary is generated at the top border of the first block using a clipTopPos function.

Example 36. The method of example 33, wherein the third block is located at a bottom-right corner of the first block.

Example 37. The method of example 36, wherein the second block is located along a right border of the first block and along a top border of the third block; and wherein the converted slice boundary is generated at the right border of the first block using a clipRightPos function.

Example 38. The method of example 36, wherein the second block is located along a bottom border of the first block and along a left border of the third block; and wherein the converted slice boundary is generated at the bottom border of the first block using a clipBottomPos function.

Example 39. The method of any of examples 28-39, wherein the first block comprises a first coding tree unit (CTU) and the second block comprises a second CTU.

Example 40. The method of any of examples 28-39, wherein the first slice and the second slice are obtained from raster scan partitioning of the picture.

Example 41. The method of any of examples 28-39, further comprising: generating an encoded video bitstream comprising the one or more pictures.

Example 42. The method of example 41, wherein the encoded video bitstream is generated based on the video data and a result of applying at least one filter to the first block.

Example 43. The method of example 41, further comprising: sending the encoded video bitstream to a decoding device, the encoded video bitstream being sent with signaling information, the signaling information comprising at least a clip flag and an adaptive loop filter flag.

Example 44. The method of example 41, further comprising: storing the encoded video bitstream.

Example 45. The method of any of examples 28-44, further comprising: obtaining an encoded video bitstream comprising the one or more pictures; identifying signaling information associated with the encoded video bitstream, the signaling information comprising at least an adaptive loop filter flag and an indication that the loop filtering across slice boundaries is disabled; and decoding the first block of the picture from the encoded video bitstream.

Example 46. The method of example 45, wherein decoding the first block of the picture from the encoded video bitstream comprises reconstructing the first block of the picture, and further comprising applying at least one filter to the reconstructed first block.

Example 47. The method of any of examples 28-46, wherein padding the first one or more pixels and the second one or more pixels includes duplicating the pixels of the first block or pixels of an additional block of the first slice to replace the first one or more pixels and the second one or more pixels with padded pixels.

Example 48. An apparatus comprising: memory; and one or more processors coupled to the memory, the one or more processors being configured to: obtain the video data comprising one or more pictures; obtain a first block of a picture from the one or more pictures, the first block being located in a first slice of the picture; determine a second block of the picture is located in the first slice, the second block adjoining the first block along a first side, and the second block including first one or more pixels for use in performing loop filtering of a pixel of the first block; determine a third block is located at a diagonal corner of the first block in a second slice of the picture, the third block including second one or more pixels for use in performing the loop filtering of the pixel of the first block; determine the loop filtering across slice boundaries is disabled; determine, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and pad the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

Example 49. The apparatus of example 21, wherein the apparatus is a mobile computing device.

Example 50. The apparatus of examples 48-49, the one or more processors being configured to perform the method of any example above.

Example 51. A non-transitory computer-readable storage medium comprising instructions stored thereon which, when executed by one or more processors, cause the one or more processors to: obtain the video data comprising one or more pictures; obtain a first block of a picture from the one or more pictures, the first block being located in a first slice of the picture; determine a second block of the picture is located in the first slice, the second block adjoining the first block along a first side, and the second block including first one or more pixels for use in performing loop filtering of a pixel of the first block; determine a third block is located at a diagonal corner of the first block in a second slice of the picture, the third block including second one or more pixels for use in performing the loop filtering of the pixel of the first block; determine the loop filtering across slice boundaries is disabled; determine, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and pad the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

Example 52. An apparatus comprising: means for obtaining the video data comprising one or more pictures; means for obtaining a first block of a picture from the one or more pictures, the first block being located in a first slice of the picture; means for determining a second block of the picture is located in the first slice, the second block adjoining the first block along a first side, and the second block including first one or more pixels for use in performing loop filtering of a pixel of the first block; means for determining a third block is located at a diagonal corner of the first block in a second slice of the picture, the third block including second one or more pixels for use in performing the loop filtering of the pixel of the first block; means for determining the loop filtering across slice boundaries is disabled; means for determining, based on the second block being located in the second slice and the loop filtering across slice boundaries being disabled, that the first one or more pixels of the second block are available for performing the loop filtering of the pixel and the second one or more pixels of the third block are unavailable for performing the loop filtering of the pixel of the first block; and means for padding the first one or more pixels and the second one or more pixels, based on the second one or more pixels of the third block being unavailable for performing the loop filtering of the pixel of the first block using pixels of the first block or pixels of an additional block of the first slice to replace the first one or more pixels and the second one or more pixels for performing the loop filtering of the pixel of the first block.

The apparatus of example 52 including means for performing the operation of any method above.

What is claimed is:

1. A method of processing video data, the method comprising:
obtaining the video data comprising one or more pictures;
obtaining a first block of a picture from the one or more pictures, the first block being located in a first slice of the picture;
determining that a left border of the first block is not a slice boundary;
determining that a second block located at a top-left corner of the first block is in a second slice of the picture;
determining that loop filtering across slice boundaries is disabled;
determining, based on the second block being located in the second slice and the loop filtering across slice boundaries being disabled, that one or more pixels of the second block are unavailable for performing the loop filtering of a pixel of the first block; and
based on the left border of the first block not being a slice boundary and the one or more pixels of the second block being unavailable for performing the loop filtering of the pixel of the first block, using pixels of a third block adjoining the first block along a top side and in the first slice to replace the one or more unavailable pixels of the second block for performing the loop filtering of the pixel of the first block using a function modifying a variable associated with a left vertical boundary position.

2. The method of claim 1, wherein the third block neighbors a top horizontal boundary of the first block.

3. The method of claim 1, wherein the loop filtering for the first block is performed using an adaptive loop filter (ALF).

4. The method of claim 1, wherein the pixels of the first block are positioned symmetrically about the one or more pixels.

5. The method of claim 1, wherein the first slice is a raster scan slice.

6. The method of claim 1, wherein the first block comprises a first coding tree unit (CTU).

7. The method of claim 1, wherein the first slice and the second slice are obtained from raster scan partitioning of the picture.

8. The method of claim 1, further comprising:
generating an encoded video bitstream comprising the one or more pictures.

9. The method of claim 8, wherein the encoded video bitstream is generated based on the video data and a result of applying at least one filter to the first block.

10. The method of claim 8, further comprising:
sending the encoded video bitstream to a decoding device, the encoded video bitstream being sent with signaling information, the signaling information comprising at least a clip flag and an adaptive loop filter flag.

11. The method of claim 8, further comprising:
storing the encoded video bitstream.

12. The method of claim 1, further comprising:
obtaining an encoded video bitstream comprising the one or more pictures;
identifying signaling information associated with the encoded video bitstream, the signaling information comprising at least an adaptive loop filter flag and an indication that the loop filtering across slice boundaries is disabled; and
decoding the first block of the picture from the encoded video bitstream.

13. The method of claim 12, wherein decoding the first block of the picture from the encoded video bitstream comprises reconstructing the first block of the picture to generate a reconstructed first block, and further comprising applying at least one filter to the reconstructed first block.

14. The method of claim 1, wherein padding the one or more pixels includes duplicating the pixels of the third block of the first slice to replace the one or more pixels with padded pixels.

15. An apparatus for processing video data, comprising:
at least one memory; and
at least one processor coupled to the at least one memory, the at least one processor being configured to:
   obtain the video data comprising one or more pictures;
   obtain a first block of a picture from the one or more pictures, the first block being located in a first slice of the picture;
   determine that a left border of the first block is not a slice boundary;
   determine that a second block located at a top-left corner of the first block is in a second slice of the picture;
   determine that loop filtering across slice boundaries is disabled;
   determine, based on the second block being located in the second slice and the loop filtering across slice boundaries being disabled, that one or more pixels of the second block are unavailable for performing the loop filtering of a pixel of the first block; and
   based on the left border of the first block not being a slice boundary and the one or more pixels of the second block being unavailable for performing the loop filtering of the pixel of the first block, use pixels of a third block adjoining the first block along a top side and in the first slice to replace the one or more unavailable pixels of the second block for performing the loop filtering of the pixel of the first block using a function modifying a variable associated with a left vertical boundary position.

16. The apparatus of claim 15, wherein the third block neighbors a top horizontal boundary of the first block.

17. The apparatus of claim 15, wherein the at least one processor is configured to perform the loop filtering for the first block using an adaptive loop filter (ALF).

18. The apparatus of claim 15, wherein the pixels of the first block are positioned symmetrically about the one or more pixels.

19. The apparatus of claim 15, wherein the first slice is a raster scan slice.

20. The apparatus of claim 15, wherein the first block comprises a first coding tree unit (CTU).

21. The apparatus of claim 15, wherein the first slice and the second slice are obtained from raster scan partitioning of the picture.

22. The apparatus of claim 15, wherein the at least one processor is configured to:
generate an encoded video bitstream comprising the one or more pictures.

23. The apparatus of claim 22, wherein the at least one processor is configured to generate the encoded video bitstream based on the video data and a result of applying at least one filter to the first block.

24. The apparatus of claim 22, wherein the at least one processor is configured to:
send the encoded video bitstream to a decoding device with signaling information, the signaling information comprising at least a clip flag and an adaptive loop filter flag.

25. The apparatus of claim 22, wherein the at least one processor is configured to:
output the encoded video bitstream for storage in the at least one memory.

26. The apparatus of claim 15, wherein the at least one processor is configured to:
obtain an encoded video bitstream comprising the one or more pictures;
identify signaling information associated with the encoded video bitstream, the signaling information comprising at least an adaptive loop filter flag and an indication that the loop filtering across slice boundaries is disabled; and
decode the first block of the picture from the encoded video bitstream.

27. The apparatus of claim 26, wherein:
to decode the first block of the picture from the encoded video bitstream, the at least one processor is configured to reconstruct the first block of the picture to generate a reconstructed first block; and
the at least one processor is configured to apply at least one filter to the reconstructed first block.

28. The apparatus of claim 15, wherein, to pad the one or more pixels, the at least one processor is configured to duplicate the pixels of the third block of the first slice to replace the one or more pixels with padded pixels.

29. A non-transitory computer-readable medium having stored thereon instructions that, when executed by one or more processors, cause the one or more processors to:
obtain video data comprising one or more pictures;
obtain a first block of a picture from the one or more pictures, the first block being located in a first slice of the picture;
determine that a second block is located at a top-left corner of the first block in a second slice of the picture, the second block including one or more pixels for use in performing loop filtering of a pixel of the first block;
determine that loop filtering across slice boundaries is disabled;
determine, based on the second block being located in the second slice and the loop filtering across slice boundaries being disabled, that the one or more pixels of the second block are unavailable for performing the loop filtering of the pixel of the first block; and
based on the one or more pixels of the second block being unavailable for performing the loop filtering of the pixel of the first block, use pixels of a third block of the first slice to replace the one or more pixels of the second block for performing the loop filtering of the pixel of the first block based on a converted slice boundary generated at a left border of the first block using a function modifying a variable associated with a left vertical boundary position.

30. The non-transitory computer-readable medium of claim 29, wherein the third block neighbors a top horizontal boundary of the first block.

* * * * *